No. 878,496. PATENTED FEB. 11, 1908.
W. BAXTER, Jr.
SYSTEM FOR CONTROLLING THE MOTION OF ELECTRICALLY OPERATED ELEVATORS BY MEANS OF A SWITCH.
APPLICATION FILED MAY 21, 1902.
18 SHEETS—SHEET 1.
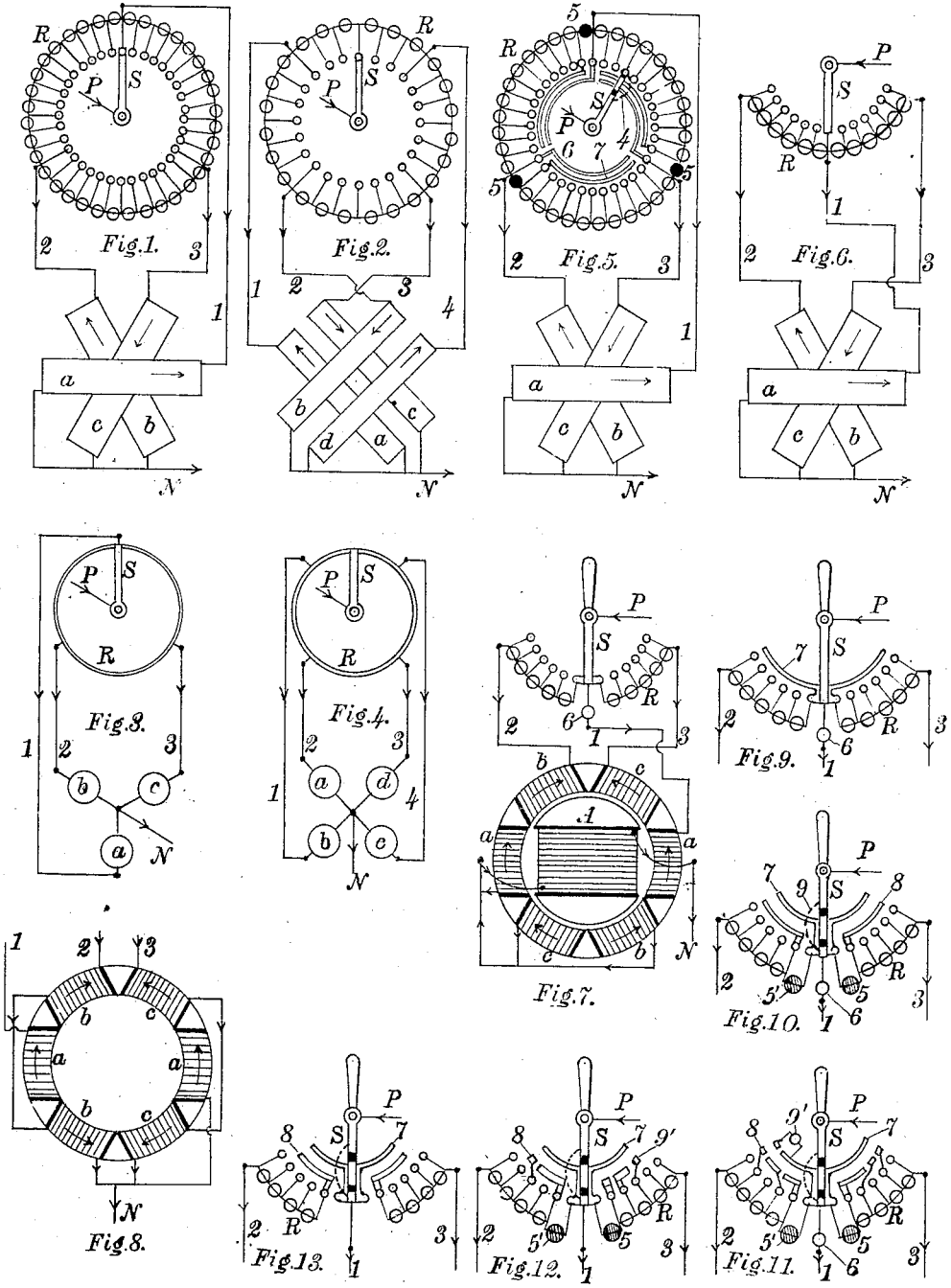
WITNESSES
Katherine E. Manning
Harold Lewis
INVENTOR
William Baxter Jr.
By Knight Bros
ATTYS.

No. 878,496. PATENTED FEB. 11, 1908.
W. BAXTER, Jr.
SYSTEM FOR CONTROLLING THE MOTION OF ELECTRICALLY OPERATED ELEVATORS BY MEANS OF A SWITCH.
APPLICATION FILED MAY 21, 1902.

WITNESSES
Katherine E. Manning
Harold Lewis.

INVENTOR
William Baxter Jr.,
By Knight Bros
ATTY'S.

No. 878,496.   
W. BAXTER, Jr.   
PATENTED FEB. 11, 1908.

SYSTEM FOR CONTROLLING THE MOTION OF ELECTRICALLY OPERATED ELEVATORS BY MEANS OF A SWITCH.

APPLICATION FILED MAY 21, 1902.

WITNESSES  
Katherine E. Manning  
Harold Lewis.

INVENTOR  
William Baxter Jr.  
By Knight Bros.  
ATTYS.

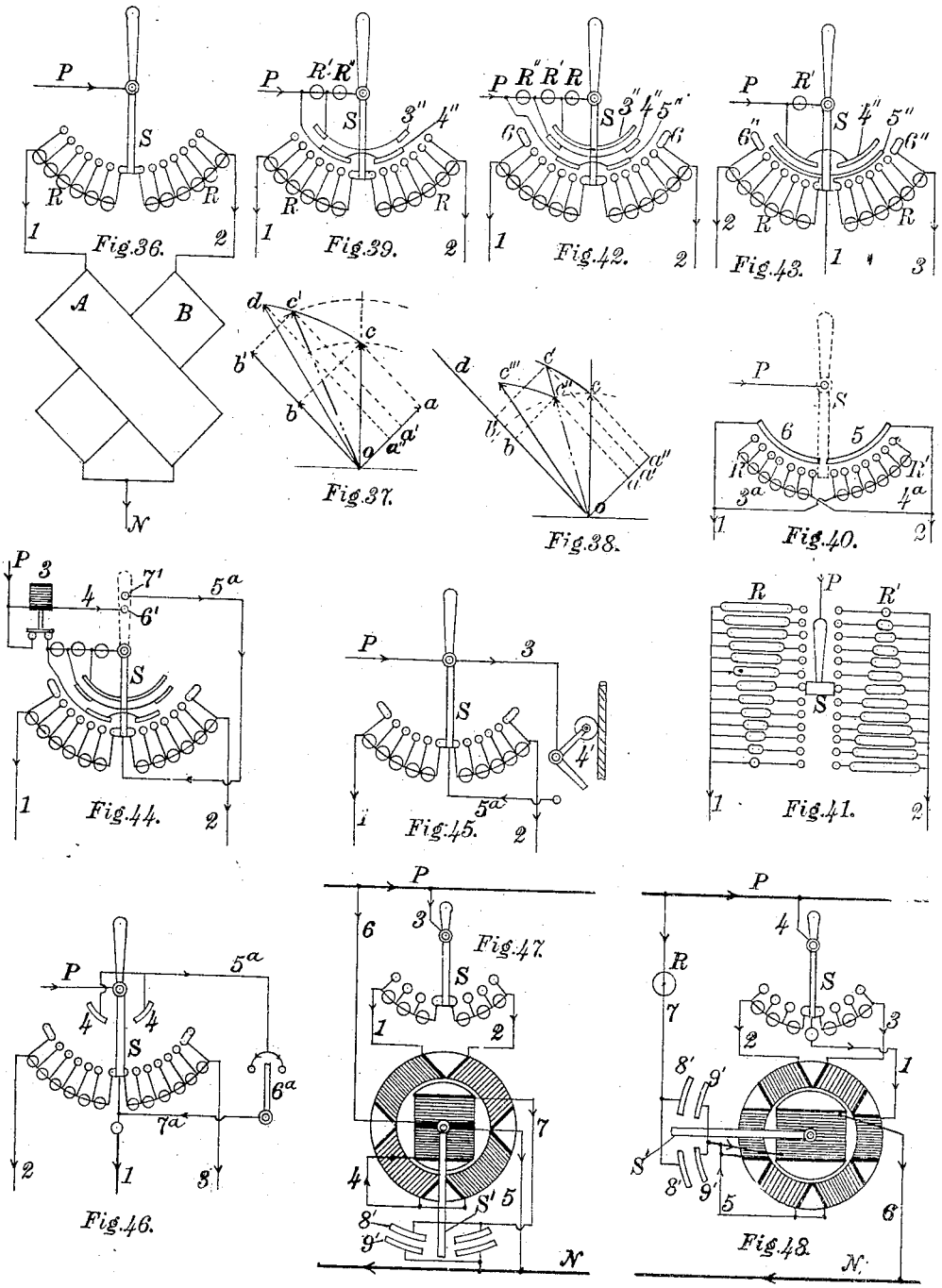

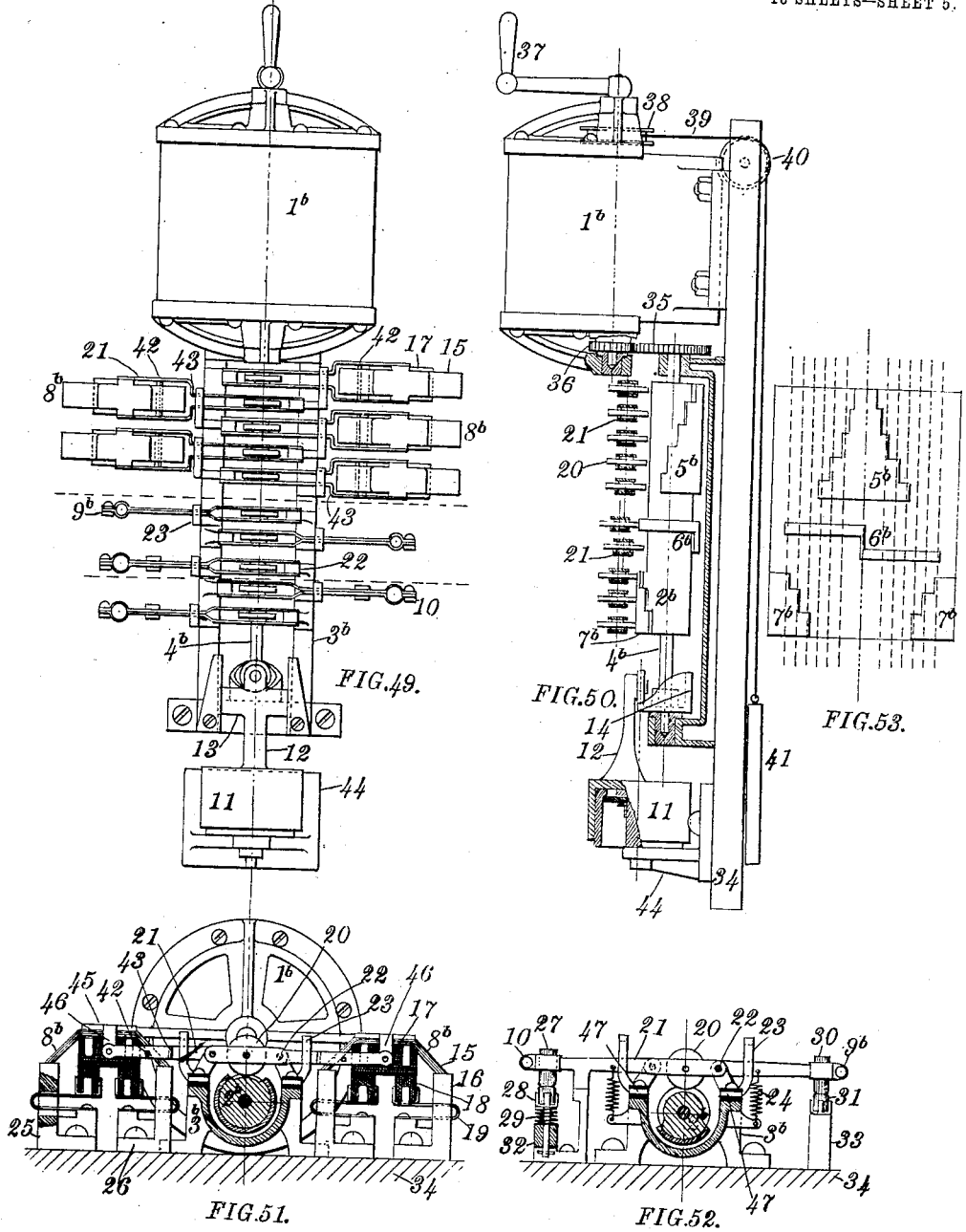

No. 878,496. PATENTED FEB. 11, 1908.
W. BAXTER, Jr.
SYSTEM FOR CONTROLLING THE MOTION OF ELECTRICALLY OPERATED ELEVATORS BY MEANS OF A SWITCH.
APPLICATION FILED MAY 21, 1902.
18 SHEETS—SHEET 6.
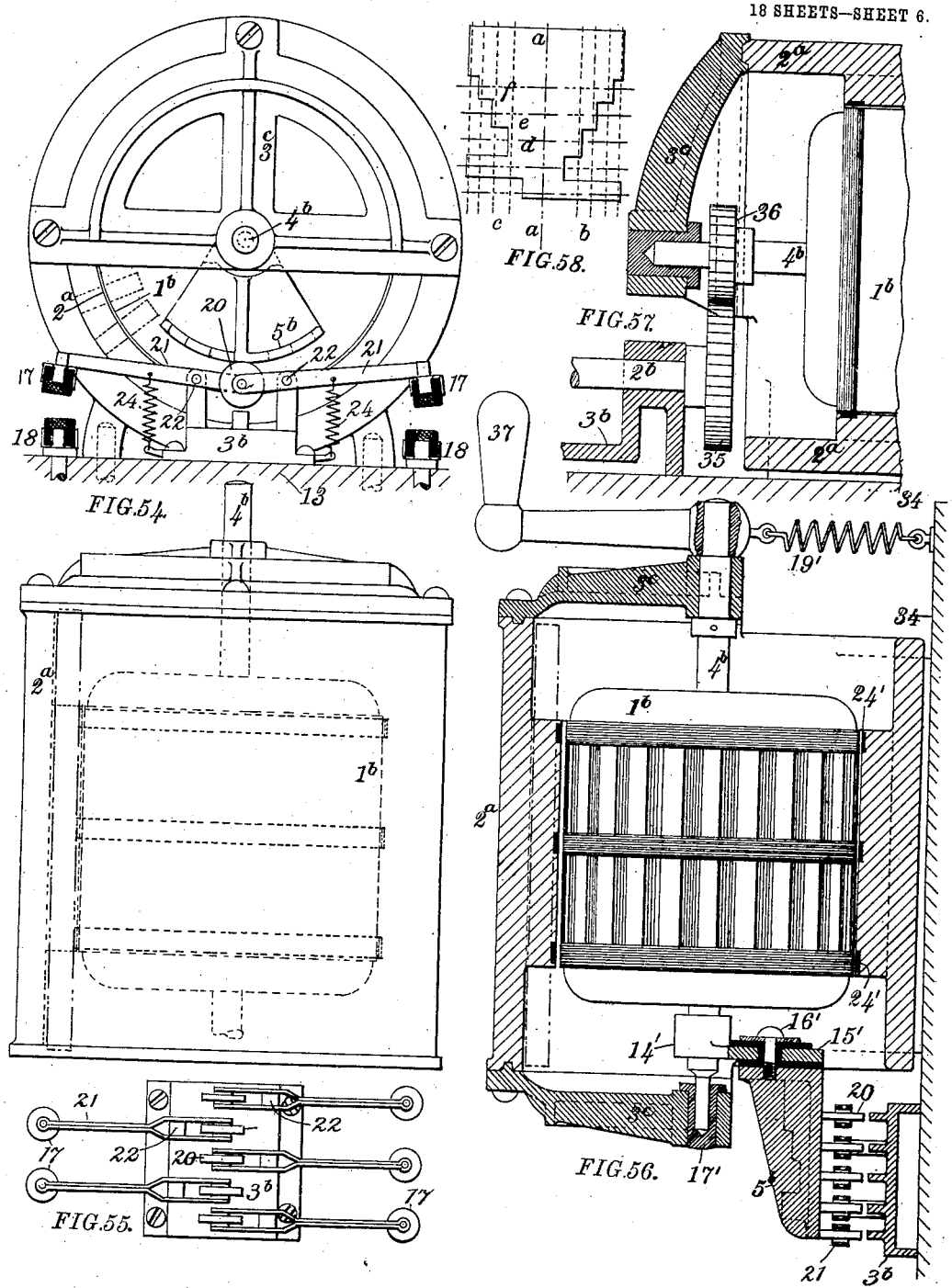
WITNESSES
Katherine E. Manning
Harold Lewis
INVENTOR
William Baxter Jr.,
By Knight Bros
ATTYS.

No. 878,496.　　　　　　　　　　　　　　　PATENTED FEB. 11, 1908.
W. BAXTER, Jr.
SYSTEM FOR CONTROLLING THE MOTION OF ELECTRICALLY OPERATED
ELEVATORS BY MEANS OF A SWITCH.
APPLICATION FILED MAY 21, 1902.

WITNESSES　　　　　　　　　　　　　　　　INVENTOR
Katherine E. Manning　　　　　　　　　William Baxter Jr.,
Harold Lewis.　　　　　　　　　　　　　By Knight Bros
　　　　　　　　　　　　　　　　　　　　　　　ATTYS.

No. 878,496. PATENTED FEB. 11, 1908.
W. BAXTER, Jr.
SYSTEM FOR CONTROLLING THE MOTION OF ELECTRICALLY OPERATED ELEVATORS BY MEANS OF A SWITCH.
APPLICATION FILED MAY 21, 1902.

WITNESSES
INVENTOR
William Baxter Jr.,
By Knight Bros
ATTYS.

No. 878,496. PATENTED FEB. 11, 1908.
W. BAXTER, Jr.
SYSTEM FOR CONTROLLING THE MOTION OF ELECTRICALLY OPERATED
ELEVATORS BY MEANS OF A SWITCH.
APPLICATION FILED MAY 21, 1902.
18 SHEETS—SHEET 9.
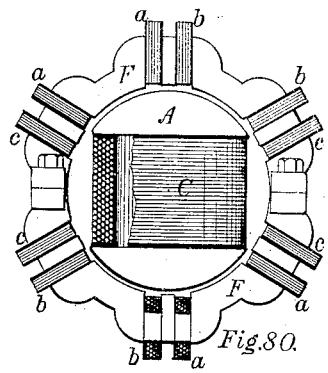
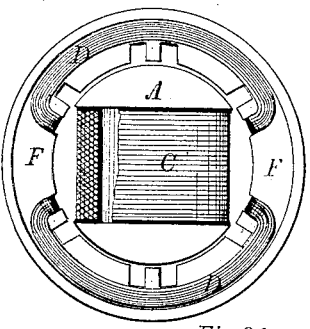
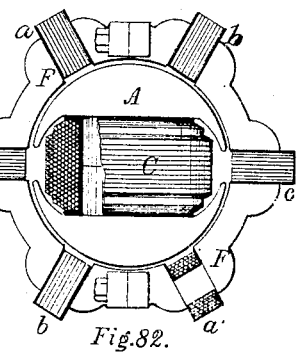
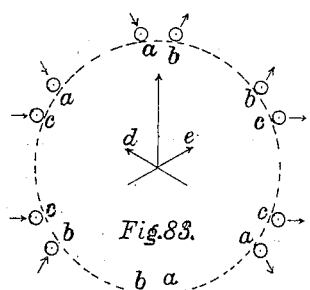
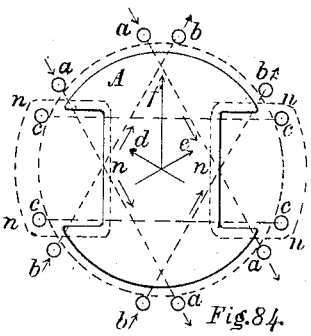
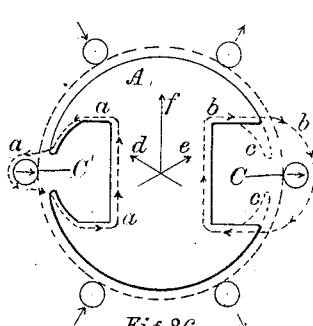
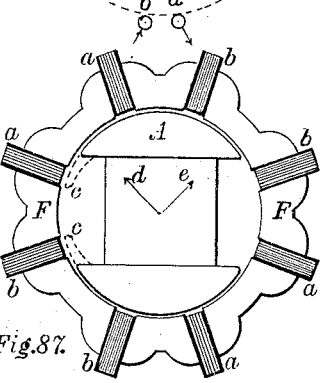
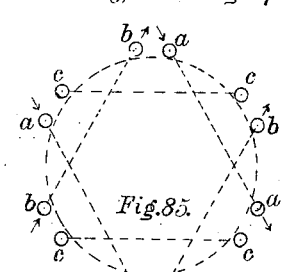
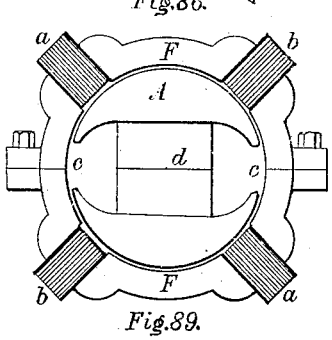
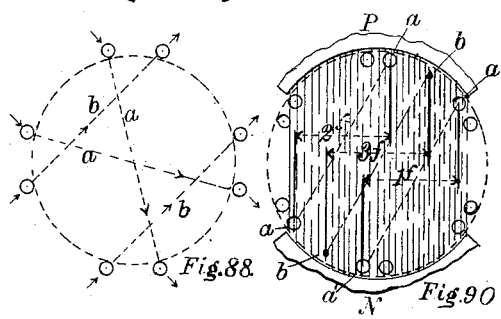
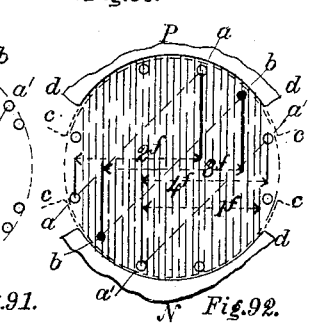
WITNESSES
INVENTOR
Katherine E. Manning
Harold Sewes
William Baxter Jr.
By Knight Bros
ATTYS.

No. 878,496. PATENTED FEB. 11, 1908.
W. BAXTER, Jr.
SYSTEM FOR CONTROLLING THE MOTION OF ELECTRICALLY OPERATED
ELEVATORS BY MEANS OF A SWITCH.
APPLICATION FILED MAY 21, 1902.
18 SHEETS—SHEET 10.
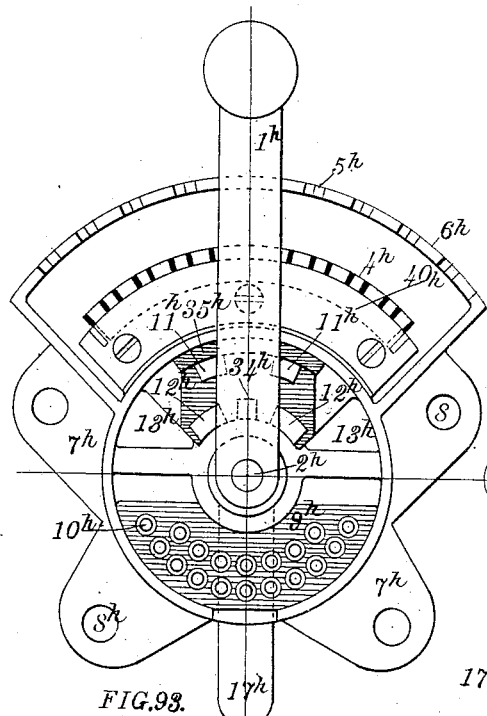
WITNESSES
INVENTOR No. 878,496. PATENTED FEB. 11, 1908.
W. BAXTER, Jr.
SYSTEM FOR CONTROLLING THE MOTION OF ELECTRICALLY OPERATED
ELEVATORS BY MEANS OF A SWITCH.
APPLICATION FILED MAY 21, 1902.

WITNESSES
Katherine E. Manning
Harold Lewis

INVENTOR
William Baxter Jr,
By Knight Bros
ATTYS.

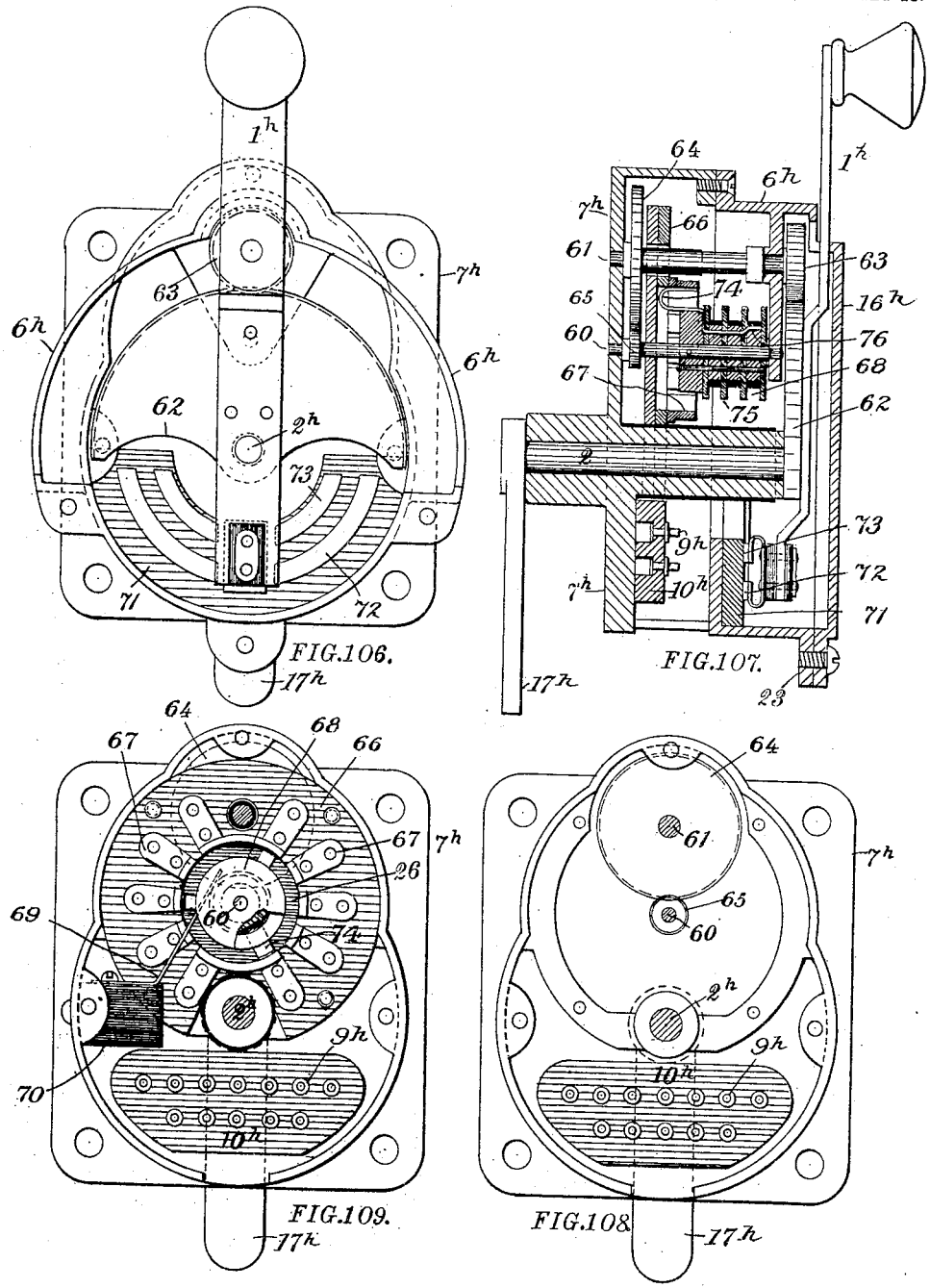

No. 878,496. PATENTED FEB. 11, 1908.
W. BAXTER, Jr.
SYSTEM FOR CONTROLLING THE MOTION OF ELECTRICALLY OPERATED
ELEVATORS BY MEANS OF A SWITCH.
APPLICATION FILED MAY 21, 1902.
18 SHEETS—SHEET 14.
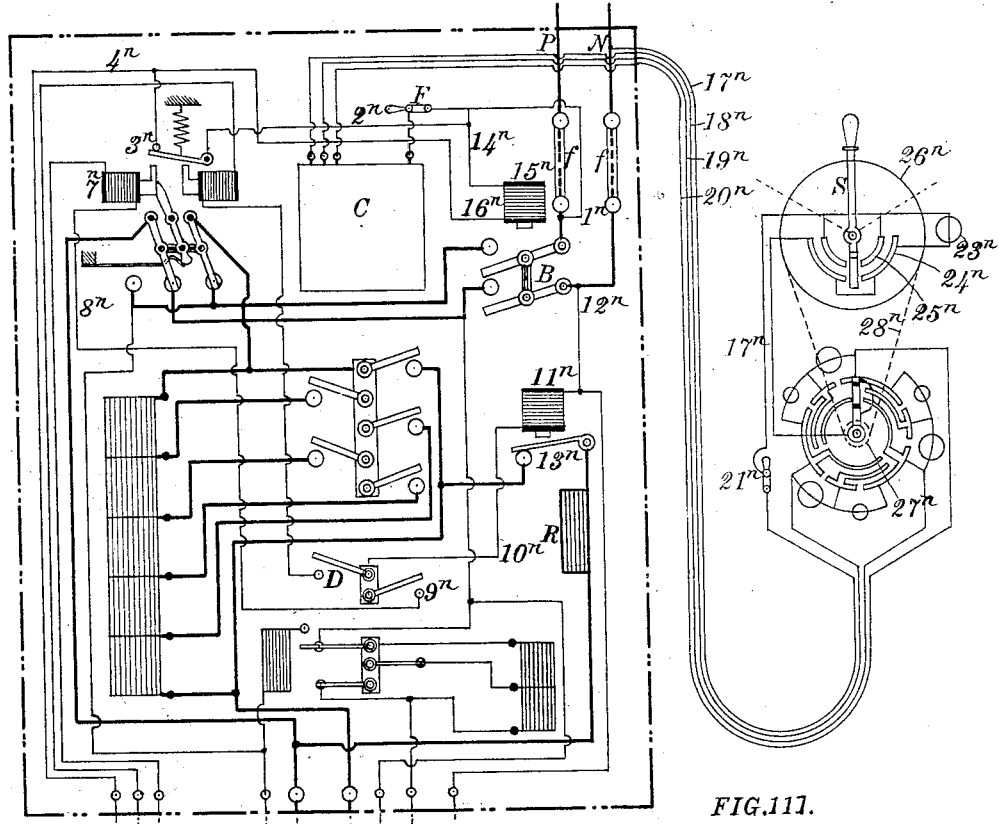
FIG.111.
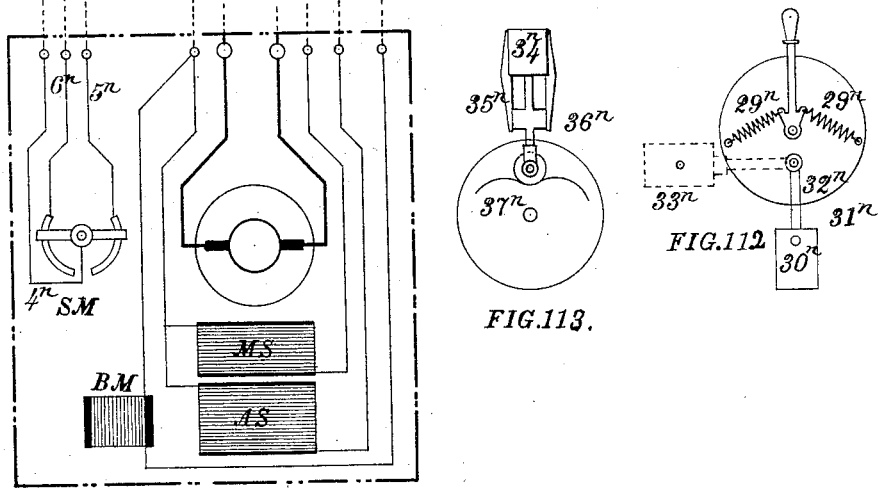
FIG.112.
FIG.113.
WITNESSES
INVENTOR
ATTYS.

No. 878,496. PATENTED FEB. 11, 1908.
W. BAXTER, Jr.
SYSTEM FOR CONTROLLING THE MOTION OF ELECTRICALLY OPERATED
ELEVATORS BY MEANS OF A SWITCH.
APPLICATION FILED MAY 21, 1902.

WITNESSES
INVENTOR
William Baxter Jr.,
By Knight Bros
ATTYS.

No. 878,496.

W. BAXTER, Jr.

PATENTED FEB. 11, 1908.

SYSTEM FOR CONTROLLING THE MOTION OF ELECTRICALLY OPERATED ELEVATORS BY MEANS OF A SWITCH.

APPLICATION FILED MAY 21, 1902.

WITNESSES

INVENTOR

ATTYS.

UNITED STATES PATENT OFFICE.

WILLIAM BAXTER, JR., OF JERSEY CITY, NEW JERSEY.

SYSTEM FOR CONTROLLING THE MOTION OF ELECTRICALLY-OPERATED ELEVATORS BY MEANS OF A SWITCH.

No. 878,496.      Specification of Letters Patent.      Patented Feb. 11, 1908.

Application filed May 21, 1902. Serial No. 108,378.

*To all whom it may concern:*

Be it known that I, WILLIAM BAXTER, Jr., a citizen of the United States, and a resident of Jersey City, in the county of Hudson and State of New Jersey, have invented a certain new and useful System for Controlling the Motion of Electrically-Operated Elevators by Means of a Switch, of which the following is a specification.

This invention relates to a system for controlling the motion of electrically operated elevators by means of a switch which may be located within the moving car, or at any point distant from the elevator machine, from which it is desired to control its operation. It differs from other controlling systems in that it gives the operator positive control over the motion of the car, and enables him to vary the speed thereof in any manner desired, within the range of variation of the elevator machine.

In the controlling systems most generally used, a switch is provided in the car, and when this is placed in the central position, the car is stopped; while movement to the right causes the car to run in one direction, and movement to the left causes the car to run in the other direction.

When the car switch is turned to the active position, either to the right or to the left, it acts to close the circuit connections between the elevator machine motor, and the supply line, and nothing more. As soon as the motor begins to revolve, a switch of some form moves automatically and gradually cuts out the starting resistance in the armature circuit. If any other changes in the circuit connections are required, to bring the motor up to its full velocity, they are effected by the same switch that cuts out the armature resistance, or by independent switches. The rapidity with which these switches move is governed by the use of dash-pots, weights, or springs, or by increasing the magnetizing force that acts upon the actuating magnets. A common way of increasing the magnetizing force acting on the magnets that operate the switches is to have their coils connected across the terminals of the motor armature so as to cause the current to increase with the gradual rise in the counter E. M. F. of the motor armature.

From the foregoing brief explanation, it will be seen that the rate at which the car speed is accelerated is wholly beyond the control of the operator in the car, for all he can do is to move the car switch and thereby connect the motor with the supply circuit, and after that the automatically operated switches will accelerate the velocity at a rate that will depend upon their mode of operation, but which in any event is wholly independent of, and incapable of modification by any effort the car operator may make.

In stopping an elevator operated by the foregoing system, the car switch is turned to the central position, and this movement disconnects the elevator motor from the supply circuit and at the same time applies a brake that acts to arrest the motion of the elevator machine. The distance in which the car will stop will evidently depend wholly upon the retarding resistance of the brake, and the driving force of the descending load and the velocity at which it is moving. A little reflection will show that all this system can do is to enable the operator to start and stop the car, but he cannot vary the rate of acceleration in starting or the rate of retardation in stopping. Furthermore, it is clear that if the car is started with a light load, the acceleration will be rapid, while with a heavy load it will be slow. In stopping, if the car is descending with a heavy load at a high velocity, it will traverse a further distance in coming to a stop than if running with a light load and lower speed. Thus it will be seen that in endeavoring to stop at any landing it is uncertain whether the car will stop even with the floor or above or below it. After a considerable amount of experience the operator can make a fairly good guess as to the proper instant at which to move the car switch to effect a stop even with the floor, but there is no certainty in the operation, and he often fails to hit the mark.

Another controlling system extensively used is known as the pilot motor system. In this system the movement of the car switch to one side or the other, not only acts to connect the elevator motor with the supply circuit, but also sets in motion a small motor that operates the switches that cut out the starting resistance in the armature circuit, and perform any other operations required to increase the velocity of the motor to the maximum. With this system, the pilot motor can be made to run until it has moved all the switches and has imparted to the elevator motor maximum speed, or it can be stopped at any intermediate point, by the simple operation of moving the car switch to a position intermediate between the central position and the extreme side position. By this process, the operator in the car is given partial control over the rate of acceleration, and the running speed of the elevator, as he can throw the car switch to the position that stops the pilot motor whenever, in his judgment, the velocity of the car is what it should be. This, however, brings into play the judgment of the car operator, and hence is not a means for giving positive control, either of the running speed or of the rate of acceleration. In stopping, the pilot motor system cannot give the operator any better control over the movement of the car than the first-named system, because as it is necessary to be able to stop very quickly, in many cases, circuit connections must be provided whereby the motor may be stopped without waiting for the pilot motor to rotate a sufficient number of times to return all the switches to the stop position. Thus the pilot motor through its slowness of action cannot be used to vary the rate of retardation in making stops.

An elevator controlling system to be perfect must be so arranged that it will enable the operator in the car to control the rate of acceleration in starting, to control the velocity when fully under way, and to control the rate of retardation in stopping. The last-named feature is of more importance than the first two, because the accuracy with which the elevator car is stopped at landings depends upon it. The elevator controlling system to be described in what follows aims to fully meet these requirements.

When a direct current constant potential motor is started, it is necessary to introduce resistance in the armature circuit to prevent an excessive flow of current through the armature, owing to the fact that the resistance of the latter is very low. As soon as the armature begins to revolve the counter E. M. F. it develops opposes the flow of current and thus permits of the gradual removal of the starting resistance. If all the resistance is cut out of the armature circuit, the motor armature will attain a velocity that will vary but slightly with increases or decreases in the load. To obtain different velocities of the armature, it is necessary either to balance a portion of the circuit E. M. F. by means of resistance introduced in the armature circuit, or to vary the strength of the motor field or the number of turns of wire on the motor armature. The latter arrangement presents practical difficulties, and is therefore objectionable, so that practically the variations in velocity are effected by introducing resistance in the armature circuit, and by changing the strength of the field. Both these operations can be accomplished in various ways, but in every instance switches are required to effect the proper circuit connections, and the controller must be made so that when it is actuated, it will move these switches in the proper sequence. If the person who operates the motor stands by the controller, and is able to operate it manually, he can obtain any desired rate of acceleration by advancing the controller handle at the proper rate of speed, and he can obtain any desired retardation rate by moving the controller handle backward at the proper velocity. If the man who operates the motor is located at a distance from the controller he can obtain the same certainty of control over the operation of the motor if means are provided whereby he can move the controller as positively as if his hand were placed upon the operating handle. To accomplish this result all that is necessary is to provide means whereby the movement of a handle in the car to a certain position will result in moving the controller to the corresponding position. Thus if the controller moves over eight steps to cut out the resistance in the armature circuit, and to impart to the motor all the various speeds at which it can run between the slowest and the maximum, the handle in the car should be arranged to move over eight steps, and when it is moved to the first step it should cause the controller to move to the first step, and when moved to the second step it should cause the controller to move to the second step, and so on for every other step.

As it may be desired in some cases to accelerate the velocity of the car as rapidly as possible to the maximum velocity, it is necessary that the controller be so constructed that it may be moved rapidly through its entire range of motion. The rapidity with which a motor can be accelerated is limited in practice by the strength to which the armature current will rise, and this strength is dependent upon the resistance that opposes rotation. It is evident that if the handle in the elevator car moves freely, the operator can swing it through its entire range in an interval of time shorter than the minimum time in which the armature velocity can be accelerated. An experienced man would not move the handle so rapidly, but to guard against blowing out fuses, or throwing the circuit breakers, it is desirable to provide means that will either prevent the operator from moving the handle in the car too rapidly, or that will prevent the controller from following the movement of the car handle faster than the permissible speed. If the speed retarding device is attached to the controller, then if the car handle is suddenly thrown over to the last step, the controller will immediately move over and will continue to move to the last step, but at a velocity no greater than the retarding device will permit. In stopping the motor it makes no difference whether the various steps through which the speed is accelerated are passed over one after the other, at a minimum rate of speed, or whether the circuit is opened at once; and as in cases where it is necessary to make a quick stop the circuit between the motor and the supply line must be opened instantly it follows that no device must be placed either on the handle in the car or upon the controller proper to materially retard the motion in effecting a stop, but the retarding device must be arranged to act energetically only in starting the motor. In stopping, its action, if any, must be slight.

The means I employ to cause the movement of the handle in the car to produce corresponding movements of the controller are susceptible of numerous variations, and the particular form used in any case is dependent upon the conditions to be fulfilled; that is, while any of the forms to be presently examined can be used in any case, they are not all equally well adapted to every case. The handle in the car is the handle of a switch whose function is to vary the strength of currents supplied to a device mounted upon the controller and adapted to impart motion to the latter.

My invention in its entirety may be described broadly as consisting of a controller, a device which I call a controller-mover, mounted on and adapted to impart movement to the controller, a car switch adapted to vary the strength of currents supplied to the controller-mover, and proper circuit connections between the main supply line and controller, between the main line and the car switch, and between the car switch and the controller-mover; all interdependent and working together to cause the controller to move in unison with the movement of the handle of the car switch, and when so moving to establish predetermined circuit connections, through the controller, with the elevator motor.

In some cases the controller may be required to move through only three or four steps to set the elevator in motion at its maximum velocity. In other cases it may be necessary to move the controller through ten, twelve, or more steps to perform the same operation. Some controllers are required to handle very strong currents, while others are intended for light currents. Thus it happens that in some cases the controller-mover may have to be so constructed as to be able to rotate through a small angular distance, and in other cases it may be necessary that it make several complete revolutions. If the controller is for light currents, the effort required to move it will be correspondingly small, while for a controller adapted to handle strong currents the effort required to move it will be correspondingly great; hence, the controller-mover in addition to being capable of moving through a small angle or through a number of revolutions, must also be made so as to give a small torque or a great torque, according to the requirements of any particular case. The angular distance through which the controller mover moves is governed by the arrangement of the car switch and the circuit connections between it and the controller mover, and this is one of the reasons why I use various forms of car switch and circuit connections. If the controller is used to handle small currents, and to effect all the circuit connections required in a few steps, the controller-mover need not swing through a large angle, and the torque it develops need not be large; hence, for such cases a controller-mover adapted to swing through an angle of 40 or 50 degrees and capable of exerting a small torque may be connected directly with the controller and meet all the requirements. If the controller is made to handle strong currents, and has to move through numerous steps to effect all the circuit combinations required to set the elevator motor in motion at its maximum valocity, a controller-mover will be required that can rotate through a large angle, and that can develop a large torque, so as to be capable of actuating the heavy switches required to handle strong currents. If the work is exceedingly heavy it will become advisable to connect the controller-mover with the controller through reducing gearing, so that the former may make several revolutions, while moving the latter through its entire range. With some forms of controllers it is necessary that they be moved very nearly to a certain position for each step, but in other forms of controllers it makes little difference whether they are stopped at exactly the right point for the various steps, or a trifle behind or in advance of it; hence, the controller-movers must be made for some cases so as to move the controller to the same position on the several steps every time it acts, and regardless of whether the controller is being moved forward or backward, while in other cases it need only move the controller to the approximate same position. Stated in another way; in some cases, if the exact position of the first step is twenty degrees from the stop position, the controller-mover may have to be moved to a position that is not more than twenty-one degrees nor less than nineteen degrees from the stop position, while in other cases the controller may be moved to any position between fifteen and twenty-five degrees. Owing to these various conditions that must be met by the controller it is necessary to vary the design so as to meet the requirements of any case, and on that account I have devised numerous modifications of the controller-mover. The controller proper must also be varied to meet the requirements of different cases in the most satisfactory manner; hence, the connections and relations between the controller-mover and the controller must be varied, and on that account I have devised numerous modifications in the controller proper, as well as in the mechanical connections between it and the controller mover, and also in the electrical connections and relations between them.

In the drawings, forming part of this specification, Figures 1 to 48 are diagrammatic representations of car switches of various types and of their circuit connections, to be hereinafter specifically referred to. In some of the figures, the coils of the controller-mover that are traversed by the currents coming from the car switch are shown. In other diagrams these parts are omitted, as they are not necessary to properly illustrate the parts which the diagrams are intended to elucidate. Some of the diagrams illustrate the way in which the movement of the car switch causes the movement of the controller-mover, and also the way in which the torque of the latter varies with different types of car switch. Figs. 49 to 59, and 76 to 79, show different designs of controller-movers and of that portion of the controller proper that is actuated directly by the controller-mover. Figs. 60 to 75 and 80 to 92 show different forms of the movable and stationary parts of the controller-mover designed to accomplish certain results, and also diagrams that illustrate the way in which these parts accomplish these results. Figs. 93 to 109 show different types of car switches. Figs. 110 to 117 show different arrangements of the entire invention, that is, the car switch, the circuit connections between it and the controller-mover, the controller-mover in its relation to the controller, the controller, and the controller's connections with the elevator motor.

The controller-mover consists of two parts, one of which is stationary, and acts generally as a motor field, and the other of which is movable and acts generally as a motor armature. In the following description the stationary part of the controller-mover will be designated as the field, and the movable part as the armature.

In Fig. 1 the upper portion of the diagram represents a car switch and the lower part represents magnetizing coils wound upon the field of the controller-mover, and connected with the car switch by means of the wires 1, 2, 3. The coils $a$, $b$, $c$, can be mounted upon the armature of the controller-mover just as well as upon the field, but for the present we will suppose them to be on the field. In the car switch, S is the switch lever, and it is connected with the positive side of the supply circuit through wire P. The small circles over which the end of S will pass if it is rotated are switch contacts, that are connected with a number of resistances indicated by the outer circles R. The wires 1, 2, 3, as will be seen, are connected at points equidistant so as to include between them the same number of the resistances R. Wire 1 connects at the top of the circle, wire 2 connects one-third of the circumference around to the left, while wire 3 connects the same distance around to the right. With S in the position shown, the current from P can pass to wire 1 without traversing any of the resistances R, but to reach wires 2 and 3 it will have to traverse one-third of these resistances; hence, the current in 1 will be much stronger than in 2 or 3, and as a result the magnetizing action of coil $a$ will be greater than that of either $b$ or $c$. If S is rotated to the left, the current passing to wire 1 will be reduced, and also the current passing to 3 while the current passing to 2 will be increased. This variation in current will be progressive as S is advanced, so that when it reaches the contact that is directly connected with 2, the current flowing through this wire will be the strongest one of the three. When S is rotated as far as the contact connected with wire 3, the current in the latter will be the strongest. If the resistances R between the wires have a large magnitude, the difference between the current flowing through wire 1, with S in the position shown, and wires 2 and 3 will be great, so that the magnetizing effect of coil $a$ will far exceed that of either of the other two coils. The currents passing through the three coils $a$, $b$, $c$, meet in wire N which leads to the armatures and thence to the negative side of the supply circuit, thus closing the circuit through the car switch and the controller-mover.

Fig. 2 shows an arrangement of car switch that differs from Fig. 1 only in providing four wires to convey the current to the coils of the controller-mover. This increase in the number of wires requires a similar increase in the number of coils on the controller-mover, as is clearly shown. With either one of these two arrangements, the magnetic flux developed by the coils wound on the controller-mover will rotate as switch S is rotating, keeping step with the switch and following its direction of rotation; that is, if the movement of the switch is reversed, the movement of the rotating flux will be reversed. The action can be more fully understood by reference to the simple diagrams, Figs. 3 and 4. In the first one of these if the coils $a$, $b$, $c$, are supposed to develop magnetizations in the direction of the radial lines upon which they are drawn and in a direction away from the center, it follows that if the switch S is in the position shown and the circle R is made of very high resistance material, the current passing through coil $a$ will be so much greater than that through the other two coils, that the combined effect of the latter, which will be in opposition to that of *a* will not be enough to balance the magnetization of *a*. In fact, if the resistance of R is great enough, the currents passing through *b* and *c* will be so small in comparison with that through *a* as to make the demagnetizing effect of *b* and *c* only a small fraction of the magnetizing effect of *a*. If switch S is moved to a position between wires 1 and 2, coils *a* and *b* will be traversed by currents of equal strength and as a result their combined magnetizing effect will be equal to a resultant in a direction midway between the position of the coils. In this case, the current in coil *c* will act in opposition to coils *a* and *b*, but one-half the resistance of R measured in either direction will be interposed between S and wire 3, so that the current in the latter wire will be very small and the demagnetizing action will be in like proportion. From this it will be seen that the rotation of S will cause the magnetic flux developed by the coils *a*, *b*, *c*, to rotate and keep in step with the movement of S. It will also be noticed that the currents traversing the coils *a*, *b*, *c*, do not reverse in direction, and that the result is obtained wholly by the variations in the current strength.

An examination of Fig. 4 will show that the action is precisely the same as in Fig. 3, the only difference being that four coils are used to produce the effect, instead of three.

The foregoing arrangement, while very simple, is also wasteful of electric energy, because the currents flowing in the coils act in opposition to each other and the net magnetization that is available as a magnetic field to rotate an armature is much smaller that that due to the combined magnetizing forces of all the coils. This difficulty can be overcome by the arrangement shown in Fig. 5, which is intended for cases where it is desired to obtain a strong torque in the controller-mover with a reasonable expenditure of energy. The arrangements already described are desirable in cases where a small torque is required, and where the greater simplicity is more than an offset for the additional consumption of energy. In Fig. 5, the three resistances, shown in black and marked 5, are very high in comparison with the other resistances, so that only a small current can pass through them. The end of switch S is connected with the center portion by means of the connection 4 and the section that covers contacts 6 and 7 is insulated from the balance of the switch. With the switch in the position shown, it can be seen that as the contacts 6 and 7 are connected, the high resistance adjoining wire 3 is shunted out of the circuit, and the current from wire P can pass to wires 1 and 3 by simply traversing the resistances illustrated without shading, which are much smaller than the ones shown in black. The current cannot reach wire 2 without passing through one of the high resistances 5, whether it follows the circle from the junction with wire 1 or with wire 3; hence, the magnetizing action of coil *b* will be practically nothing, and the field produced will be that due to the combined action of coils *a* and *c*. If switch S were placed directly over the contact connected with wire 1, it can be seen that practically all the current would flow into this wire, for to reach either 2 or 3 the current would have to pass through all the low resistances, covering one-third of the circle, and one of the high resistances; thus at any time the field produced in the controller-mover will be due to the magnetizing effect of either one coil, or of two coils acting together. If the high resistances 5 are made infinitely great, or in other words, if the circuit is open at 5, then the foregoing condition will be strictly true. If the resistances 5 are made sufficiently great, the reaction of the coils, or coil, acting in opposition will be so small as to be regarded as nothing, practically.

A car switch constructed upon the principle illustrated in Figs. 1, 2 and 5, will rotate the field flux of the controller-mover in step with the rotation of switch S, and the rotating field will make as many turns as S makes; hence, such construction is adapted to cases where it is desired to make the armature of the controller-mover rotate through one or more complete revolutions. In cases where rotation through a portion of the circle is required, the car switch can be considerably simplified as is clearly shown in Fig. 6, which illustrates a switch that is capable of imparting a rotation of the controller-mover armature through some angle of less than 120 degrees, the exact angle depending upon the magnitude of the resistances R. In this diagram, it will be seen that with S in the position shown, the current passes directly to wire 1 and coil *a;* but must pass through one-half the resistance R to reach wires 2 and 3. If the sum of the resistances R, between wire 1 and either one of the side wires is great, the current passing to these wires will be small, and the opposing action of coils *c* and *b* will be small. For the same reason, when the switch S is moved to the extreme left side contact, the current passing to wire 1 will be very small and that to wire 3 will be only about one-half as great as that through 1, so that the direction of the magnetic flux developed in the field of the controller-mover will be nearly parallel with that of coil *b* or nearly 120 degrees from the flux of coil *a*. If the resistances R are not very great, the current passing from S to wire 1, when S is on the left side contact, will not be very small and then the actual magnetic flux in the field of the controller-mover will not be nearly parallel with that developed by coil *b*, but will form a considerable angle with it. It is clear that the lower the resistance R, the stronger the current passing through wire 1 when switch S is in the extreme side position, and, the greater will be the angle between the field flux and the flux developed by coil *b;* or, in other words, the smaller the angle through which the field flux is rotated. Hence, if we desire to give the armature of the controller-mover a motion of nearly 120 degrees, we must make the resistances R very high, because the lower they are made, the smaller will be the movement of the controller armature.

By varying the magnitude of the resistances R any angular movement of the controller-mover, between zero and 120 degrees, can be obtained, but to obtain a movement of nearly 120 degrees the resistances would have to be too great to be practical, owing to the fact that they would make too great a difference in the magnitude of the torque of the armature. To obtain a movement of less than 60 degrees, the resistances R would have to be so low as to cause the reaction of the side coils to be great enough to be objectionable. For angular movements less than 60 degrees, the best course of procedure is to reverse the direction of the current through the coils *b* and *c*. This will be more fully understood by reference to Fig. 7, which also gives a clearer idea of the way in which the coils are disposed on the field of the controller mover, and also of the way the armature coil of the latter is connected in the circuit. In addition, this diagram shows some features that have not been explained up to this point. As will be seen, there are coils *a a*, *b b* and *c c*, mounted upon the field and one coil on the armature A. The currents from the three sets of field coils unite and are passed through the armature coil. No connections are shown between the pairs of coils, but it will be understood that the two coils *a* are connected with each other, as are also the two coils *b*, and the two coils *c*, and these pairs of coils are so connected that each coil develops a magnetic flux in the direction indicated by the arrow drawn upon it. With S in the position shown, all the coils act to develop a magnetic flux that will pass through the armature in a vertical direction, and the coil on the armature acts so as to develop a flux that is in the same direction, and therefore exerts an effort to place itself parallel with the field flux; that is, in the position drawn.

In Fig. 6, when the switch S is in the central position, the current from P can pass unobstructed to coil *a*, but this is objectionable in most cases, as it is desirable to save current when the elevator motor is not running, which is the case when S is in the central position. In Fig. 7 a resistance is shown at 6 in the wire 1, which serves to cut down the current passing to coils *a, a*, when S is in the position drawn. The current can also be cut down when the switch is in the central position by introducing resistance in wire P, as is shown in several of the diagrams not yet considered; and in many cases this is the only means permissible, as the resistance 6 cannot be used.

In Fig. 7, if we consider the switch S to be moved to the extreme right contact, the maximum current will pass through wire 3 and coils *c, c*, and the field flux will be rotated 60 degrees counter-clockwise, less the reaction of the four other coils, which, as explained in connection with Fig. 6, can be made small by increasing the magnitude of the resistances R, or large by reducing these resistances. If it is desired to obtain a rotation of the armature of more than 60 degrees and less than 90, it can be accomplished by connecting the field coils in the way illustrated in Fig. 8, in which the two coils *c* are on one side of the vertical diameter, and the two coils *b* on the opposite side, the connections with the wires 2 and 3 being made so as to develop magnetic fluxes in the direction indicated by the arrows drawn on the coils.

The center contact of the switch in Fig. 7, it will be noticed, is much wider than any of the other contacts, and this proportion is preserved in the switches shown in the succeeding figures. The object of this arrangement is to obviate the liability of reversing the direction of rotation of the controller-mover armature, if, in moving the switch back rapidly to the stop position, it is carried a trifle beyond the central position.

Fig. 9 is a modification of the switch shown in Fig. 7, which acts to keep the torque of the controller-mover armature more constant by preventing the decline in the current passing to wire 1, when the switch is moved to either side. As will be seen, the elongated contact 7 carries the current directly from S to wire 1, no matter where S may be, and the rotation of the field flux is effected wholly by the increase in the strength of the current in the side wire toward which the switch is moved. If S is moved toward wire 2, the resistance in the circuit of this wire is cut out, and the current increases, but the current flowing through wire 1 remains unchanged, and so does that through wire 3. This type of switch is suited to a movement of sixty degrees or a trifle more, but cannot be used for a movement of 120 degrees.

Fig. 10 shows a switch which is constructed upon the same principle as Fig. 5. As will be seen, the two resistances 5' and 5 are drawn larger than the others and are shaded. These resistances are the counterpart of resistances 5, in Fig. 5, and are much greater than the resistances R. The central portion of the switch S and the end are electrically connected the same as in Fig. 5; the connection being indicated by the line 9. The portion of S between the center and the end is insulated therefrom, and is long enough to lap over the contacts 7 and 8 so as to short circuit the resistance 5' or 5, according to the direction in which the switch is moved. With the switch in the stop position, as shown, very little current will pass to the side wires 2 and 3 as it must traverse the high resistances 5' or 5. If the switch is moved to the right, resistance 5 will be short circuited, and then a comparatively strong current will pass to wire 3, which will increase in strength as the switch is advanced. Thus it will be seen that with this type of switch the direction of the field flux is determined wholly by the strength of the currents flowing in two coils, as the current flowing in the remaining coil, which acts in opposition, is so small as to not be worthy of notice practically.

Fig. 11 is a design of switch which is an elaboration of Fig. 10. In addition to providing the high resistances 5' and 5 to prevent the current from flowing to the reacting coil, it has contacts by means of which the current passing to the center wire 1 can be varied. The two sides of the switch are arranged differently so as to illustrate two modifications. If the switch is moved to the right, on the first step it cuts out the high resistance 5, so that the current can reach wire 3 by traversing all the resistances R, and can reach wire 1 by passing through 6. When the switch is moved to the second step, the current passes through three resistances R to reach wire 3, and through the first resistance R to reach the center wire. On the third step the current passes through two resistances R to reach wire 3, and through the other two to reach wire 1. On the fourth step the current passes through one resistance R to reach the wire 3, and through the second and third resistance R to reach the center wire. On the last step the current passes directly to wire 3 and traverses the last resistance R to reach the center wire. If the switch is turned to the left, the resistance will be cut out of wire 2 in the same way as when moved to the right, but the current passing to the center wire will traverse the first resistance R at the second step, the second resistance R at the third step, the second and third resistances R at the fourth step, and the last resistance R and resistance 9' on the last step.

Fig. 12 shows two more arrangements of the switch contacts. If the switch S is turned in either direction, the resistances R are cut out of the side wire one by one as the switch advances step by step, but in the center wire the variation in the resistance is different in the two cases. If the switch is moved to the right, the first step cuts out high resistance 5. The second step does not change the resistance. The third step cuts in the second resistance R. The fourth step cuts out the second resistance R and cuts in the third resistance R. The last step cuts in all the resistances R, and also 5. In this last step all the resistances are cut into line 2. This arrangement is well adapted to give a rotation of the field magnetism of the controller-mover of 60 or 120 degrees, if the coils are connected as in Figs. 6 and 7, or of 90 degrees if connected as in Fig. 8. If the switch is moved to the left, the first step cuts 5' out, and the second and third steps cut in the first, and the first and second resistances R, respectively. The fourth step cuts out the first and second resistances, and cuts in the third R, and the last step cuts all the resistances into the center line.

Fig. 13 shows another modification in which the high resistances 5' and 5 are made infinite, that is, are replaced by open circuits, so that with S in the central position all the current passes to wire 1, and when S is moved to the right no current passes to wire 2, while when it is moved to the left no current passes to wire 3. In moving over the first four steps, the current passes directly to the center wire, and the resistance in the side wire is gradually cut out. On the last step all the resistance is cut out of the side wire, and the circuit through the center wire is opened.

Fig. 14 shows another arrangement in which the resistances R are cut out of the side wire in the first three steps, and are then cut into the center wire during the remaining steps. This arrangement, as will be presently shown, acts to maintain the torque of the controller-mover nearly constant.

Many other arrangements of the switch contacts can be made, but those here furnished are sufficient to fully illustrate the general principle of construction. It will be understood that in the figures where the contacts are arranged in different order on the two sides it is not intended to represent switches so constructed, but simply to show two modifications in one diagram, and thus avoid encumbering this application with an unnecessary number of drawings.

By the aid of the vector diagrams, Figs. 15 to 23, the effect that the various forms of switches shown in the preceding figures have upon the torque of the controller-mover can be readily illustrated. From an examination of Fig. 7 it can be seen that the torque of the armature A of the controller-mover is due to the effort made by the magnetic flux developed by the coil on the armature, to place itself parallel with the flux developed by the combined action of the coils $a$, $b$, $c$, wound upon the field. The magnitude of the torque will vary with the magnitude of the two magnetic fluxes, being proportional to their product. In the vector diagrams the variations in the magnitude of the field flux only are shown, and for simplicity this variation is assumed to be directly proportional to the variations in the strength of the currents traversing the coils $a$, $b$, $c$, which assumption would be strictly correct if the permeability of iron were constant. As the armature flux will increase and decrease with the field flux, and as the torque is proportional to the product of the two fluxes, the variation in the torque will be greater than the variation in the field fluxes, as shown in the vector diagrams, being more nearly as the square of these variations; but this is only a difference in degree, so that for the purpose of this illustration the field flux diagrams will answer as well as the actual torque diagrams.

The diagram Fig. 15 shows the magnitude of the field fluxes developed with switches of the types shown in Figs. 1 and 6. With this switch, when the switch is in the central position, the current passing to wire 1 is much stronger than the currents passing to the side wires; hence, it can be represented by the vector $a$ in Fig. 15, while the smaller vectors of equal length drawn in the directions $b$ and $c$, 120 degrees from $a$, can represent the currents in the coils $b$ and $c$. Assuming the magnetic fluxes to be proportional to the current, these vectors will represent the fluxes developed by the three coils. Coils $b$ and $c$ act to develop a resultant in opposition to $a$ and of a magnitude equal to the radius of the smaller circle, so that the net magnetization in the direction $a$ will be equal to the difference between the radii of the two circles. If the switch is moved to the left, some of the resistance R will be introduced into wire 1, thus decreasing the current strength, and as this same resistance is removed from wire 2 the current in the latter will increase. The resistance in wire 3 is also increased so that the current in the latter will be reduced. For a certain position of S between the center and the extreme left the respective values of the fluxes will be as illustrated in Fig. 16, in which $o\ a'$, $o\ c'$ are smaller than the corresponding vectors in Fig. 15, and $o\ b$ larger. As is shown in the diagram the net magnetization is $o\ e$, which is smaller than the net flux in Fig. 15. When S is moved to the extreme left, the flux of coil $c$ will be about one-half as great as in Fig. 15, as is shown in Fig. 17, and the flux of $a$ will be equal to the radius of the smaller circle, while the flux of $b$ will be equal to the radius of the larger circle; thus giving the resultant net flux $o\ e'$, which is greater than the values shown in Figs. 15 or 16. Thus it will be seen that this type of switch does not give a constant field magnetization, hence the torque will not be constant, but will diminish with the first movement of the switch from the central position, and after reaching a minimum value will begin to increase, reaching a maximum when at the extreme side position, the flux locus curve being $a$, $e$, $e'$, which is an asymptote to $o\ b$. It will also be seen that unless the resistances R are very large, the reaction of the coils $b$ and $c$ will be so great as to make the net magnetization small in comparison with the magnetizing currents used.

The actual strength of the currents flowing through the three sets of coils for different positions of the switch S will depend not only upon the magnitude of the resistances R, but also upon the resistance of the coils, but changes in the magnitude of either of these resistances will only affect the relations illustrated in Figs. 15 to 17 in degree. If the switch is constructed as shown in Figs. 5 and 10, with the high resistances 4 and 5, the fluxes developed by coils $b$ and $c$ will be much smaller, when S is in the central position, as is shown in Fig. 18, and the net magnetic field in the direction of $a$ will be considerably increased. If the contacts 7 and 8 of Fig. 10 are provided, to cut out the high resistance coil, the flux of $b$ will be greatly increased as soon as S is moved to the first contact to the left, and then the net magnetic field will be virtually the resultant of $a$ and $b$, the former decreasing and the latter increasing as S is advanced, thus giving a more nearly uniform torque than switches of the type of Fig. 6. If the switch S is made solid, as in Fig. 9, so that the short circuiting section is not insulated from the other part, the current passing to wire 1 will remain constant for all positions of S, and then the net magnetization will be the resultant of a constant flux equal to $a$, and an increasing flux in the direction of $b$, thus giving diagrams such as shown in Figs. 19 and 20, with the straight line $a\ e'$ parallel with $o\ b$, as the flux locus. With this arrangement the torque will vary but slightly while the flux is rotating through about 60 degrees; but after that will increase rapidly, and would become infinite at 120 degrees; hence, this type of switch is well adapted to give a fairly constant torque for an angular movement of 60 or 70 degrees; but cannot be used for greater ranges, unless increased torque is required as the switch advances beyond the limit just named.

If the switch is arranged in the manner indicated in Figs. 11 and 12, so that the resistance introduced in the wire 1 may be increased as S advances, then the flux developed by coil $a$ will gradually reduce, and while with S in the central position the fluxes of the three coils $a$, $b$, $c$, will be as shown in Fig. 18; the values for other positions will be as is illustrated in Fig. 21, in which $o\ e$ represents the net magnetic flux when S has advanced far enough to reduce the flux of $a$, to the value of vector $o\ a'$. When S is advanced further, so as to reduce the flux of $a$ to the value of $a\,o''$, the net magnetization will be $o\,e'$, the flux locus being $a\,e\,e'$ which is nearly concentric with the pole O. Thus it will be seen that by providing additional contacts as shown in Figs. 11 and 12, so that more or less of the resistances R may be introduced into the circuits, or so that one may be cut out, and another of different value be substituted for it, it is possible to obtain a magnetization in the field of the controller-mover, that is much nearer to uniformity than with the arrangements of contacts shown in Fig. 10.

If the switch is arranged as in Fig. 14, the current passing to coil $a$ will remain constant during the first half of the movement of S toward the side position, and the resultant magnetization of the controller field will move along the line $a\,e$ in Fig. 22. During the following half of the movement of S, the current passing through coil $b$ remains constant as S slides along contact 10 and no resistance is cut in or out of wire 2. The current in coil $a$, however, will gradually reduce as the resistances R are cut into the circuit of wire 1 as S advances; hence, the magnetization of the controller-mover field during the last half of the movement of S will follow the line $e\,e'$ in Fig. 22. Thus the line $a\,e\,e'$ is the flux locus curve. If it were not for the reaction of coil $c$, the vectors $o\,a'$, $o\,e$ and $o\,b$ would be of the same length and the difference in magnitude of the field flux for different positions of S would be small. This result can be accomplished by replacing the high resistances in Fig. 14 by the open circuits shown in Fig. 13, and then we will get a locus curve such as is shown at $a\,e\,b$ in Fig. 23.

The fluxes developed by the coils $b$ and $c$ when S is in the central position is much smaller in practice, than shown in the diagrams (Figs. 15 to 23). It is exaggerated in these illustrations so as to make them more distinct, but drawing them on an enlarged scale also serves to make the variation in the magnitude of the controller-mover field less than it really is. To show that such is the case, suppose that in the switch Fig. 6 the coils $a$, $b$, $c$, have a resistance of ten ohms each, and that the resistances R between the center and either side measure 100 ohms, then the current through coil $a$ with S in the central position will be eleven times as great as the currents through $b$ or $c$, thus making the vector $o\,a$ in Fig. 15 eleven times as long as vectors $c$ and $b$. As the resultant of these two vectors is equal to 1, the net field in the direction of $a$ will be equal to 10. If we now move S to a position midway between the center and wire 2, the resistance in circuits 1 and 2 will be 60 ohms, thus making the current and the magnetic fluxes one-sixth of the value of the net magnetization when S is in the central position. As $a$ and $b$ are 120 degrees apart, their resultant is equal to either one of the components, so that for this position of S the net field is one-sixth of the value that it has with S in the central position. It is really less than one-sixth, because we have not deducted the reaction of coil $c$, and we have assumed that the current through coil $a$ will be the same as that through coil $b$, which is not the case, because part of the current passing to wire 1 continues on to wire 3. The sum of the currents passing through the three wires would be about one-third of that passing through coil $a$, with S in the central position, so that the difference in the torque in the two positions would be about in the proportion of 18 or 20 to 1.

From the foregoing, it will be seen that in cases where it is necessary to obtain a nearly uniform torque in the controller-mover, it can only be obtained by adopting a construction similar to those outlined in Figs. 11 to 14.

If a controller is small and handles weak currents, it will not require a very large controller-mover to operate it, and in such a case it may be immaterial whether the torque of the latter is uniform or not, so long as the minimum torque is sufficient to actuate the controller. If, however, the controller is large and handles currents of several hundred amperes, it will require a correspondingly large torque to move it, and in that case the controller-mover will have to be of large dimensions and will consume a correspondingly large amount of electrical energy. In order to economize energy as well as to avoid making a controller-mover of excessive size, it is necessary in such cases to provide a car switch that will effect such variations in the currents passing through the coils $a$, $b$, $c$, as may be required to develop at every position of the switch S a torque sufficient to actuate the controller or only a trifle more. If one design of controller could be used for every possible case, then one design of controller-mover, and one design of car-switch would be sufficient, and the only change required in any case would be in the size. In practice, however, many types of controllers must be provided some being made to meet special requirements, and others to suit the fancy of purchasers. All these different types of controllers do not require the same effort to operate; in some a uniform torque may be required, in others the torque may increase gradually, and in others it may increase and decrease in passing from step to step. All the controller switches actuated by the controller-mover may be of the same kind and size, and the same number of them may be moved at each step, in which case the torque would be nearly uniform. If, however, one switch is operated at one step, and five or six at another, the torque required will not be uniform, but will increase and decrease with the number of switches moved.

In some controllers some of the switches may be small and carry currents of a fraction of an ampere, as would be the case if they were intended to open or close the circuit through magnets that actuate larger switches. Other switches of the same controller may be for large currents, probably several hundred amperes, and of massive construction. On some of the steps one or more of the small switches may be moved, while on other steps several of the large ones may be moved; hence, in such a controller the effort required to move the switches will be quite variable, and the variations may not be with any degree of uniformity. Thus it may require a torque of two or three inch-pounds to move the controller to the first step, and it may require one hundred inch-pounds to move it to the second step, and then drop to thirty or forty pounds for the next step, and so on, increasing or decreasing without regard to any order in passing from step to step. Now a controller-mover to operate such a controller must either be large enough to overcome the maximum resistance at the point where it is required, regardless of how much in excess of the requirements its torque may be at other points, or it must be made so as to vary its torque substantially in keeping with the effort required to move the controller. If the controller-mover is designed without any regard to the manner in which its torque varies, and without any regard to the manner in which the effort required to move the controller varies, it may happen that the greatest resistance interposed by the controller to being moved will occur at the very point where the torque of the controller-mover is the smallest, and if such is the case, the controller-mover will have to be made of very large size in comparison with the average work it has to perform. Before the designer can determine what arrangement of resistances and contacts must be used in the car switch, he must ascertain the kind of controller to be operated, and the torque required in the controller mover at each step. Having this data, he can proceed in the manner indicated in the explanations of the preceding figures, to calculate the magnitude of the resistances that must be introduced into the circuits of the several coils at each step, and the proper location and connections for the switch contacts. The diagrams of car switches here presented represent imaginary cases, taken at random, simply for the purpose of illustrating the general principle to be followed in designing a switch to meet any particular case.

As a vast number of different arrangements of controllers can be made, it follows that there can be a vast number of different arrangements of contacts and resistances in the car switch, and I therefore do not confine myself to the precise arrangement of contacts and resistances here shown, in fact, in practice I may never use an exact duplicate of any of the diagrams here presented, as the actual conditions to be met in any case may never be those for which any of the diagrams is best suited. The determination of the proper design for the car switch may be regarded as a problem that can be solved by the methods outlined in the preceding pages, when the data, regarding the magnitude and variations in the torque of the controller-mover are given, and I propose to use any arrangement or combination of resistances and of switch contacts that may be required to develop in the controller-mover a torque of such character as may be necessary in any case.

All the switches shown in the illustrations so far explained are arranged so as to take a current from the supply circuit through wire P and divide it into three branches, which after traversing the three coils on the controller-mover field, come together in wire N and then pass to the armature of the controller-mover, and from there back to the supply circuit. The only exception to this arrangement is Fig. 2, which shows an arrangement for dividing the current into four branches. The switches that split the current into three branches, I call "three-current switches" and the controller-movers actuated thereby I call "three-current controller-movers." Switches of the type shown in Fig. 2 which divide the current into four branches, I call "four-current switches" and the controller-movers they operate I call "four-current controller-movers."

Fig. 24 shows a type of switch that divides the current derived from the supply circuit through wire P into three alternating currents, that are out of phase with each other 120 degrees, thus constituting a three-phase system. Switches of this type I call "three-phase switches" and the controller-movers actuated thereby I call "three-phase controller-movers." In Fig. 24, $A^z$, B and C represent three switches set 120 degrees apart, and secured, each one to one of the rings $1'$, $2'$, $3'$, A being connected with ring $1'$, B with ring $3'$, and C with ring $2'$. The switch contacts $5^z$ and $6^z$ are made preferably so as to cover an arc of 60 degrees, although they can also be replaced by a number of small contacts of the size of those on the sides, marked $4^z$, as is clearly indicated at the lower part of the diagram, in dotted lines. The contacts $4^z$ as well as $5^z$ and $6^z$ are connected with each other through the resistances R, which latter are made of increasing magnitude as they approach the horizontal line. With the switch in the position drawn, the current from P can pass to $A^z$, and if a brush is placed on ring $1'$, a current can be taken off to an external circuit. This current is returned through two wires, one being connected with ring 2', and the other with ring 3'. From these rings the two currents will pass to C and B and then through two of the resistances R, and thus reach contact $6^z$ and return to the supply circuit. If the switch is rotated clockwise, when $A^z$ reaches line 7, B will lap on the end of $6^z$ and C will be in the horizontal position, so that all current reaching $A^z$ from P will pass through ring 1' to the external circuit and return to ring 2' and B, and through $6^z$ to N; and no current will flow through the wire connecting with ring 3' and brush C. When $A^z$ is advanced to line 8, C will be in a corresponding position on the left side of the circle, and B will rest on the center of $6^z$. The current from P will now pass out to the external circuit through $A^z$ and C, and return through B. When $A^z$ reaches line 9, C will rest on the left end of $5^z$, and B will be on the left end of $6^z$, and the current from P will pass out to the external circuit through C and return through B, and no current will flow through $A^z$. When A reaches the position of B, C will be in the position of $A^z$, and the current will now pass out to the external circuit through C and return through $A^z$ and B.

From the foregoing, it will be seen that while $A^z$ is moving from the vertical position to the horizontal the current passes out to the external circuit through it and ring 1', but at the horizontal position the current passing out through $A^z$ is reduced to zero, and when the horizontal position is passed, the current begins to flow in from the external circuit through $A^z$; hence, in the wire leading to the external circuit from ring 1', the direction of the current reverses as $A^z$ crosses the horizontal line. This is true with respect to the currents flowing through B and C. If contacts $5^z$ and $6^z$ are replaced by smaller contacts, as shown at $6^z$, the current flowing in $A^z$ will be of the maximum value when in the position shown, and will again reach the maximum value but flowing in the opposite direction when $A^z$ has made one-half a revolution. When $A^z$ completes three quarters of a revolution the current through it again becomes zero, and as it advances from this position the direction of the current reverses. Thus it will be seen that in each one of the circuit wires connected with brushes $A^z$, B, C, through the rings 1', 2', 3', the currents become zero when the brush crosses the horizontal line on either side of the figure, and are positive while the brush swings around the upper half of the circle and negative while it swings around the lower half. If the resistances R are properly proportioned, the currents flowing in the wires connecting with $A^z$, B, C, will be sinusoidal. With the long contacts $5^z$ and $6^z$, the current in each wire reaches the maximum value when the switch is advanced 30 degrees from the position shown, so that one brush is on line 7 and the other on the right hand end of $6^z$. Another maximum is reached when the brushes are in the same position on the left side of the circle, so that the currents will have two positive and two negative maximums. Inasmuch as the controller-mover is not a continuously rotating machine, and as the main object of obtaining the alternating currents is to be able to develop thereby a rotating magnetic flux, the irregularity in the wave form of the current is of little consequence, and is fully compensated for by the increased simplicity of the switch. This type of switch can be further simplified by connecting the contacts on opposite sides of the circle with each other, as is shown in Fig. 25. If this is done, one-half the resistances R can be removed, that is, all the resistances on one side of the figure.

If the connection between $5^z$ and $6^z$ is made continuous through the resistances R as is shown on the left side of the diagram, there will be a leakage of current through this channel, but if the sum of the resistances R is high, as it would be in practice, this loss would be trifling. The connection between the seristances can be broken at the center, as is shown on the right side of the diagram, the center contact being divided in two parts, $a, a$, and the line connecting the resistance being broken. The only objection to opening the circuit at this point is that a severe spark will be produced, at $a$, owing to the fact that the field coil of the controller-mover will discharge when the circuit is broken, and if the resistance of the coils is considerable the spark may be so large as to soon get the car switch out of working condition, unless it is made very large, so as to have contacts of sufficient size to withstand the sparking.

The arrangement of the external circuits derived from this type of switch can be understood from Figs. 26 and 27, the first of which illustrates the coils of the controller-mover field, $a, b, c$, connected in star, and the second shows them connected in delta fashion. This type of switch is adapted to cases where it is desired to have a controller-mover that will make a number of revolutions. The armature coil of three phase controller-movers is connected in the main circuit of the car switch, that is, either in wire P or in N. In most cases the controller can be arranged so that it will effect all the circuit combinations required to accelerate the speed of the elevator, or to run it at different velocities, in a small number of steps, somewhere between five and twelve; therefore, if a controller-mover is used in which the armature makes a number of turns, each turn will represent rotation through a rather large angle. Thus if the controller makes ten steps, and the armature of the controller-mover rotates through two-and-one-half revolutions each step will be 90 degrees. Owing to this fact, the rotating switches used with such controller-movers can be very much simplified.

Fig. 28 shows a simplified form of Fig. 2 designed to rotate 90 degrees for each step. If the current used by the controller-mover is small, all the resistance between the wires can be cut out in one section, and the switch can be arranged as shown in the upper and lower quadrants of Fig. 28, so that if S is moved one step to the left it cuts out the resistance R all at once. If the current is strong enough to cause an objectionable spark with this arrangement, the resistance can be divided into two sections as is shown in the quadrant on the left side of the diagram. If the current is very small, the resistances can be removed as is shown in the quadrant on the right side of the figure. In this case, the current will pass through one coil of the controller-mover at a time.

Figs. 29 and 30 show two simplifications of the three-phase switch Fig. 24. In both these diagrams, it will be noticed that the contacts on opposite sides are connected as illustrated in Fig. 25. In Fig. 30 if it is desired to have the circuit between the top and bottom contacts broken, it can be done by discarding the large resistance R and using only the small ones R' as is indicated in dotted lines on the left side of the figure. This same arrangement can be made in Fig. 29 by replacing the middle contact by two contacts and breaking the connection between the resistances, as is shown in the right side of Fig. 24.

Fig. 31 is a simplification of Fig. 5 and can be used to rotate the controller-mover armature either 60 or 120 degress at each step. These rotating switches as will be shown in other illustrations are arranged so as to be driven by means of sprocket wheels and a chain, or by means of gearing, so that the lever that the operator moves may be moved through only a small arc of a circle. It would not be desirable to have the handle the operator moves revolve, for it would interfere with making a quick stop; and in addition might cause confusion, as sometimes the operator would not know whether he had returned the handle to the stop point or was one revolution short of it. The rotating switch can be replaced by one that does not rotate and which at the same time causes the controller-mover armature to rotate. To do this, all that is necessary is to roll out the rotating switch to a much larger diameter. Thus if we suppose Fig. 31 to be cut on one side of the diameter and rolled out and several such rolled out switches connected with each other, end for end, we will have a switch of much larger radius that will only cover a small arc of a circle. Diagrams 32 to 35 show switches of this type.

In Figs. 32 and 33, which are switches of the same type as Fig. 30, the small circles represent the contacts, which may be regarded as being placed side by side on the surface of a cylinder, that is, if the paper containing the drawing is bent into cylindrical form the circles will show the position of the contacts, and the lines connecting them are the wire connections. The switch is shown at S and consists of the three insulated brushes or sections, $a, b, c$. This switch will rotate the armature through three revolutions when S is moved over the contacts from the center line to either end. As will be noticed, the lines 1, 2, 3, 4, connect in parallel all the contacts that hold the same position in the circle, or would, if the diagram were coiled up so as to form six complete revolutions.

By placing the brushes $a, b, c$, one ahead of the other, it becomes unnecessary to provide three rows of contacts, and then we get the arrangement of contacts shown in Fig. 33. The brushes being shown in the center position at S, one ahead of the other, as indicated by the letters $a, b, c$. Although this arrangement simplifies the switch it also increases the arc covered by the contacts in making the same number of revolutions of the controller-mover armature.

Figure 32:
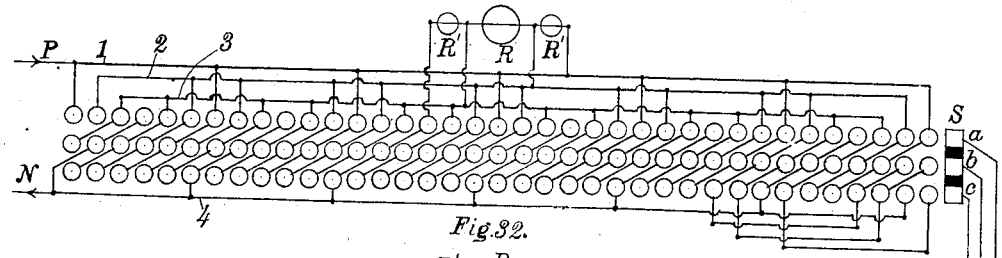
Figure 33:
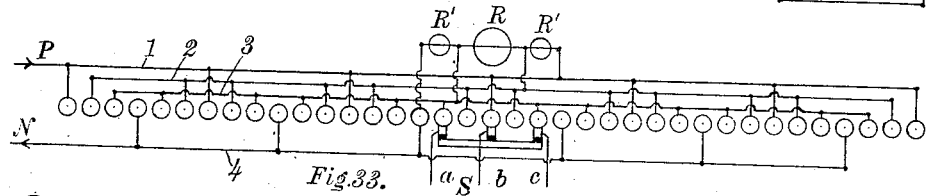
Figure 34:
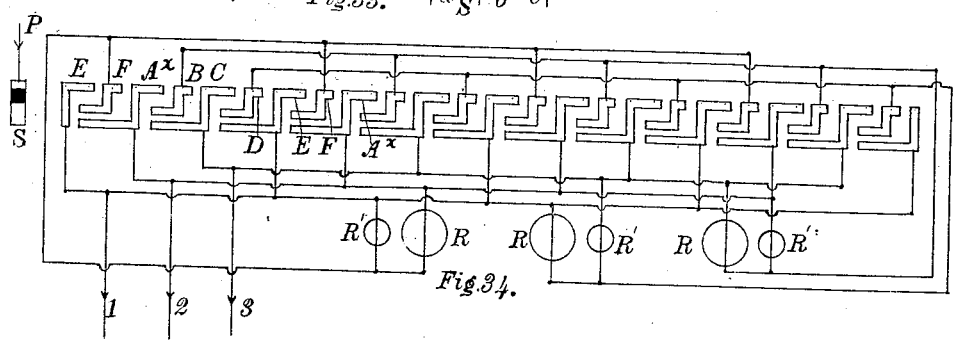
Fig. 34 shows a switch arranged to rotate the armature of the controller-mover through two revolutions, and it is the same in principle as Fig. 31, the contacts $A^\times, B, C, D, E$ and $F$, being arranged and connected with each other in the same order as the similarly lettered contacts in Fig. 31.
Figure 35:
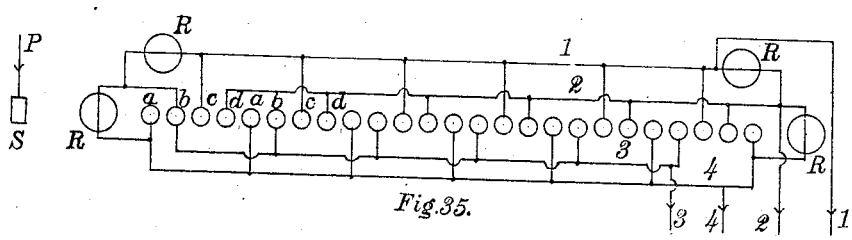
Fig. 35 shows a four-current switch of the type illustrated in the upper and lower quadrants of Fig. 28, and with the number of contacts shown will rotate the controller-mover armature three revolutions in either direction.

In Figs. 32 and 33 the wires P, N, are connected with opposite sides of the supply circuit, and wires $a, b, c$, are connected with the coils on the controller-mover. In Figs. 34 and 35, the switch S is connected with one side of the supply circuit, and the numbered terminals leading from the lower side of the diagrams are connected with the coils of the controller-mover.

In an application filed by me on April 24, 1901, Serial No. 57,166, a controller-mover is shown which is arranged in the manner illustrated in Fig. 36. This is a two-current system, the current entering through P being divided into two branches that pass through wires 1, 2, and through coils A, B, mounted on the controller-mover. The two branch currents come together in N and pass through a coil on the armature and then to the supply circuit. This type of controller-mover with the simple arrangement of switch shown in Fig. 36 will not give a torque that is any where near constant, and furthermore it cannot be made to vary the torque in any manner that may be required, without materially changing the arrangement of the switch contacts and resistances. That such is the case can be readily seen from an examination of the vector diagrams, Figs. 37 and 38. The first of these shows that if the fluxes developed by the coils A and B are $o\,a$ and $o\,b$, respectively, when the switch is in the central position, the resultant flux will be $o\,c$. If S is moved so as to strengthen the current in B its flux will increase to say $b'$ while the flux of A will decrease to $o\,a'$ which give the resultant $o\,c'$, which is considerably greater than $o\,c$. If S is moved to the extreme side position the flux A will reduce to about one-half $o\,a$, that is, to $o\,a''$, and the flux B will increase so as to give the resultant $o\,d$. To cause the resultant flux to rotate to within a small angular distance of $o\,b$ it is necessary that the switch resistances R R be very large so as to produce a great difference between the fluxes $o\,a$ and $o\,b$ when S is at the extreme side position. If, however, the resistances R are very large, the values of the fluxes $o\,a$ and $o\,b$ will be small when S is central, so that $o\,c$, for the central position, may not be more than eight or ten per cent. of its value when S is at either side of the switch. This variation of ten or twelve to one in the magnitude of the flux will produce a difference of fifty to one or more in the torque, so that the device shown in Fig. 36 is useful only for very small controller-movers. The torque can be equalized, however, by resorting to the expedient of introducing resistance in the wire P as S is advanced from the central position, as is made clear in Fig. 38. Suppose that when S advances far enough to develop the fluxes $o\,a'$ and $o\,b'$ giving the resultant $o\,c'$, that a resistance is introduced in P so as to reduce the current in that wire. This reduction will affect wires 1 and 2 proportionately so that the fluxes will be reduced to $o\,a$ and $o\,b$, giving the resultant $o\,c''$ which is in the same direction as $o\,c'$ but shorter. Further advance of S will carry the resultant flux along the curve $c''\,c'''$ and if at another point a second resistance is cut into wire P the resultant can be again cut down. In this way the locus of the resultant flux would be given a serrated form, and by adding a sufficient number of resistances to wire P, the torque could be kept practically constant or could be made to vary as desired from step to step.

Fig. 39 shows a switch of the two-current type arranged to cut into wire P resistances R' and R'' as S advances from the central position, thus modifying the torque of the controller-mover in the manner illustrated in Fig. 38. When S passes beyond contact 4, R' is cut into P and when S passes beyond 3, R'' is cut in. By increasing the number of contacts 3, 4, and the resistances R' R'' any desired modification of the torque can be effected.

Fig. 40 shows another form of two-current switch with which the torque can be kept more uniform than with the arrangement of Fig. 36 and by the insertion of resistances in P can be made to vary in any manner desired with less complication. In this switch, when S is central it laps over contacts 5 and 6, thus passing current to wires 1 and 2 without resistance. If S is moved to the right, the current will pass through 5 directly to wire 2, thus remaining of the same strength in this wire for all positions of S. To reach wire 1, it will have to traverse the resistances P', the number of these introduced in the circuit increasing as S advances.

Fig. 41 shows another form of two-current switch with which it is possible to obtain any desired variation in the torque without resorting to the expedient of introducing extra resistances in the wire P. The switch S is shown in the central position, and the resistances R R' are drawn of different sizes, so as to indicate more clearly that they vary in magnitude. The resistances between S and wires 1 and 2 with S in the central position are equal as the diagram shows. If S is moved upward, the resistances between it and wire 1 increase, while those between it and wire 2 decrease, thus increasing the current in the latter wire and reducing it in the former. It can be seen at a glance that on any step the ratio between the resistances on both sides of S can be made anything desired, so as to swing the resultant flux to any required angle and at the same time the magnitude of the resistances can be made whatever is necessary to develop a torque of any required magnitude.

The size of the controller-mover required to actuate a given controller is governed by the heating effect of the current that passes through it, hence an expedient that will result in cutting down the current strength permanently or temporarily is desirable, as it will render it possible to reduce the size of the controller-mover. Fig. 42 shows an addition to the switch which serves to reduce the strength of current flowing through the controller during a considerable portion of the time it is in service. As will be seen, the end contacts 6, 6, are elongated. When S first reaches contact 6 it swings the resultant flux around to the final position, and the further movement of S causes it to pass off the end of contact 3'' and thus introduce the resistance R into the wire P. This resistance is made so high that the current passing through the controller-mover is just enough to hold the armature in its position, but no more, so that during the time the elevator is running at full speed the current passing through the controller-mover is reduced to a fraction of what is required to actuate the controller. With two-current switches, the contact 3″ in most cases will have to be made so that it is in contact with S when in the stop position, because the resistance R in conjunction with R′ R″ and the main resistances of the switch would cut the current down to such a small value that it would not be able to hold S in the central position with any certainty.

Fig. 43 shows a simple form of three-current switch provided with the elongated end contacts, 6″, 6″, and the contacts 4″ to cut the resistance R′ into wire P when the switch is turned to the last step, and the elevator is running at full speed. With three-current switches, the resistance should be cut into the wire P when S is central, as can be clearly seen from an inspection of the illustration, hence the contacts 4″ are made so as to separate from S in this position.

An elevator-controlling system to be complete must not only provide means whereby the car may be started and stopped and accelerated or retarded at different rates and run at different velocities, but it must also provide means whereby the motor may be stopped, positively when the car reaches the limit of its travel, in either direction; and also when the cables become slack from any cause, or when the speed becomes too great. If the motor is shunt wound a speed governing device is not required as a properly proportioned shunt motor cannot run away. With compound wound motors, speed governing devices are generally required, but as I prefer to use shunt wound motors, I have not devised any special form of speed regulating device to form part of this controller system. When such is required, I may use any of the well-known devices commonly used.

The arrangement shown in Fig. 44 is one of several devices I propose to use to stop the car automatically at either end of its travel. The spindle upon which the switch lever S is mounted carries a lever on the end that projects beyond the side of the elevator car. This lever carries insulated contacts 6′ and 7′ which are connected, one with wire P, through wire 4, and the magnet 3, and the other with the center of the switch by means of wire 5$^a$. If the car is running, S will be turned to one side or the other and will carry with it the contacts 6′ and 7′. At each end of the elevator well, metallic strips are placed in a position where they will be traversed by these contacts if the switch S is in the side position. As soon as 6′ and 7′ come in contact with the metallic strip on the side of the elevator well, the circuit from wire P, through magnet 3, wire 4 and wire 5$^a$ to the center of the switch, is closed, and then magnet 3 lifts the contact plate and breaks the circuit connection with S, so that the current flows through wires 1 and 2, by way of wire 5$^a$, and thus equalizes the currents in the controller coils, and brings the armature back to the stop position. This illustration shows the arrangement applied to a two-current switch, in Fig. 110 it is shown applied to a three-current switch, and in that figure, the stationary connecting plates are shown in their proper position.

Fig. 45 shows an arrangement for stopping the car if the lifting cables become slack. The switch 4′ is held open, normally, by the tension of the lifting rope, but if the latter becomes slack, the switch is closed, and then the current from P passes through wires 3 and 5$^a$ directly to the center of the switch, thus bringing the controller armature to the stop position regardless of where switch S may be.

Fig. 46 shows another device for stopping the car automatically at the end of its travel in either direction. The switch 6$^a$ is mounted upon the elevator machine and is actuated by the rotation of the hoisting drum. When the drum has rotated far enough to raise the elevator car to the highest position, the machine throws switch 6 in one direction, and if the drum is rotated in the opposite direction far enough to lower the elevator car to its lowest position, the machine throws switch 6$^a$ in the opposite direction. As will be noticed, the contacts 4, 4, do not connect with S when the latter is in the central position. Now suppose the car is running up, and that the operator forgets to turn the car switch when the upper landing is reached, then the machine itself will move switch 6$^a$ and thus stop the car. As soon as the operator returns S to the stop position, the circuit through switch 6$^a$ is broken. When he turns the switch to run the car down, the machine will begin to revolve, and its first movement will return switch 6$^a$ to the central position, so that when S is advanced far enough to connect with 4, 6$^a$ will be open.

I have not shown the construction of the apparatus on the machine that operates switch 6$^a$ because it is not a part of this invention. There are many designs of such devices, that are commonly called automatic stop motion mechanisms, and have been used in connection with steam as well as electric elevators. In carrying out my invention I may use any one of the various forms of the well-known forms of stop-motions.

If a controller is very large the torque required to move it may be so great that it cannot be obtained without using a current in the controller-mover that cannot be handled by a car switch of small dimensions, on account of the sparking being so excessive as to soon destroy a switch with small contacts. It is not desirable to have a car switch of very large dimensions and to obviate this, when necessary, I arrange the controller-mover so that an extra current may be passed through the armature, in addition to that coming from the car switch. Figs. 47 and 48 show two modifications of this arrangement, the first presenting a two-current controller and the second a three-current controller. In Fig. 47 the armature is wound with two coils one of which is traversed by the current coming from the car switch, which enters the armature coils through wire 4 and passes out through wire 5. The other current is taken from the supply circuit through wire 6 and passes out of the armature coil to wire 7 and thence to the upper contacts 8' of a switch that is actuated by the controller-mover armature. When this switch is closed, the current passes to contacts 9' and thus to the opposite side of the supply circuit.

In Fig. 48, only one coil is provided on the armature, and this is traversed by the current coming from the car switch, and also by the current taken directly from the supply circuit. A resistance R is placed in wire 7, so as to adjust the strength of the current drawn from the main line. When the switch mounted on the controller armature is in the position shown the only current traversing the armature coil is that coming from the car switch; but when the armature turns far enough, the contacts 8' and 9' are connected through S' and then additional current flows through the armature coil. As can be seen at once, by properly locating the contacts 8', 9', of the switch S', the current derived from the supply circuit can be made to traverse the armature at any point in its travel that may be desired, and it can be caused to flow through the armature during any angular distance, by simply giving 8' and 9' the proper length. Thus it will be seen that this arrangement can also be used to enable the armature to put forth an extra large torque at any desired point, so that in cases where variations in the armature torque cannot be obtained fully by the proper proportioning of the car switch resistance and location of contacts, the arrangement of Figs. 47 or 48 can be utilized. In these two figures, the switch S' is shown mounted directly upon the armature spindle, but in cases where the controller-mover armature makes a number of revolutions, S' would be mounted upon the shaft of the portion of the controller-mover that actuates the controller switches; in other words, S' would become one of the switches actuated by the controller-mover. The part that would actuate S' in such cases is marked 2$^b$ in Fig. 50. If the armature of the controller-mover makes a number of revolutions, it is evident that the car switch cannot be designed so as to give any desired torque at any desired step, for the variation in the torque would then become cyclic, so that if the armature rotated once for four steps, the first and fifth steps would be duplicated in so far as the torque is concerned, and so would be the second, the sixth and the tenth. In such cases, however, the arrangement of Figs. 47 and 48 can be used to obtain any desired magnitude of torque at any step.

In discussing the various types of car switches, I have shown that by properly proportioning the resistances and suitably arranging the contacts, so as to cut the resistances in or out of circuit at the proper points any desired variation in the magnitude of the torque can be obtained as well as any angular movement from step to step. This variation in the magnitude of the torque, however, can only be obtained in switches arranged to rotate the controller-mover armature one revolution or less. If the armature is rotated more than one revolution then the torques given for the several steps of the first revolution will be repeated in the corresponding steps of the second, third and other revolutions; hence, in such cases the car switch cannot provide the torque required at each step unless it happens that the torques at the several steps vary in cyclic order, and correspond with the rotations of the car switch. In all such cases, however, any magnitude of torque required at any step can be obtained by means of the arrangement shown in Figs. 47 and 48. In every case, the angular position of the armature at each step will be determined by the car switch.

In rotating car switches as I propose to construct them, an operating lever, or handle is provided that swings through an arc ranging from 60 to 90 degrees in either direction from the central or stop position, and through suitable gearing this movement is multiplied so as to revolve the rotating switch through as great an angular distance as may be required, as is clearly shown in Fig. 106. The operating lever in this illustration moves through 90 degrees while the rotating switch makes four complete revolutions. On the end of the operating lever 1$^h$, a switch is mounted that passes over contacts marked 72 and 73, which can be replaced by contacts of any other form desired, and by connecting these in the main circuit of the switch, the strength of the whole or main switch current can be varied as much as may be desired at any position of the operating lever 1$^h$. From the foregoing, it will be seen that by the aid of the car switch constructions herein shown and the arrangement illustrated in Figs. 47, 48, any modification of the torque that can possibly be required in any controller-mover can be obtained, providing it is within the capacity of the machine.

Figs. 49 to 53 show a design of controller-mover adapted to make one or more revolutions in moving the controller over its entire range. The drawings also show the controller switches that are actuated by the controller-mover. The controller proper is shown at 1$^b$ in Figs. 49 and 50, the first being a front view and the second a side view. The cylinder 2$^b$ is rotated by means of spur gear connection with the armature of the controller-mover, 35 being the gear wheel on the end of the shaft that carries cylinder 2$^b$, and 36 being the pinion on the armature spindle. These gears are proportioned in the drawing so as to make 2$^b$ rotate one-half revolution while the armature makes a whole revolution, but it is evident that any gear ratio required can be used. A little reflection will show that it is not desirable to have 2$^b$ rotate more than one-half a revolution for if it turned further it would have to be made to traverse endwise so as to move the switches properly after passing the half revolution point. The cylinder 2$^b$ has mounted upon its surface, cam plates 5$^b$, 6$^b$, 7$^b$, and the switches are marked 8$^b$, 9$^b$, 10$^b$, and are carried on the ends of levers 21 which are pivoted at 22, and guided at 23. As shown in Fig. 52, these levers are held down by springs 24. When cylinder 2$^b$ revolves, the cam plates 5$^b$, 6$^b$, 7$^b$, run under the rollers 20 and lift the levers 21 and thus the switches, thereby opening the circuit through the latter. When the cam plates pass from under the rollers the latter can drop and then the springs 24 draw the levers 21 down. Fig. 53 shows the surface of cylinder 2$^b$ rolled out on a flat plane with the cam plates 5$^b$, 6$^b$, 7$^b$, in their proper position. This form of cam plate corresponds to one particular kind of controller-mover, and is arranged so as to actuate one or the other of the switches that ride over plate 6 first, and then actuate the five upper ones in succession, beginning at the top, and after that the three lower ones, beginning at the bottom. The center line of Fig. 53 comes under the rollers 20 when the controller is in the stop position.

The construction of the switches 8 is shown in Fig. 51. They consist of a number of sheet metal strips 15 bent into the form shown and clamped together; within these strips 15 are placed carbon blocks 17. A frame 45 with projections 46 carries the switch and is mounted in the end of lever 21. Bends in the lever sides at 43, and a pin 42, permit the switch to rock sufficiently to make a good contact upon the switch blocks, but not so much as to get out of position. The metallic strips make contact with stationary blocks 16 and carbon 17 makes contact with carbons 18, which are elastically supported on springs 19. The parts 16, 18 and 19 are in duplicate so as to make contact with both ends of the switch. The connection from one side of the circuit runs to one of these pairs of blocks 16, and the connection to the other side of the circuit leads from the other set; so that when the switch is depressed it closes the gap between the two sets and thus closes the circuit. When the switch is raised, 15 and 16 separate first, and the last break in the circuit is between 17 and 18, so that the sparking passes between the carbon blocks. The smaller switches 9$^b$ and 10 are more simple in construction as is shown in Fig. 52. Switch 9$^b$ is intended to carry a very small current in a circuit of high resistance; hence, is made of two carbon blocks 30 and 31. Switch 10 is to carry a somewhat heavier current and in addition to the carbon blocks is provided with a metallic stand and a downward projection on lever 21 to make contact with this stand when the switch is fully depressed, as is shown at 47. A dash pot is placed at 11 and is actuated by a cam cylinder 14 mounted upon the shaft of cylinder 2$^b$ so as to regulate the velocity at which 2$^b$ revolves and thus prevent cutting out the armature resistance too rapidly, if the operator in the car should turn the switch too rapidly.

The small drum 38, rope 39, sheave 40 and weight 41 are provided to return the controller armature to the stop position should the current fail while the elevator is in motion, and also to hold the armature in position when the current is cut off. When the armature is in the stop position, the rope 39 is wholly unwound and rotation of the armature in either direction will wind it up and lift the weight.

Figure 110:
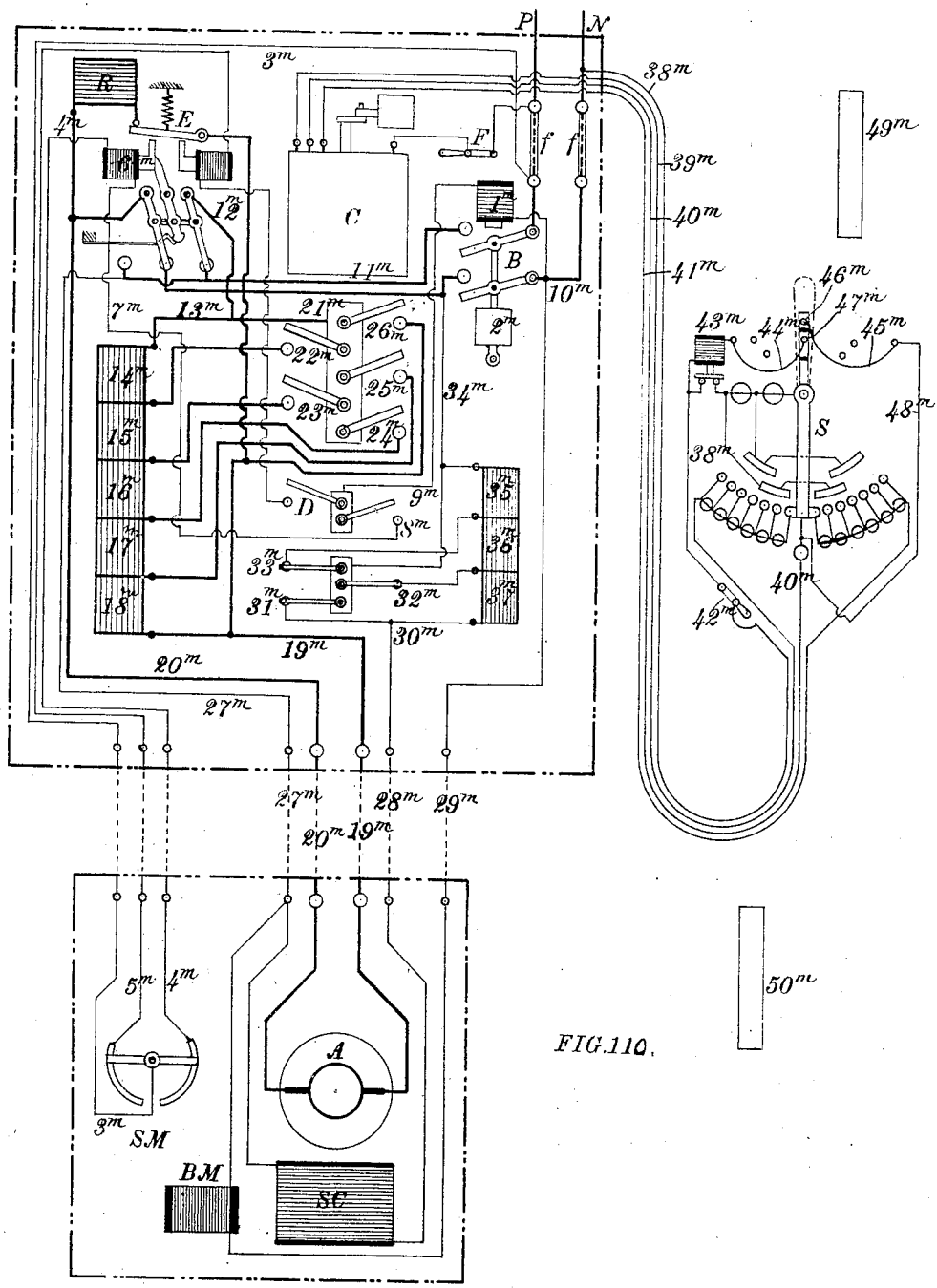

This type of controller switch is shown in Figs. 110 and 111, from which the wiring connections with the circuit can be fully understood. Sometimes it becomes necessary to operate the controller manually, and in such cases, a switch is turned that breaks the circuit to the car switch, and then the controller-mover handle 37 is turned to operate the controller.

Considering now Figs. 47 and 48 for a moment, it can be seen that in order to be able to admit current to the controller-mover armature through the switch S' all that is necessary is to provide a switch in proper position in Fig. 49 and to mount upon cylinder 2$^b$ cam plates of the proper length and in the proper position, and then the circuit through S' can be opened or closed at any angular position desired.

Figs. 54 to 57 show another design of controller-mover, intended for light service. A controller-mover of this type is shown in Fig. 110 arranged to be operated by a two-current switch. In Fig. 54 which is an end view, the armature is marked 1 and the field 2$^a$. The frames that hold the armature spindle are marked 3$^c$ and the shaft 4$^b$. The cam that moves the switches 17 is marked 5$^b$ and the rollers carried by the switch levers 21, are marked 20, the pivots around which they swing being at 22, the support for these rising from the bed plate 3ᵇ. When the cam plate 5 passes beyond the rollers 20, the springs 24 pull the switches 17 down into contact with the blocks 18, thus closing the circuit. The switches 17 open and close circuits through magnets that operate the main switches of the controller.

Fig. 58 shows the outline of the surface of the cam plate 5ᵇ.

Figure 61:
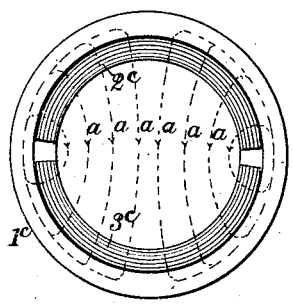
Figure 62:
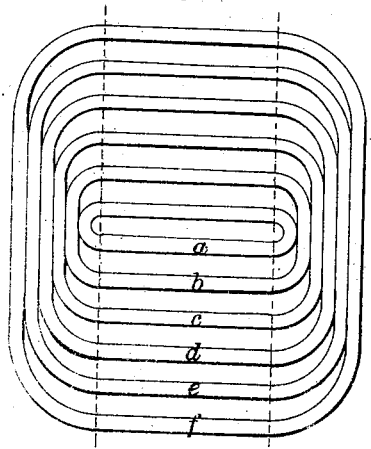

The two lower switches in Fig. 55 are for the purpose of starting. If the controller-mover revolves counter-clockwise, the roller of the lowest switch is uncovered and then this switch closes and sends current through a reversing switch that starts the elevator running, say, upward. The second switch from the bottom does not close during movement of the controller in this direction, but the other three are closed one at each step of the car switch, and as they are closed they energize magnet switches that cut out the armature resistance and vary the strength of the field of the elevator motor thus varying the speed. The cam plate 5ᵇ is insulated, preferably, from the other parts of the controller-mover, as is shown in Fig. 56. The armature in this machine is wound in the manner shown in Fig. 63 and the field in the manner shown in Figs. 60, 61, and 62. The armature is connected with the wires 1ᶜ, 2ᶜ, of the car switch; hence, plays the part of field and the field becomes the armature. As can be readily understood, it makes no particular difference on which part the coils connected with the car switch are placed, and as a rule they will be located upon the part where it is the most convenient. The spring 19′ acts in this machine in the same capacity as the weight rope and drum in the previous design, that is, to bring the armature back to the stop position and hold it there when there is no current passing through the coils. In designs such as shown in Fig. 50, it is evident that the spring or weight can be used, and that they can be applied to the armature shaft, or to the shaft of cylinder 2ᵃ. The field coils in Fig. 56 are held in position by metallic springs 24′, which are forced into grooves turned in the casting to receive them.

This machine if connected with a four-current car switch can be made to rotate one or more revolutions, but if operated in connection with a two-current car switch its movement will be limited to about 40 degrees in either direction from the central position. When made to rotate, the part 14′ that carries the cam plate can be removed and a pinion substituted to mesh into a suitable gear mounted upon the shaft of the cylinder that moves the controller switches, as is fully shown in Fig. 57.

Figure 59:
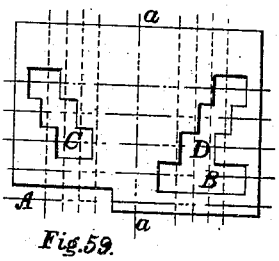

Fig. 58 shows the outline of the cam plate suited to the switches that when closed remain closed, but with controllers of some types it is desirable that the current be cut off from each magnet switch after it has performed its work, and to do this the cam plate must be made so as to open the switch after it has remained closed the proper length of time. The proper outline for a cam plate of this kind is shown in Fig. 59. From this figure it will be seen that when the cam plate revolves far enough the roller of the switch lever will drop into the opening C or D, according to the direction in which the armature is turned, and after a further advance in the rotation the roller will ride up out of the opening and thus open the switch again.

Figure 63:
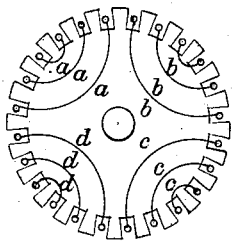

In designing controller-movers it is desirable to make them as compact as possible and to attain this end it is necessary to give the wire coils the form that will take up the least room. If the field coils are made in the form illustrated in Figs. 60 to 62, they will be very compact, as they will not take up any more room in a radial direction at the ends, than along the sides that fit into the grooves. Winding the armature coils as is illustrated in Fig. 63 also makes them very compact. This drawing shows the end of the armature and the lines $a$, $b$, $c$, $d$, show the direction in which the coils run over the ends. As will be seen, the wires do not cross each other; therefore, the coils will lie flat against the armature core and will not pile up as in ordinary styles of winding, and even the formed coils commonly used in multipolar machines would take up more than double the space in the direction of the axis of the armature. Electrically, the winding of Fig. 63 is a trifle defective, especially for a four-current switch, owing to the magnetic leakage it permits; but with machines of small or moderate size this objection is fully overbalanced by the compactness of the winding.

Figure 64:
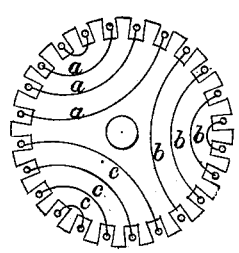
Figure 65:
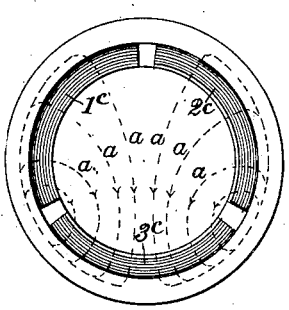
Figure 66:
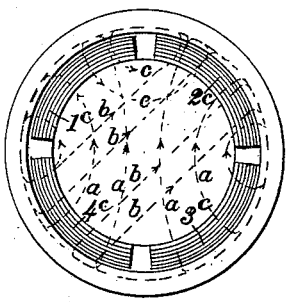

The type of winding shown in Fig. 63 can also be used with three-current machines as is shown in Fig. 64. The field winding of Figs. 60 to 62 can be used for two- and four-current machines, as shown in Fig. 66, and for three current machines, as shown in Fig. 65. The armature winding of Fig. 63 can also be used for a single coil winding that is the coils $a$ and $c$ can be removed and the coils $b$ and $d$ can be extended so as to each one cover one-half the armature surface. These several types of windings are open to the objection that they produce more or less magnetic leakage, and also that some of the turns of wire act in opposition to the others; but these objections are not of enough importance to render the arrangements undesirable, except for machines of the largest size, where efficiency in operation is the principal aim of the designer.

Figure 60:
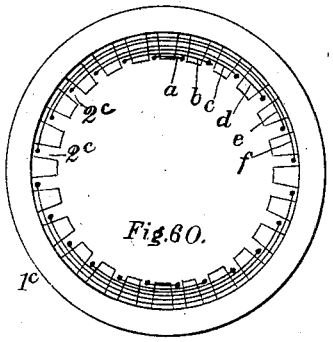
Figure 67:
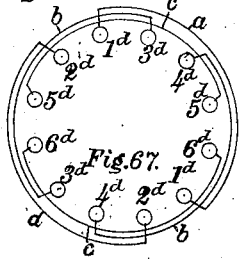

To make the windings of Figs. 65 and 66 perfect, the coils would have to be of the length of the longer ones in Fig. 60, and they would have to be placed in the field in the manner indicated in Fig. 67, which is a diagrammatic illustration of a commonly used type of polyphase field winding. Coils so arranged, however, have to lap over each other at the ends and occupy much more room radially and in the direction of the axis $a$ of the armature, than coils arranged as in Fig. 65.

A point of more importance than compactness of design, especially in machines of large capacity, is to so proportion the coils and the polar spaces between them as to obtain the most rapid rise of torque when the armature is moved away from the position where its flux is parallel with that of the field. To make clear why this is so, let us suppose that the armature is rotated 30 degrees at each step. Now if the field flux is rotated 30 degrees from the zero position, the armature will not be pulled around 30 degrees unless the resistance to rotation is zero, because when the armature and field fluxes are parallel with each other, the torque is zero. The maximum torque is obtained when the armature and field fluxes are at right angles to each other, and if the armature is covered with a distributed winding, the torque for any angular position will be equal to the maximum multiplied by the sine of the angle between the two fluxes. If the angle is 3 degrees, its sine will be about five hundredths; hence, if we have to bring the armature to within three degrees of the point to which the field flux is rotated, the maximum torque must be about twenty times as great as the resistance to rotation that the armature encounters. Thus, with such a relation between the maximum torque and the resistance opposing rotation, the armature would advance 27 degrees from the zero line when the field advances 30 degrees, and when the field flux is brought back to the zero line the armature would be returned to within three degrees of zero. By properly proportioning the coils on the armature, and the poles of the field, we can cause the torque to rise faster than the sine ratio, as the angular distance between the armature and field fluxes is increased, so that at three degrees the torque may be seven, eight, or ten hundredths of the maximum instead of five hundredths; and then we can either use a smaller controller-mover to do the work, or we can keep the size unchanged and cause the armature to rotate to a point more nearly in parallel with the field flux. How this can be accomplished can be made clear by the aid of Figs. 68 and 69.

Figures 68, 69:
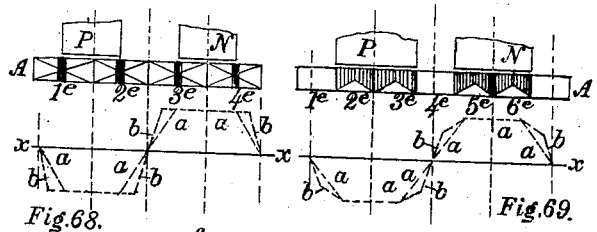

Fig. 68 illustrates the action in a two or four-current controller-mover. The poles are represented by P and N, and A represents the coils wound upon the armature. For the purpose of simplifying the diagram, as well as the explanation of it, the armature is rolled out into a straight line, but it can be easily understood that if it were returned to the circular form, N would be directly under P, and the parallelograms $1^e$ and $3^e$ would be diametrically opposite on the armature, as would also $4^e$ and $2^e$. Thus $1^e$ and $3^e$ represent the sides of one coil, and $2^e$ and $4^e$ the sides of the other coil. From this it will be seen that in this diagram the currents coming from the car switch are passed through coils wound upon the armature, and this is also the arrangement in Fig. 69, and it is used in both diagrams to render action more easily understood. If the armature coils cover the entire surface, each coil side will fill the whole parallelogram on which the diagonal lines are drawn. Pole P exerts a thrust to the right upon $2^e$ and $3^e$, and to the left upon $1^e$ and $4^e$. Pole N exerts a thrust to the left on $2^e$ and $3^e$ and to the right on $1^e$ and $4^e$. The effort of both poles is the same, so that with the coils in the position shown the forces are balanced and the torque of the armature is zero.

The effort of each pole against the coil sides is proportional to the extent of the coil side covered by the pole; hence if the armature is moved to the left, the thrust against $2^e$ and $4^e$ will increase, while that against $1^e$ and $3^e$ will decrease, and thus there will be an unbalanced force acting to return the armature to the position in which it is drawn. If there is no magnetic flux leaking out at the sides, the increase in the magnitude of the unbalanced force, or torque, as the armature is moved to the left, will be directly as the distance it is moved, providing the wire is evenly distributed over the coil sides. This being the case, the torque will increase uniformly until $2^e$ and $4^e$ come directly under the poles, when its maximum value will be reached. At this stage in the movement $3^e$ will be directly opposite the interpolar space, and with further movement its passage under pole $p$ will be resisted and to the same extent as the passage of $2^e$; in fact, the action will be the same as if $3^e$ were a part of $2^e$, hence, the maximum torque will be maintained until $3^e$ passes fully under pole P, and with further movement of the armature to the left the torque will decline at a uniform rate, becoming zero when $3^e$ reaches the position now held by $1^e$. In this way a torque curve will be developed, such as is indicated by the broken line $a, a, a, a$. If, now, the wire in the coils' sides $1^e, 2^e, 3^e, 4^e$, is concentrated at the center, as is indicated by the shaded portions, the torque will rise more rapidly as the armature is moved away from the position in which it is drawn; for as soon as $1^e$ and $3^e$ pass beyond the ends of the poles the thrust against them becomes zero; hence, at that instant the torque becomes a maximum, and this maximum will be sustained until $3^e$ begins to pass beyond the left side of pole P. In this way, the torque curve will be changed to the form indicated by lines $b, b, b, b$; that is, it will rise more rapidly as the armature is moved away from the position of zero torque.

The foregoing explanation is correct upon the supposition that the currents flowing in the two armature coils are equal. If, however, the current in the coil represented by sides $1^e$ and $3^e$ is at the maximum value, and the current in the coil represented by sides $2^e$ and $4^e$ is at the minimum value the case will be different. Assume that the current in two and four is zero, then if the coil sides are narrow as indicated by the shaded portions, the torque will become zero as soon as side $1^e$ moves far enough to the left to pass wholly from under pole P, and it will remain zero until $3^e$ reaches the opposite side of pole P. Thus it will be seen that if the coils are concentrated at the center line, the torque will rise rapidly as the armature is moved away from the zero line providing the currents flowing in the two coils are equal or nearly so, but if the current is at the maximum value in one coil, and at the minimum in the other, the armature will have to move a considerable distance from the zero line before the torque attains an appreciable value. From this it follows that if the current is at the maximum in one of the coils, the distributed winding will cause the torque to rise more rapidly as the armature is moved away from the zero line and if the wire is concentrated at the edges of the coil it will rise still more rapidly. From these facts it follows that if we have a four-current controller-mover that is arranged to rotate several times in moving the controller through its entire range, and the steps are so arranged that they come at the points where the currents in the coils that are active at the time are equal, the proper construction is to concentrate the wire at the center line of the coil; but if the steps come at points where the current in one of the coils is at the maximum value, the proper construction is to concentrate the wire at the edges of the coil. If we have a four-current or a two-current machine that is arranged so that the steps come at points where the currents in the coils are of different values, then the best construction is a compromise between the two, that is, to make the coils about one-half the width shown in Fig. 68 with the wire concentrated at the edges, in such cases the action can be improved by increasing the arc covered by the poles, so that the width of the coil side added to the arc covered by the pole may not be far from 180 degrees.

In Fig. 69, the action in a three-current controller-mover is illustrated. The parallelograms $1^e$ to $6^e$ represent coil sides with a distributed winding that covers the whole armature surface. Sides $1^e$ and $4^e$ belong to one coil, $2^e$ and $5^e$ to another, and $3^e$ and $6^e$ to another. In all the forms of three-current switches shown, with the exception of the three phase, the current in one of the coils is generally so near zero that for the purpose of this illustration it may be regarded as equal to zero. The principle of action, however, is the same even in the three-phase, but it will simplify the explanation to consider the action with the current in one coil at zero.

If the currents in the coils $2^e$—$5^e$ and $3^e$—$6^e$ are equal, the point of zero torque will be that in which the coils are drawn in the diagram. If the armature is moved to the left, the torque will rise gradually and at a uniform rate until $2^e$ passes beyond pole P. By that time 5 will be just entering under pole P, and as it will pass under the pole just as fast as $3^e$ passes from under it, the maximum torque will be maintained until $5^e$ is fully under the pole, and then the passage of $6^e$ under the pole will produce a uniform reduction of the torque which will reduce to zero when $6^e$ is fully under the pole; that is, when $5^e$ and $6^e$ occupy the position of $2^e$ and $3^e$ in the diagram. From this explanation it will be seen that with the wire uniformly distributed the torque will be as is indicated by the broken lines $a, a, a, a$.

If the wire is concentrated at the edges of the coils, as is indicated by the shaded portions, the torque will rise more rapidly as the armature is moved away from the zero line, because the portion of the coil that passes from under the pole increases more rapidly than the distance traversed; hence, the torque will rise more in accordance with lines $b, b$. In this diagram the poles cover an arc of 120 degrees and the coil sides 60 degrees, so that if we take the instant when the current in one of the active coils is at the maximum value and at the minimum in the other, the active coil will occupy the position of coil $1^e$—$4^e$, and if the wire is concentrated at the edges, the torque will rise more rapidly as the armature is moved away from the zero line, than it will if the wire is uniformly distributed. Thus with the three-current machines, the proper arrangement of the coils for any case is with the wire concentrated at the edges.

The torque curves $a$ and $b$ shown in the diagrams 68 and 69 are substantially correct upon the supposition that the magnetic density is uniform over the whole polar surface, and that there is no magnetic flux outside of the poles, both of which assumptions are not realized in practice. As a matter of fact, magnetism leaks out at the edges of the poles, forming what is commonly called the magnetic fringe, and the density of the flux issuing from the polar surface is generally somewhat greater at the center. The effect of these differences upon the torque curves is to round off the corners, to make the rise slightly more abrupt in passing from the zero line, and to cause the straight portion that represents the maximum torque to change into a convex curve with reference to the axis $x\ x$, thus making the actual maximum come at the point midway between the zero lines. The effect of the magnetic fringe is to virtually increase the angular length of the pole; hence, it is not necessary that the width of the coil side added to the arc of the pole be equal to 180 degrees. The density of the flux in the magnetic fringe at the edges of the pole, as well as the arc over which this flux extends, increases as the air gap is increased; hence, with small air gap the difference between the sum of the coil side and the polar arc and 180 degrees must be less than with large air gap.

In Figs. 68 and 69, the poles are shown as covering arcs of 90 and 120 degrees respectively, but this proportion is not absolutely necessary. If the coils are made wider than shown, the pole arcs can be reduced, and if the coils are made narrower, the pole arcs must be increased, so that the sum of the two may not be far from 180 degrees.

Figure 70:
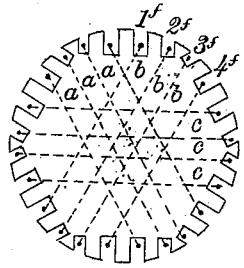
Figure 71:
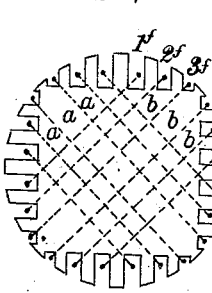

To carry out the construction explained in the foregoing, when the coils that connect with the car switch are wound upon the armature, I resort to the designs shown in Figs. 70 and 71, the first being for the three-current system, and the second for the two- and four- current. In Fig. 70, the grooves in the armature are cut so that their bottoms form the sides of a hexagon, and the coils are wound parallel with the diagonals of the figure, as indicated by the broken lines $a, b, c$. With this construction, the wire of each coil is concentrated at the edges as is shown by the fact that the grooves $1^f$ and $4^f$ are larger than $2^f$ and $3^f$.

In the two- and four-current armatures the grooves are cut so that their bottoms form the sides of a square, as is clearly shown in Fig. 71, and if the controller-mover is to be made to rotate several times and the steps are to come at points where the current in one of the coils is a maximum, the coils are wound parallel with the diagonals of the square as is indicated by the lines $a, b$. If the steps come at points where the currents in the two coils are equal, the coils are wound so as to be parallel with the sides of the square. In the first arrangement of the coils, it will be seen that the wire is concentrated at the edges while in the second it is concentrated at the middle of the coil. If the controller-mover is arranged so that the steps come at points where the currents in the coils have different values, the coils are wound parallel with the sides of the square, but the grooves at the sides are not filled with wire, in fact, they are not cut in the core, that is, the grooves $3^f$, and $4^f$, are omitted on the four corners of the square.

Figure 73:
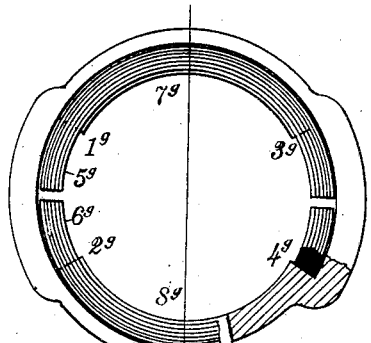
Figure 74:
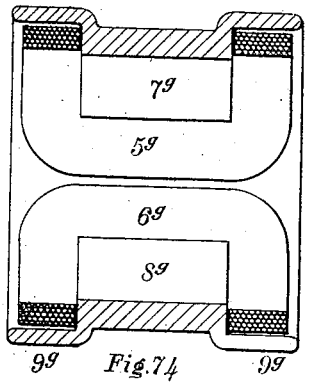
Figure 75:
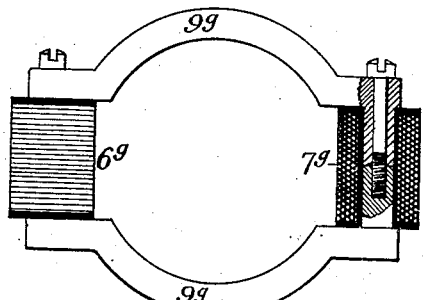
Figure 72:
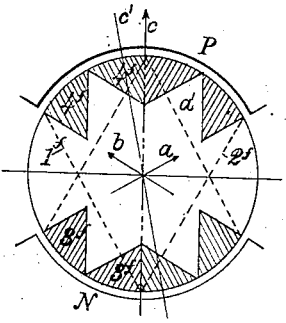

The diagram, Fig. 72, shows quite clearly the advantage derived from concentrating the wire at the edges of the coils as in Fig. 70. If the currents in the two coils $1^f$, $2^f$, are equal, they will assume the position in which they are drawn, when the torque is zero, and the armature magnetization will be in the direction of arrow $c$. The flux developed by coil 1 will be in the direction of arrow $a$, and the flux of coil 2 will be in the direction of arrow $b$, the resultant of these two being in the direction of $c$, that is, parallel with the armature. The shaded portions of the coils $3^f, 3^f$, and $4^f, 4^f$, indicate the way in which the wire is concentrated at the edges. If the armature is rotated to the position $c'$, the portion of the shaded section 4 which will pass from under the pole will be a greater portion of the whole wire, than the arc between $c$ and $c'$ is of the arc covered by the coil side; hence, the rise in the torque will be that much greater than it would be if the coil were evenly distributed over the surface. Armatures of the type illustrated in Figs. 70 and 71 are used in connection with field magnets of the form shown in Figs. 73 to 75. The first one of these figures is an end view of a field with internal coils, which are marked $5^g, 6^g$. The upper pole extends from $1^g$ to $3^g$ and the lower one from $2^g$ to $4^g$, if the armature is of the three-current type and the coil sides are 60 degrees wide. For other widths of coils, and for two- and four-current machines, the polar arc is varied as required. Fig. 74 is a section of Fig. 73, parallel with the shaft, so as to show the location of the ends of the field coils more clearly. This design of field is suited to machines having rather long armatures; but if the latter is short, the length of the turns in the field coils can be reduced by the construction of Fig. 75. As can be seen at once, to obtain the same magnetizing effect in the two cases, the turns of wire in each one of the coils $6^g, 7^g$, must be equal to the sum of the turns in coils $5^g$ and $6^g$ of Fig. 73; hence, if a turn in the latter coil is more than twice as long as a turn in the former, Fig. 75 will be the most desirable design; otherwise it will not.

Figure 76:
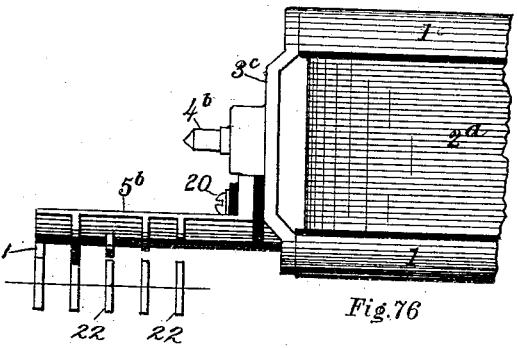

Armatures wound with coils as illustrated in Figs. 70 and 71 cannot be made very compact, especially if the coils are parallel with the diagonals, that is, with the wire concentrated at the edges; on this account I prefer, as a rule, to wind the armature with a single coil, as shown in Fig. 76, and to place the coils connecting with the car switch upon the field. In Fig. 76, to provide an unobstructed space for the coil, the ends $3^c$ and spindle $4^b$ are substitued for the shaft, as the latter would take up a considerable portion of the space which with this construction can be utilized by the coil. When this type of armature is used with a controller of the design shown in Figs. 54 to 56, arranged for two-current car switch, the cam plate that operates the controller switch is constructed as shown at 5$^b$, being insulated, preferably from 3$^c$, but secured thereto by screws 20. The cam projections extend some distance radially from 5$^b$ as shown at 21. In this way the radial dimension of 5$^b$ is reduced so that free access may be obtained to the screws that secure 3$^c$ to the armature core 1. The construction is made clearer in Fig. 77, in which is also shown another way of making the controller switches. These switches are shown in plan in Fig. 79. Fig. 78 shows the position of the cam projections on the under side of 5$^b$.

Figure 77:
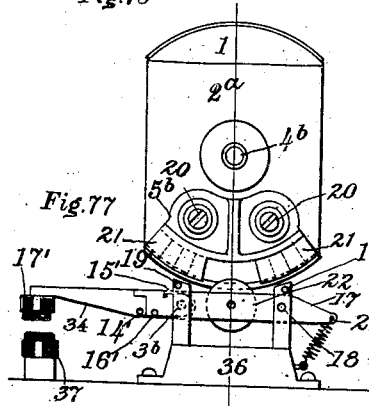
Figure 78:
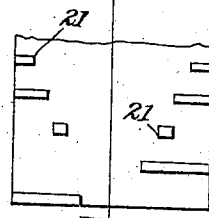
Figure 79:
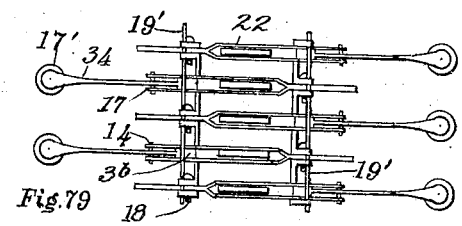

The switch shown in Figs. 77 and 79 is pivoted at 18 and the roll 22 is pressed up against the cam projections 21 by means of the spring attached to end 24. Wires 19' which run over the tops of all the switches prevent them from being raised too high when the cam projections pass beyond the rollers 22. The switch lever is jointed at 3$^b$ and is held in the straight position as drawn by a spring 15', the end of which abuts against pin 16'. Pin 14' is provided to bring up against a stop on the section 17 of the switch lever if section 34 is lifted too high. This is a provision to prevent destroying the elasticity of spring 15' by raising 34 further than is necessary. The object of the joint at 3$^b$ is to permit the lever to bend and thus prevent cramping, if the contact 17' strikes 37 before roller 22 is fully under the cam projection 21.

Figs. 80 to 82 show three designs of fields to be operated with single coil armatures. In Fig. 80 the coils marked $a$ form one set, as do also the coils marked $b$, and those marked $c$. It will therefore be seen that this field is for a three-current machine, each one of the sets of coils being connected with one of the wires coming from the car switch. As will be seen, this winding concentrates the coils entirely upon the edges, the space between the sections being wholly uncovered. The sides of adjoining coils can, if desired, be placed close together without an intervening space; thus, the sections $a$ and $b$ at the top of the figure can be wound side by side in the same groove. They can also be separated more than shown in the drawing.

The only difference between Figs. 80 and 81 is in the kind of coils used, the latter being wound with coils that overlap at the ends, as is illustrated diagrammatically in Fig. 67. This is a type of coil commonly used in alternating current machines of the polyphase type.

The design, Fig. 82, is wound with narrow coils and the polar surfaces on the armature are increased in about the same proportion as the coil arc is reduced. This type of field will not give quite as abrupt a rise in the torque when the currents in the two active coils are equal, but when the current in one coil is at the maximum value the rise in torque will be fully as abrupt as with the design, Fig. 80. One advantage of Fig. 82 to offset the slight deficiency in rapidity of rise of torque is that the increased polar arc reduces the magnetic density in the air gap, so that with the same magnetizing force a stronger field is obtained.

The coils in Figs. 80 and 81 are connected so that the currents flow over the inner surface of the rings F in the same direction in both cases. The diagrams Figs. 83 and 84, show the direction of the currents in all the coils in both machines, the arrows that point toward the center indicating currents flowing up from the paper, and those pointing away from the center indicate currents flowing down through the paper. In Fig. 81, as the grooves in which the coil sides fit are so close together, it might at a first glance be supposed that it would be advantageous to not carry the coil sides around the circle as far as shown, but to stop at the nearer grooves, but if this were done, although it would enable us to save room at the ends of the field on account of having to cross the coil ends twice instead of three times it would also result in reducing the torque of the armature because some of the current would react upon the balance as can be clearly seen from the diagram, Fig. 85, in which the two upper coils $a, b$, act in a direction opposite to that of the side coils $a, b$, as indicated by the arrows.

Fig. 86 shows clearly the advantage of making the armature in Fig. 82 with poles of long arc. If the current is at the maximum in the coils C C', the armature will be in the direction drawn, and if it moves but a small angular distance, the magnetic flux indicated by the broken line $a\ a$ will cut C' and thus develop a torque. If, however, the poles were formed as shown on the right side of the figure, with the ends $c, c$, cut away, the magnetic flux would follow the path $b, b$, and the armature could move through a considerable angle before the flux would reach coil C, thus giving a very slow rise in torque.

Figs. 87 and 89 show designs of fields for two- and four-current controller-movers, the first one having coils concentrated at the sides, and the second with coils concentrated at the center line; thus, the first being of the same order as Fig. 80, and the second belonging to the type of Fig. 82. In both figures the coils belonging to the same set are marked with the same letter. Armatures of the form shown in Figs. 80 and 87 can be readily wound, but those shown in Figs. 82 and 89 cannot, on account of the overhanging ends of the poles. Armatures of this form I split into two halves, as shown at $d$ in Fig. 89, and the coil is wound upon a spool made to fit into the space within the armature, the halves of the core being bolted together. The coils of each set in fields such as 80 and 87 can be connected in parallel or in series, provided the currents flow in the right direction in each series, or as indicated in Fig. 83, thus the two coils on one side of the diameter can be connected in series, and then the connection can be carried over to the two remaining sections on the other side of the diameter. If the coils are connected in two parallel pairs, the connections from one side of the diameter to the other can run parallel or can cross each other as shown in Fig. 88. If desired, the four sections can be connected in parallel, but in most cases it is desirable to connect them all in series so as to be able to use wire of the largest size.

With narrow coils, such as shown in Figs. 82 and 89, armatures with narrow poles can also be used if the steps of the controller come when the currents in the two coils are equal, but this construction is not desirable, owing to the reduction in polar surface and consequent increase in air gap density. Narrow poles with coils concentrated at the edges are not desirable in any case, because the rise of torque is slow as the armature moves away from the zero line, and in addition the torque is of less magnitude than with wide poles. That this is so, is shown in the diagrams, Figs. 90 to 92.

In Fig. 90, it will be seen that the width of the magnetic flux embraced by the two side coils $a$, $a$, and $a'$, $a'$, is practically the same as the flux embraced by the single coil concentrated at the center line and marked $b$, $b$, as is shown by the length of lines $1^f$, $2^f$, $3^f$. As the side coils have one-half the turns of wire contained in the coil $b$, $b$, the torque of the two is substantially the same.

In Fig. 91, the narrow poles P, N, develop a narrower flux which is wholly embraced by the concentrated coil $b$, $b$, but is not wholly embraced by the side coils $a$, $a$, and $a'$, $a'$; hence, the torque of the latter will not be as great as that of coil $b$, $b$. With the four-current machine this relation is also true, but not to so great an extent, for if the poles are of the angular length, $d$, $d$, Fig. 92, they will develop a flux that will almost cover the side coils so that the difference between the torque of the central coil $b$, $b$, and the two side coils, $a$, $a$; $a'$, $a'$, will not be noticeable; and extending the poles to $c$, $c$, would only slightly increase the torque of coils concentrated at the sides. With the three-current machines, however, narrow poles and divided coils should not be used, and in fact, poles of less angular width than 120 degrees are not desirable in this type of machine for any case.

In reviewing all the foregoing, it will be seen that I have devised forms of car switches that render it possible to rotate a magnetic flux to any desired angular position, and at the same time to make that flux vary in magnitude in its various positions as much as may be necessary to enable the controller-mover to properly operate the controller. It will be further seen that I have devised forms and arrangements of the poles and coils of the field and armature of the controller-mover that will cause the torque to rise as rapidly as possible as the armature is moved away from the position of zero torque, or in other words, from the position where the field and armature magnetizations are parallel with each other. All this I have done to make successful in a practical sense that which without resorting to these expedients is only a success theoretically. I am well aware that the expedient of rotating a magnetic flux to produce a step-by-step movement, or any other defined movement at a distance, has been utilized by others, but the devices employed by them, while capable of rotating the flux, are not capable of varying its magnitude, and the devices actuated by the rotating flux have not been designed with a view of causing the armature to follow the movement of the rotating flux as closely as possible.

As has been fully shown by the foregoing, a car switch capable of rotating the magnetic flux, regardless of how its magnitude is effected, may develop torque in the device moved that will vary in ratios anywhere from five or six to one, up to forty to one, or even more. Now a controller-mover to be able to successfully operate a controller must be capable of moving the latter when the resistance it interposes to being moved is the greatest. The resistance to motion offered by a controller may vary as much as twenty or thirty to one, and five or six to one for an average variation would probably not be far out of the way. Now if the maximum resistance occurs at the position of the controller where the torque is the smallest, it follows that the maximum torque of the controller-mover may be one hundred times as great as the average required, and as a result, the apparatus, though perfect, in so far as the theory of action is concerned, would be a failure commercially considered, on account of its size, cost and amount of energy required to operate it.

The capacity of a controller-mover is determined by the amount of heat generated by the currents traversing its coils, and by the amount of heat the device can radiate. If the car switch is arranged so as to vary the magnitude of the magnetic flux from step to step, so as to be sufficient for the work to be performed and no more, the heat generated in the controller-mover will be reduced to the minimum for its capacity. If the design of the apparatus is such that the armature must swing to within a certain angular distance of the position of the field flux at every step, then by constructing the machine with proportions of the poles and coils that will give the most rapid increase in torque as the armature is moved away from the zero position, the magnitude of the maximum torque of the machine can be reduced. If the magnitude of the maximum torque is reduced, the currents traversing the coils can be reduced so that the heat generated will be less. The greater the reduction in the amount of heat generated, the greater the reduction in the radiating surface required to dissipate it, and consequently the smaller the machine. Thus it will be seen that the effect of the various designs I have made of the car switches and controller-movers is to reduce to a minimum the size of the apparatus, and owing to these facts I am enabled to construct a device of such small dimensions, in comparison with the work it has to do, as to make it entirely successful in a practical sense as well as theoretically.

I believe that everything herein explained that has for its object the reduction of the amount of energy required to operate the controller and to reduce the size of the controller-mover is entirely original with me and I claim it broadly.

Figs. 93 to 99 show a design of car switch of the two-current type, with contacts such as are shown in Fig. 39. Fig. 93 is a front view of the switch with the cover removed. Fig. 94 is a side elevation in section. Fig. 95 is a detail of the switch lever. Figs. 96 and 97 are other details of the lever. Figs. 98 and 99 show the arrangement of contacts for stopping the elevator automatically at the top and bottom landings, by means of the arrangement of circuits shown in Fig. 44, and also in connection with a three-current switch in Fig. 110. The switch lever $1^h$ swings around spindle $2^h$ and carries the brush $3^h$, which slides over the contacts $4^h$, which, through the connections $5^i$ that lead to binding-posts $10^h$, mounted upon an insulating board $9^h$, are connected with the resistances marked R in Fig. 39, and through which the angular position of the magnetic flux is varied. The contacts $12^h$ are connected with the supply circuit, and through a resistance are also connected with $34^h$. This last-named contact takes the place of the stud around which S swings in Fig. 39. The contacts $11^h$, $11^h$, are the contacts 4, 4, of the last-named figure, and $12^h$, $12^h$, are the contacts 3, 3. Current passes from $34^h$ and $12^h$ to the other contacts of the switch through the brushes $36^h$ and $37^h$, and through stud $38^h$, and connecting strip $14^h$, which is insulated from $1^h$ by $15^h$, as shown in Fig. 95. The bearing $22^h$ of spindle $2^h$ projects through the side of the car and upon the end of $2^h$ is a lever $17^h$ that is moved to the central position if the operator fails to stop the car when the top or bottom landing is reached. This action is better illustrated in Fig. 110. On the edge of the casing $6^h$ notches are made where the switch is stopped at the several steps. In Fig. 94, the catch that drops into these notches is not shown, but it is presented on an enlarged scale in Figs. 96 and 97. The catch $18^h$ is guided by the shank $20^h$, and is forced against the edge of the casing by springs $19^h$. The shape of the notch is shown at $21^h$, two forms being drawn: one pointed and another in dotted lines, that has a flat bottom.

Figs. 98 and 99 show the top and bottom stop device of Fig. 44; the two contacts $32^h$ and $33^h$ being insulated from each other and from the supporting lever $17^h$, as clearly shown in Fig. 98. An insulating ring is placed around $22^h$ and on this are mounted conducting rings $24^h$ and $25^h$, over which slide the ends $26^h$ and $27^h$ of contacts $32^h$ and $33^h$. At one end of the elevator car's travel a metallic plate is located, the sides of which are indicated by lines $a$, $a$, if this plate is at the top of the well, another plate indicated by lines $b$, $b$ is at the bottom. When the car is running up lever $17^h$ will be in the position $o\,d$ and the contacts $32^h$, $33^h$, will be in the position $e\,e$, so that if they ride over the plate $a\,a$ they will be short circuited, and the circuit connections will be made that are shown in Fig. 44. If the car is running down, the lever $17^h$ will be in the position $o\,f$ and the contacts in the position $i\,i$, so as to be short circuited by contact with plate $b\,b$. Plates of the width of $a\,a$ and $b\,b$ will only actuate the stopping device when the switch is turned to the last step, but by widening the plates as indicated by line $c$, the action can be effected when the switch is only a step or two from the stop position. All the wires running to the resistances R and R' and to the controller-mover and the supply circuit are connected with the binding posts $10^h$ mounted upon the board $9^h$.

Figure 14:
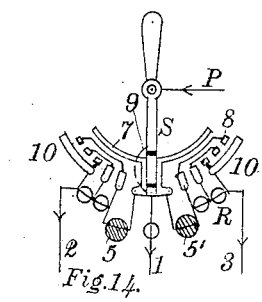
Figure 28:
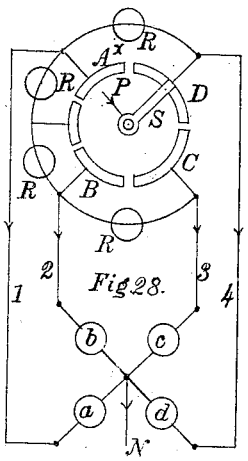
Figure 24:
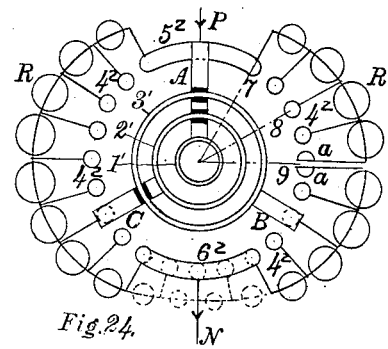
Figure 15:
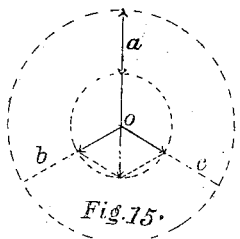
Figure 19:
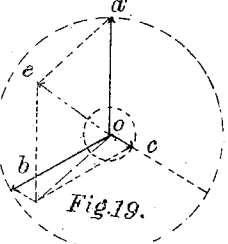
Figure 16:
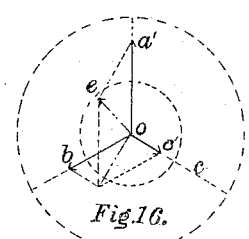
Figure 25:
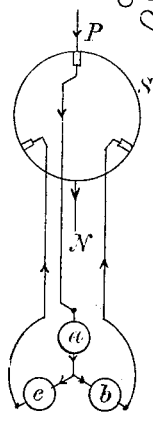
Figure 17:
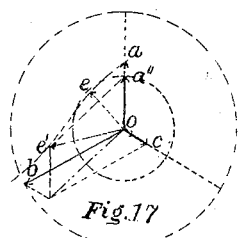
Figure 20:
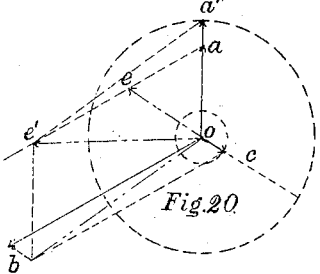
Figures 26, 27:
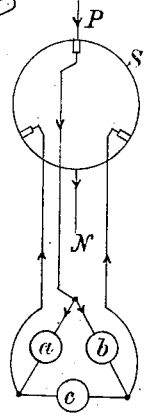
Figure 18:
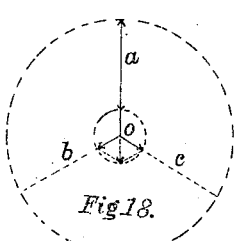
Figure 21:
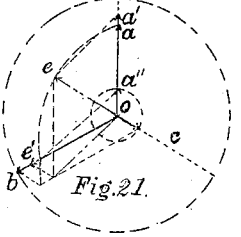
Figure 22:
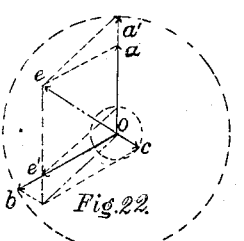
Figure 23:
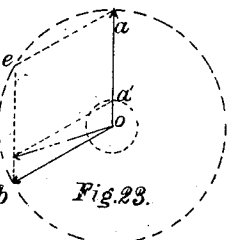
Figure 29:
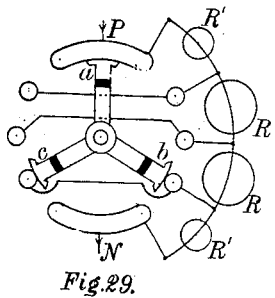
Figure 31:
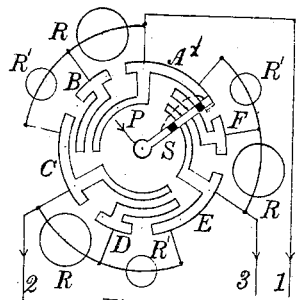
Figure 30:
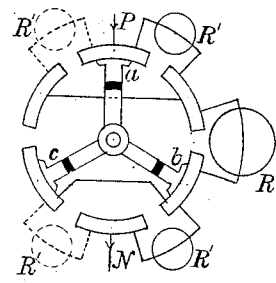
Figure 100:
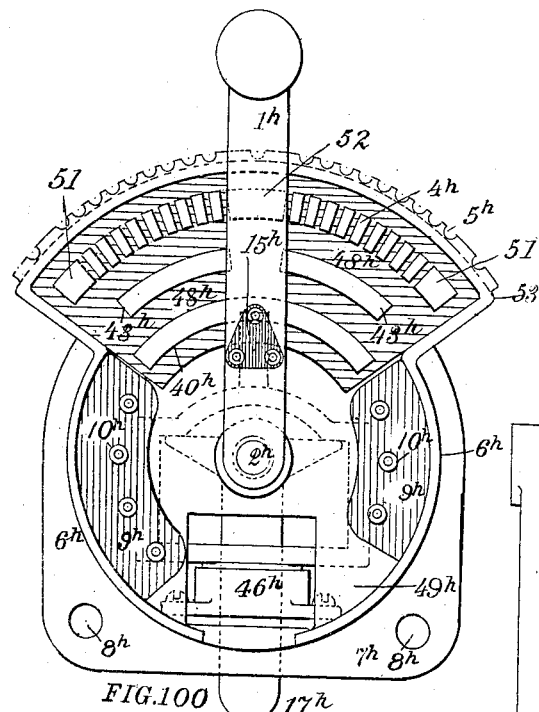
Figure 101:
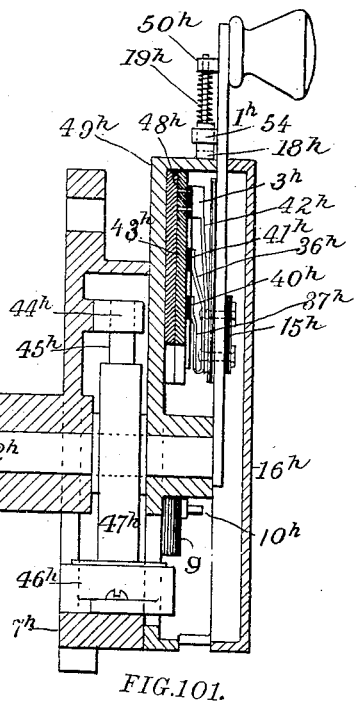
Figure 102:
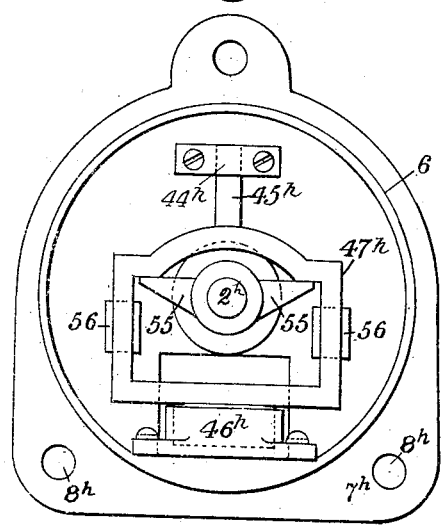
Figures 103, 104:
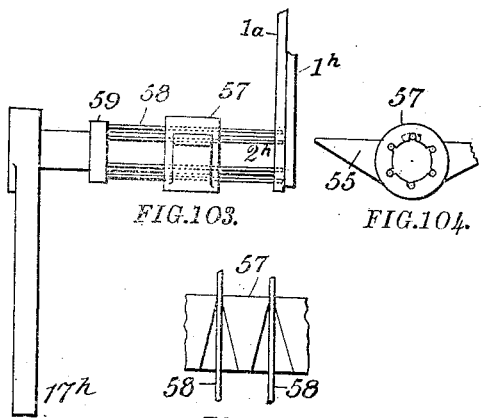
Figure 105:
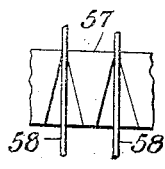

Figs. 100 to 105 show a design of switch of the four-current type arranged in accordance with the upper and lower quadrants of Fig. 28 and capable of rotating the armature of the controller-mover two and a-half revolutions in either direction. This switch is illustrated diagrammatically in Fig. 116. All the wires running to the switch are connected with the binding posts $10^h$, mounted upon the insulating board $9^h$. Contact $40^h$ shown in Figs. 100 and 101 is connected with the supply circuit, and through brushes $42^h$, $36^h$ and $37^h$ the current is conveyed to contacts $43^h$ and 4. These contacts, together with $40^h$, are mounted upon an insulating board $48^h$. The brushes that convey the current to the contacts are secured to the switch lever $1^h$ at $15^h$ and are insulated from the lever. Notches $5^h$ are made in the flange along the edge of the switch casing as clearly shown in Fig. 100 to correspond with the several steps of the switch lever, and a catch 18^h, shown in Fig. 101, which is guided at 54 and 50^h, is pressed down into the depressions by spring 19^h. On the outer end of the spindle 2 the lever 17^h is provided, or the electrical substitute already described so as to effect the automatic stoppage of the car at the top and bottom landings. The casing is made in two parts marked 7^h and 49^h, with a cover 16^h. In the back part 7^h is located a dash-pot 46^h, the plunger of which is secured to a cross head 47^h, which is guided at the top by stem 45^h, and guide 44^h, as shown in Fig. 102. Side bearings 56 are also provided. A hub 57 with cams is mounted upon spindle 2^h, so that when the switch lever is turned in either direction, the plunger of the dash-pot is raised. With 57 rigidly secured to 2^h, the action of the dash-pot is felt by the operator and prevents the rapid movement of the lever 1^h. I also arrange this part as shown in Fig. 103, so that 57 is not secured to 2^h. In this case, a ring 59 is provided, into which springs 58 are secured. Ring 59 is rigidly secured to 2^h and the ends of the springs 58 project through 57 and engage with 1^a, which is a secondary lever upon which 15^h and the brushes secured thereto are mounted. With this arrangement, when the lever 1^h is turned the springs 55 bend and 1^a is not moved. The tension of the springs 58 gradually moves 57 around, against the resistance of the dash-pot and as 57 moves 1^a advances. Thus it will be seen that with this arrangement 1^h can move around to the last notch, while 1^a, which carries the brushes 42^h, 36^h and 37^h, will remain in the center position and follow the movement of 1^h later, as the tension of the spring 19 overcomes the resistance of the dash-pot.

The springs 58 pass through grooves in 57 as shown in Fig. 104, and these grooves are made with taper sides so as to press against the springs at the side next to 1^a. As the result of this construction, shown in Fig. 105, which shows the inner surface of 57 rolled out flat, on an enlarged scale, if the force of the springs is sufficient to carry 57 around through a small angle, they will also swing the ends of 58 that engage with 1^a in the opposite direction, so that while 57 may rotate too rapidly if 1^h is turned suddenly all the way to the last step, the backward movement of the ends of 58 will counteract the forward movement of 57, and thus keep 1^a practically at the stop position. In this way, a smaller dash-pot can provide the requisite retarding force. The type of dash-pot shown in this switch cannot be used for rotating controller-movers unless the weight 41, Fig. 50, is large enough to easily return the controller armature to the stop position, for, as can be seen, the dash-pot does not retard the movement of the switch lever in returning to the stop position. Owing to this fact, if the operator should move the lever back to the stop position so rapidly as to not give the torque of the controller-mover time to overcome the inertia of the moving parts, the apparatus might easily get out of step one revolution. If the weight 41 is not heavy enough to return the controller armature to the stop position, the dash-pot is made double-acting and hub 57, with the cams 55, replaced by an eccentric, while the top and bottom sides of cross-head 47^h are made parallel and as far apart as the diameter of the eccentric, so that as the latter is revolved in either direction by the movement of 1^h, the dash-pot plunger is also moved. To make the dash-pot double-acting the plunger is made so that air cannot pass by it freely, whichever way it is moved by the eccentric. As can be readily seen, the ease with which air can flow in or out of the dash-pot can be made different for the up and down strokes, so that the device can be adjusted so as to give equal degrees of retardation when moved in either direction, or the retardation for the up stroke may be more or less than that for the down stroke.

Figs. 106 to 109 show a rotating switch which is arranged to revolve four times in either direction when the lever 1^h is moved through its entire range. In Fig. 107, a segment 62 is shown mounted upon spindle 2^h and having secured to it lever 1^h. This segment has teeth cut in its periphery, but they are not shown in the drawing. A pinion 63, which is mounted on shaft 61, engages with the teeth of the segment. At the opposite end of 61 is mounted a gear wheel 64 which meshes into a pinion 65 mounted on the end of a second shaft 60. This shaft carries a drum 75 with three collecting rings set in the grooves 68. To each one of these rings is secured a brush 74, as indicated at 76. By this arrangement of gearing, the speed is increased 16 to 1, so that when 1^h moves 90 degrees, 75 and the brushes 74 rotate through four revolutions. At the lower end of lever 1^h, but insulated therefrom, are mounted brushes that connect contacts 72 and 73 on an insulating board 71. These contacts are marked 43^r and 44^r in Fig. 118, which shows a switch of the same type as the one here explained. The main switch contacts are secured to an insulating board 66, which is more clearly shown in Fig. 109. In this figure the collector rings are shown in broken lines in the bottom of the grooves 68, the drum being broken away at one point to show the attachment of the brushes 74 with the ring. The center of 66 is depressed as is indicated by the darker shading 26, and also more clearly in the section in Fig. 107. Current is conveyed to the collector rings on drum 75, through brushes 69, which are supported on block 70. The switch contacts 67 are set around the circle, and the brushes 74 rub against them as the shaft 60 is revolved. The wires running to the switch are connected with the binding posts $9^h$ on board $10^h$.

The back of the switch casing is shown in Fig. 108, with board $10^h$, gear 64 and pinion 65 in position. In Fig. 109, the same casting is shown with the main switch in position, together with the brushes 69, and their supporting block 70. In Fig. 106, the middle casting $6^h$ is shown with the board 71 and contacts 72 and 73, and also the gear segment 62 and pinion 63 and lever $1^h$. In these drawings no dash-pot is shown, but it can be provided by shifting the boards $10^h$ and 71, Fig. 107, as far as they can be moved to the right so as to provide space under $10^h$ for the dash-pot. This change alone does not afford all the space required, and even if it did the gear 65 and shaft 60 would be in the way; hence, it is necessary to move these parts into more condensed space to the right and in addition to move the back $7^h$ of the switch casing to the left. Either one of the switches described can be used with or without a dash-pot, or some other form of retarding device. As shown in Figs. 49 and 50, a dash-pot can also be placed upon the controller-mover. It is not necessary to place a dash-pot on both devices; if it is provided on the car switch it is not required on the controller-mover and if placed on the latter it is not required on the former, and it can be omitted in both; in fact it is simply a precautionary device to obviate blowing fuses or throwing circuit breakers if the elevator operator is careless. The contacts 72, 73, over which the switch brushes carried by the lower end of lever $1^h$ slide, if made in the shape shown will cut resistance into the main switch circuit when lever $1^h$ is in the central or side positions; but as can be readily seen these contacts can be replaced by others arranged after the manner illustrated in the diagrams, Figs. 11, 12, 13, etc., and if so arranged resistances can be cut in or out of the main switch circuit at each step so as to obtain whatever strength of current may be required at that step, to obtain the proper torque of the controller-mover armature.

Fig. 110 shows a controller in which electro-magnetic reversing and main switches are used, all the other circuit connections being effected directly by the controller-mover. The controller-mover is of the three current type and the car switch is arranged to make six steps in performing all the operations and giving all the different car speeds. The automatic top and bottom stop acting in connection with the car switch is of the electric type explained is connection with Fig. 44. The reversing switch, in addition to its regular functions, also actuates a switch E that connects a resistance in the circuit of the armature when the motor is stopped, so as to enable the motor to act as a generator and thus develop a retarding force to assist the brake. The motor in this diagram is of the shunt type, and by cutting in or out the resistances $35^m$, $36^m$ and $37^m$, the field strength is varied. For other speed variations, the resistances $14^m$, $15^m$, $16^m$, $17^m$ and $18^m$ are cut in or out of the armature circuit. The controller-mover is shown at C, and, as seen, is provided with a dash-pot. The switch F is for the purpose of opening the car switch circuit when it is desired to operate the elevator from the controller.

The main switch B is provided with a dash-pot $2^m$ to retard the action of the magnet $1^m$. The stop-motion S—M on the machine acts in the same way as the one shown in the last diagram. When the controller-mover is moved to the first step, by the movement of the car switch to the same position, one or the other of the switches $8^m$ or D is closed, and also the three switches $22^m$, $23^m$, $24^m$, but these last three switches are not closed at the same time as the smaller switch; in fact, they are all closed one after the other as fast as the dash-pot permits the controller-mover to rotate. The course of the currents, supposing switch $8^m$ is closed, is as follows: Through wire $3^m$ the current passes to S—M, returning through $4^m$ to magnet $6^m$ of the reversing switch, thence by wire $7^m$ to switch $8^m$ and by wire $9^m$ to and through magnet $1^m$ to junction $10^m$. As soon as the current passes through $6^m$, the reversing switch is thrown over to the position shown, and at the same time E is drawn down so as to open the circuit through the resistance R. After $6^m$ has closed the reversing switch, $1^m$ closes the main switch B and the current passes through wire $11^m$ to $12^m$ and $13^m$ through the armature resistances to $19^m$, through the armature to $20^m$, and through the left side of reversing switch to lower side of main switch and to line N. As the movement of the controller-mover closes the switches $22^m$, $23^m$ and $24^m$, one after the other, the resistances $14^m$, $15^m$, $16^m$, are cut out of the armature circuit. When the car switch is moved to the second step $25^m$, is closed, cutting out $17^m$ and when the car switch is moved to the third step $26^m$ is closed, thus cutting out all the armature resistance. When the car switch is moved to the fourth step switch $31^m$ is opened, thus cutting $37^m$ into the field circuit. Movement of the car switch to the fifth step opens switch $32^m$, cutting into the field circuit resistance $36^m$ and when the car switch is moved to the sixth and last step switch $33^m$ is opened and all the field resistance is cut into circuit.

The field coil circuit starts from wire $11^m$, passing through wire $27^m$ to $28^m$ and through the field resistances to $34^m$. When the motor is stopped, the reversing switch is held in the operative position, on one side or the other, by a spring as shown, or by gravity. With the reversing switch in either one of these positions, and E in the position in which it is drawn, the armature circuit is closed through R so that the motor can act as a generator and thus help the brake to retard the motion of the elevator.

Fig. 111 shows another controller on which the car switch is of the rotating type and moves 480 degrees, making eight steps, of 60 degrees each. The controller-mover C is of the three-current type. In this arrangement the circuit through the main switch is closed by the action of the reversing switch, the circuit through the latter being closed by the movement of the controller-mover. An additional magnet switch $11^n$ is provided to cut resistance into the armature circuit when the elevator is stopped. The car switch is represented as driven by a sprocket wheel and chain, the former being $26^n$ and the latter $28^n$. Contacts $24^n$ and $25^n$ are provided to cut the resistance $23^n$ in and out of circuit. In this case, a dash-pot is placed on the car switch, as indicated in the diagram, Fig. 112, which shows two ways of arranging the connection, one at $30^m$ and the other in broken lines at $33^n$. Both of these are different from the design shown in Fig. 100.

Fig. 113 shows still another modification in which the dash-pot is at $34^n$ and the plunger is guided by $35^n$ and $36^n$, and a cam $37^n$ is provided so as to impart at every point in the stroke the speed of plunger that may be required. The motor in this diagram is provided with two shunt field coils, through one of which the current remains constant, while through the other it is varied by the introduction of resistance in the same manner as in Fig. 110. The course of the current through the motor is the same as in the last diagram; therefore, we will only trace the current through the reversing and main switch magnets. If the controller-mover is turned so as to close switch $9^n$ the current will start from $1^n$ through wire $2^n$ and switch $3^n$ to wire $4^n$, then to S—M and back through $5^n$ to magnet $7^n$ of the reversing switch by wire $8^n$ to switch $9^n$ and through wire $10^n$ to magnet $11^n$ and to junction $12^n$. As will be seen with switch $13^n$ in the position shown, the resistance R is connected across the armature terminals, but as soon as the current traverses $11^n$, $13^n$ is raised, thus breaking the circuit through R. As soon as the current passes through magnet $7^n$, switch $3^n$ is drawn down and then the current in wire $1^n$ cannot pass to $2^n$ and to $4^n$, but must pass to $14^n$ and through magnet $15^n$ of the main switch to wire $16^n$ and thus reach $4^n$. From this it will be seen that the main switch cannot be closed until magnet $7^n$ has become energized and has closed the armature and field circuit connections for the desired direction of rotation and has also drawn down $3^n$ and thus opened the direct connection between $2^n$ and $4^n$. It will also be seen that magnet $11^n$ will act to open the circuit through R before the main switch is closed. The field resistances are connected in the coil A—S and the switches are arranged so that when the top one on the left side opens, it opens the circuit through A—S. To prevent serious sparking at the switch when this break occurs, the switch is arranged so as to close the circuit of A—S through the resistance shown directly to the left of these switches.

Figure 114:
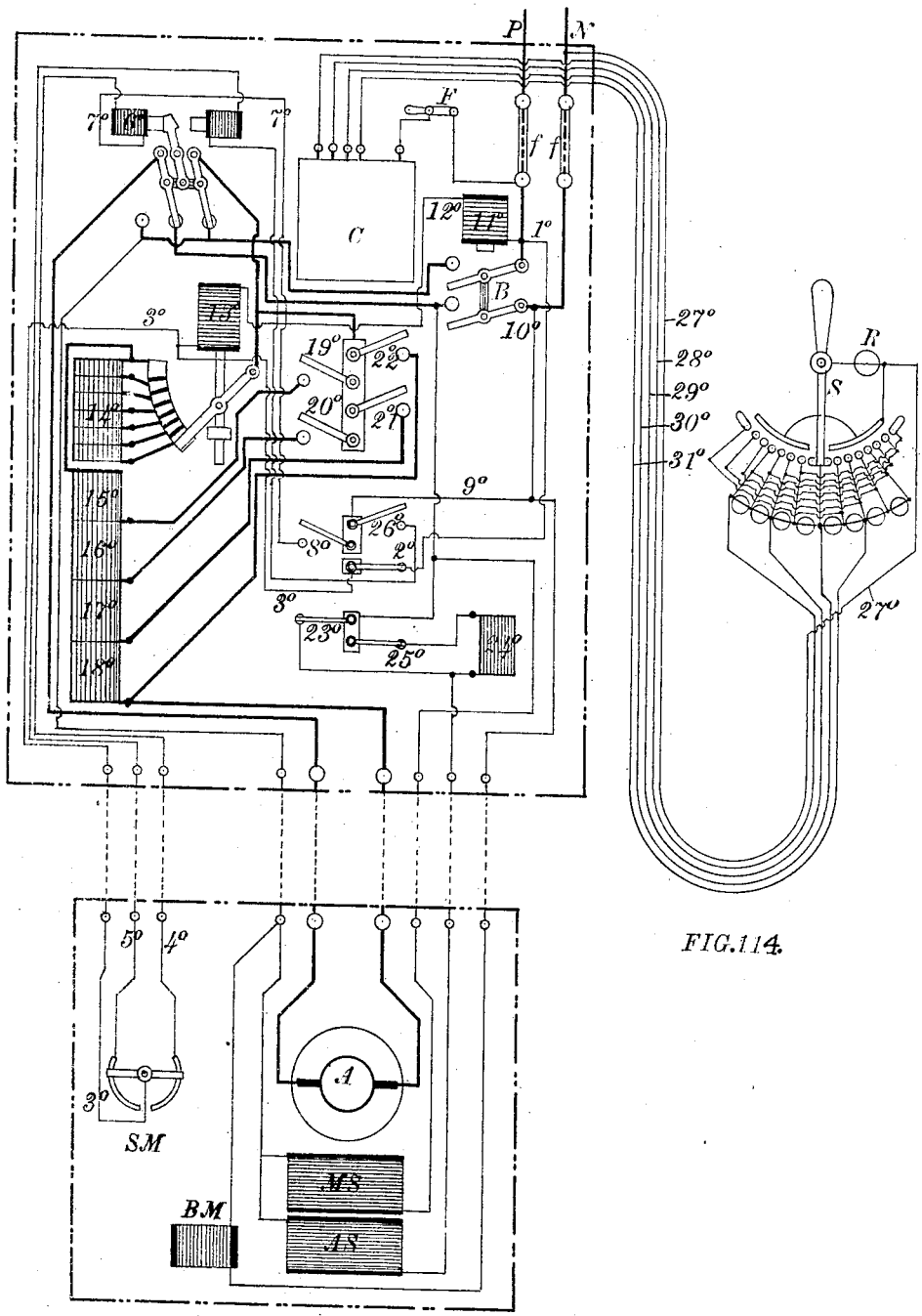

Fig. 114 shows another controller actuated by a four-current controller-mover arranged to rotate 630 degrees, divided into seven steps of 90 degrees each. In this arrangement, the main switch and the reversing switch magnets are actuated directly from the controller and an additional magnetic switch $13°$ is provided to cut out the accelerating resistance $14°$. The motor in this case is provided with two field coils the same as in the last diagram, and the opening of switch $23°$ cuts the resistance $24°$ into the circuit of one of the coils, while the opening of switch $25°$ opens the circuit through this coil. No arrangement is shown for closing the circuit of the disconnected coil through a resistance, as is the case in Fig. 111, but it will be readily seen that it can be so arranged. When the elevator is stopped, switch $2°$ is closed. If the controller-mover is turned so as to close $8°$ the current from $1°$ will pass to $2°$, thence to $3°$, and to $4°$, to reversing magnet $6°$, and wire $7°$, and to switch $8°$, and wire $9°$, to junction $10°$. From $1°$ there is a closed circuit through the magnet $11°$ of main switch through wire $12°$ to magnet $13°$, and thus to wire $3°$. But the connection through switch $2°$ short-circuits these two magnets; hence, so long as $2°$ remains closed, $11°$ and $13°$ will not be energized; thus the reversing switch will be drawn over into the position shown before the main switch is closed. In moving the controller to the first step, switch $8°$ is closed and immediately after switch $2°$ is opened, then switch B closes and completes the circuit through the motor. Magnet $13°$ will now begin to lift its switch lever and gradually cut out the resistance $14°$. The several steps of the controller close switches $19°$, $20°$, $21°$ and $22°$, one after the other, and then open switches $23°$ and $25°$.

Figure 115:
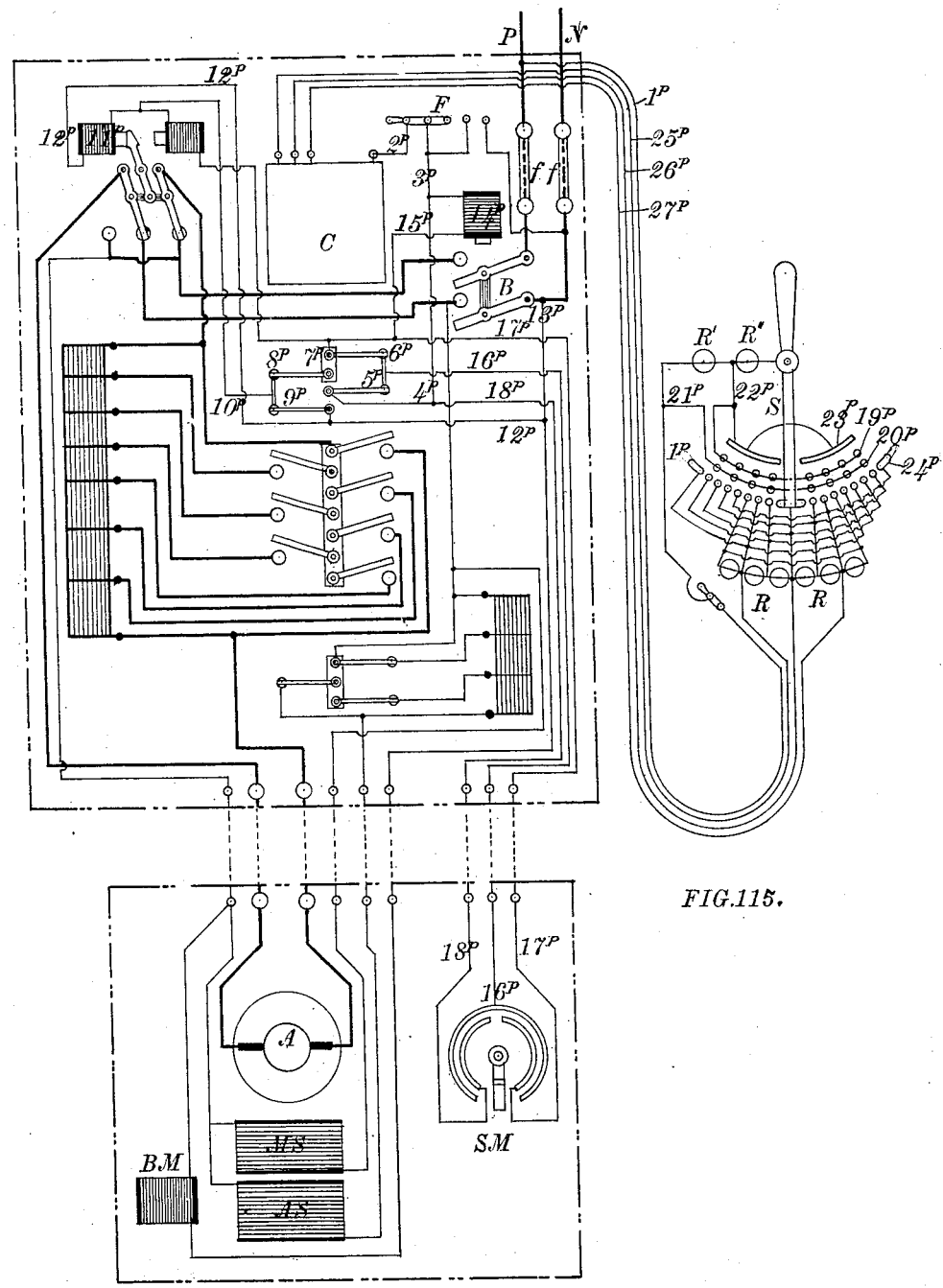

Fig. 115 shows a controller in which the magnets of the main and reversing switch are connected in the circuit of the controller-mover. This arrangement is desirable when the controller-mover is small and requires a small current as by introducing other magnets in the circuit, the E. M. F. available for the controller-mover is reduced, and thus the current strength is increased so that larger wire can be used. The current from the $13$ armature of the controller passes by wire $2^p$ through switch F to $3^p$ and to junction $4^p$, thence by switches $5^p$ and $6^p$ to $7^p$ and through switches $8^p$ and $9^p$ to wire $12^p$ and to junction $13^p$. Thus it will be seen that no current will pass through the magnet of B or that of the reversing switch, and this is the condition when the car is stopped. If the controller is turned so as to open $9^p$, then the current will pass to wire $10^p$ and through $11^p$ to wire $12^p$, thus energizing the reversing switch magnet and drawing the switch into the position shown. In moving the controller to the first step, switch $9^p$ is opened first, and immediately thereafter $6^p$ is opened. As soon as this last switch is opened the current from $3^p$ passes through magnet $14^p$ as it can go no further than $5^p$ by the former path. The opening of $9^p$ causes the reversing switch to make the proper circuit connections and the opening of $6^p$ connects the motor with the main line. The reverse motion of the elevator is obtained by opening switch $8^p$ first, and $5^p$ next. The switch of the stop-motion S—M is in this case arranged so as to short-circuit whichever one of the switches $5^p$ or $6^p$ may be open; thus, if in the upward motion, switch $5^p$ is opened, if S—M came into action it would rotate the switch lever counter-clockwise, so as to connect $16^p$ and $17^p$, thus closing the circuit between $5^p$ and $7^p$, and short-circuiting magnet $14^p$. In examining the car switch it will be seen that S in passing over the contacts can on some of the steps send current directly into the line wires, while on the intermediate steps the current will have to pass through one of the resistances R to reach either wire. If the resistances R are very large the difference in current that passes through the controller-mover in the different positions may be more than desired. For the purpose of equalizing the currents as much as may be required, two additional rows of contacts $19^p$ and $20^p$ connected with each other as shown are provided, and a resistance R'. The contacts are placed so that the resistance is short-circuited when the switch is on a contact intermediate between the points of attachment of the line wires, but is cut into the circuit when S is directly connected with these points. The contacts $23^p$ serve to cut resistance R'' out of circuit, except when the switch is in the central position or at either side, on the extreme end of $24^p$.

Figure 116:
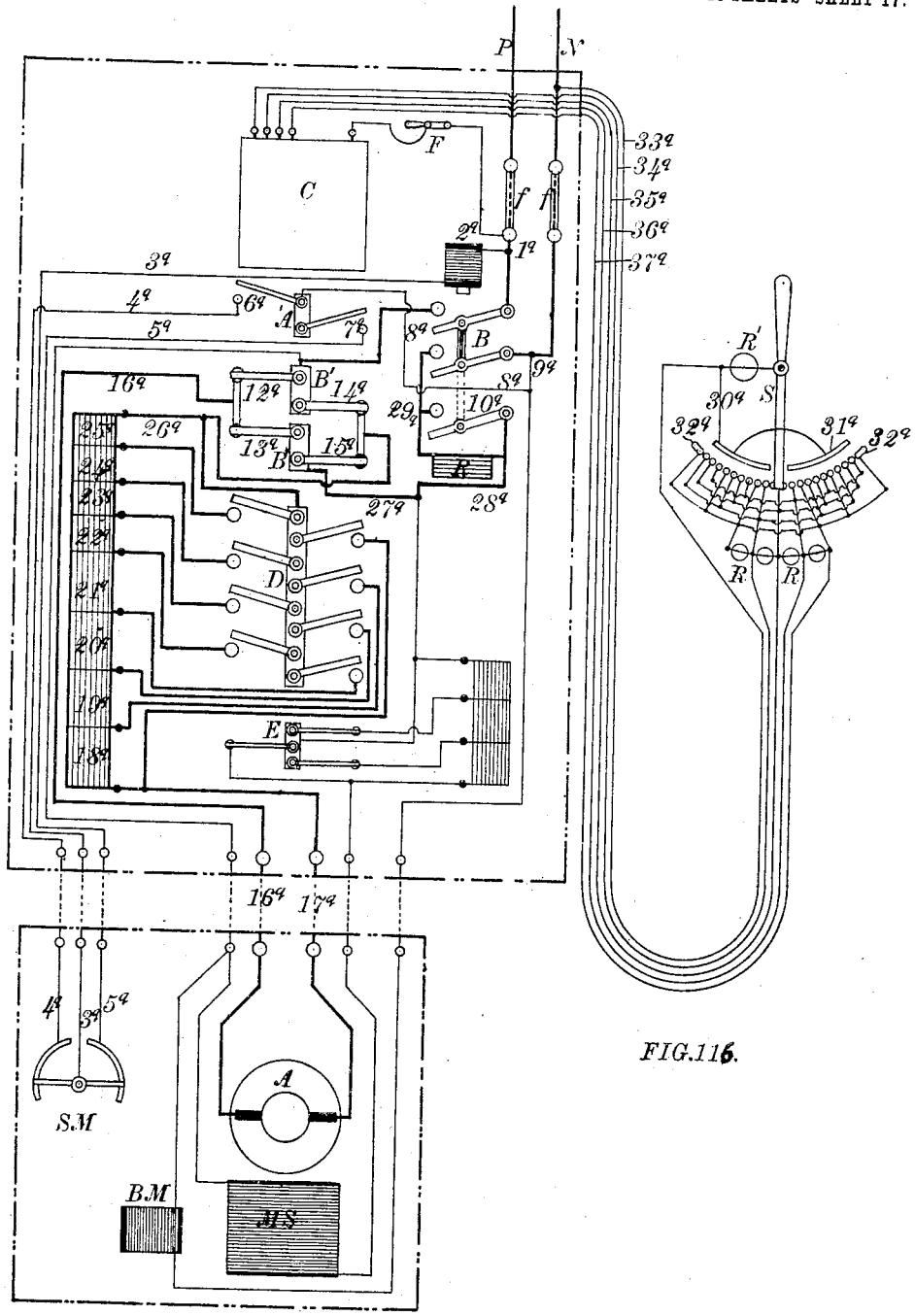

Fig. 116 shows a controller in which all the switches except the main switch are actuated by the controller-mover. The main switch B is actuated by magnet $2^q$. The reversing switches are located at B', B'. The switches D cut the resistance out of the armature circuit and switches E cut resistance in and out of the field coil circuit. With all the switches in the stop position, as shown in the diagram, the circuit starting from wire $16^q$ passes through the armature to wire $17^q$, and then through the armature, resistances $18^q$ to $25^q$, and through wire $26^q$ to the reversing switches and through these to the starting point, wire $16^q$. The field circuit starts from the upper end of the top B' and returns through wire $27^q$ to the lower end of the bottom B', thus completing the circuit. It will therefore be seen that when the motor is stopped, the field circuit is closed on itself, and so is the armature circuit, but the resistances $18^q$ to $25^q$ being in series with the armature the latter cannot generate a current of dangerous magnitude. When the controller-mover moves to the first step, the first action is to open two of the reversing switches, so as to break the short circuit in the armature circuit, and immediately after this operation is effected one of the switches A' is closed, thus closing the circuit through magnet $2^q$ and thereby closing the main switch B. The resistance R is introduced to prevent a possible short-circuiting of the main line should the main switch close before the reversing switches are opened, which condition could only occur if some part of the apparatus broke or got out of place in some other way. When the elevator is run in one direction, switches $13^q$ and $14^q$ are opened, and for motion in the other direction switches $12^q$ and $15^q$ are opened. When the main switch is open, $10^q$ is also open and current from contact $29^q$ cannot pass to wire $28^q$ except through R. When switch B is closed it also closes $10^q$, and then the current can pass directly from $29^q$ to wire $28^q$. Switch $10^q$ is insulated from B. The controller-mover in this diagram is of the four-current type and the switch is arranged to rotate through two and one-half turns, making ten steps of 90 degrees each. This car switch is of the type shown in Fig. 100.

Figure 117:
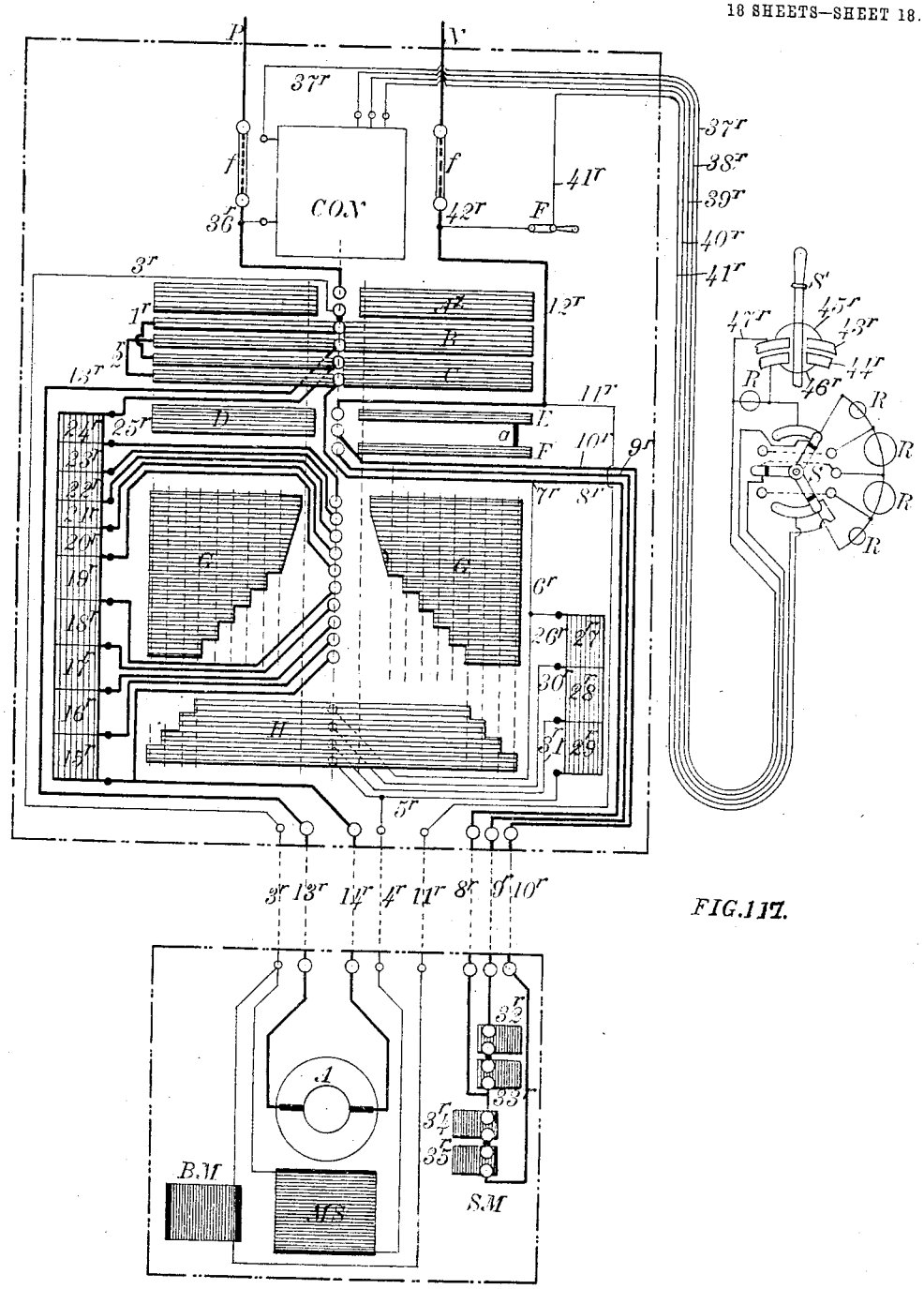

Fig. 117 is a diagram of a controller in which all the switches are actuated directly by the controller-mover. The car switch shown is of the three-phase type and is arranged to rotate the controller-mover armature through four revolutions, divided into ten steps, the first two being of 240 degrees, and the others of 120 degrees each. This switch is shown in Fig. 106. The controller-mover, marked "Con" is connected with the controller through gearing that reduces the motion in the ratio of 8 to 1, thus rotating the controller proper half a revolution in either direction. The controller is of the type commonly used for electric railway cars, that is, it consists of a cylinder upon the surface of which are contact plates of the proper shape to make the required circuit connections, and stationary contacts that press against these plates. In the diagram the shaded portions marked $A^\times$, B, C, D, E, F, G, H represent the plates on the surface of the rotating cylinder, rolled out on a flat surface, and the vertical row of small circles represent the stationary contacts. The plates A×, D, and E, F, close the connection with the main circuit, and plates B, C, reverse the armature connections. The space between the plates B and C on either side of the center line, which is the stop position, is so narrow that both sets of plates lap over the stationary contacts, thus closing the armature upon itself when the motor is stopped, in the same way as the switches B′, B′, do in Fig. 116. The plates G, G, cut the resistance in and out of the motor armature circuit, and plate H performs the same function with respect to the field circuit. If the controller-mover is turned to the first step to the right, plate A will connect the line P with wire 3$^r$, which leads to the field coil, and through plate B it will also connect it with wire 13$^r$, which leads to one side of the armature. From the other side of the armature the current passes through wire 14$^r$ and the armature resistances to 25$^r$ and thus to plate C and to wire 8$^r$. Through wire 8$^r$ the current runs to the switch S—M, at the center, and returns through wire 9$^r$ to plate F and through $a$ to plate E, and thus to wire 12$^r$ and the opposite side of the main line. In passing to the second step, the five upper sections of the armature resistance are cut out one after the other. In the succeeding steps, the armature resistance is cut out one section per step, and then field resistance is cut in, one section per step.

If the controller-mover is turned to the left, the only change effected is in the connections between wires 13$^r$ and 25$^r$, the former connecting with 8$^r$ and the latter with line wire P, and the connection of wire 10$^r$ with 12$^r$, instead of 9$^r$ with 12$^r$. The four narrow plates on a line with B, C, are for the purpose of reversing the connections of 13$^r$ and 25$^r$ and are commonly used in controllers of this type. The plates D, E, and F, together with wires 8$^r$, 9$^r$ and 10$^r$, are for the purpose of making the proper connections with the switch of the stop motion S—M. As will be seen, the contact plates 32$^r$, 33$^r$, close the circuit between wires 8$^r$ and 9$^r$, and plates 34$^r$, 35$^r$, close the circuit between wires 8$^r$ and 10$^r$. If S—M is rotated to the right, the circuit between 8$^r$ and 9$^r$ is opened and if it is moved to the left the circuit between 8$^r$ and 10$^r$ is opened. The plates D, E, F, serve to shift the connection of 8$^r$ from 9$^r$ to 10$^r$, or the reverse when the controller is turned to the opposite direction, so that if the switches S—M are opened on the down trip of the car, the circuit will be closed for the up trip as soon as the controller is reversed.

Having thus described the invention, the following is what is claimed as new therein:

1. In an electric elevator controlling system, the combination of a controller mover having an armature and constructed to vary its torque and angular position in concordance with variations in the currents transmitted to it, a car switch having connection with the controller mover, means constructed to vary the strength of currents transmitted through the switch to the controller mover in proper ratio to develop the torque and angular movement required in the controller mover armature, and a controller actuated by the controller mover to vary the velocity and direction of rotation of the elevator motor.

2. The combination of a car switch having means to divide a current into three branches and to vary their strength independently, also to vary the strength of the whole current, a controller mover having three sets of coils on one member, one for each branch current, the other member having one set traversed by all these currents, the width of the poles on one member and the width of the coils on the other member, being in a ratio of substantially 1 to 2, circuits connecting the car switch and the controller mover and a controller actuated by the controller mover adapted to vary the velocity and direction of rotation of the elevator motor.

3. In an electric elevator controller system, the combination of a controller-mover having a field and an armature and constructed to vary its torque and angular position in concordance with the variations transmitted to it, a car switch connected by a plurality of circuits with said controller-mover and having means adapted to divide a current into branches and to vary the strength of the current of the branches in proper ratio to produce the required rotation and torque of the controller-mover armature; and a controller actuated by the controller-mover and adapted to vary the velocity and direction of rotation of the elevator motor.

4. In an electric elevator controlling system, the combination of a controller-mover having a field and an armature a car switch connected by a plurality of circuits with said controller-mover and having means constructed to divide a current into branches and vary their strength independently, also to vary the strength of the whole current, the branch variations determining the angular position, and whole current variations determining the magnitude of torque of the controller-mover armature; suitable circuit connections; said controller-mover adapted to vary its torque and angular position in concordance with variations in the currents transmitted to it, and a controller actuated by the controller-mover and adapted to vary the velocity and direction of rotation of the elevator-motor.

5. The combination of a car switch having means constructed to divide a current into branches to vary the strength of the branch and whole currents independently, a controller-mover adapted to vary its torque and angular position in concordance with variation in the currents transmitted to it; variations in the branches being in accordance with the angular movement, variations in whole current being in accordance with torque, required of controller-mover armature; circuits connecting the switch and controller-mover, and a controller actuated by the controller-mover and adapted to vary the velocity and direction of rotation of the elevator-motor, substantially as described.

6. The combination of a controller-mover adapted to vary its torque and angular position in concordance with variations in the currents transmitted to it, a car switch provided with resistance, contacts and circuit connections to divide the current it receives into branches and vary the resistance in these, thereby producing rotation of the controller-mover armature and contacts for varying the resistance in main circuit of switch to vary the torque of said armature suitable circuit connections; and a controller actuated by the controller-mover adapted to vary the velocity and direction of rotation of the elevator motor.

7. The combination of a car switch provided with resistances, contacts and circuits to divide a current into branches and vary the strength of main and branch currents, having other contacts to cut additional resistance into main switch circuit when switch is in the stop position; suitable circuit connections; a controller-mover adapted to vary its torque and angular position in concordance with variations in the currents transmitted to it by the switch, and a controller actuated by the controller-mover and adapted to vary the velocity and direction of rotation of the elevator motor.

8. The combination of a controller-mover having a field and an armature, a car switch adapted to divide a current into branches, provided with a movable member through which resistances are cut in and out of main and branch circuits, to determine the angular position and torque of the controller-mover armature; suitable circuit connections; said controller mover adapted to vary its torque and angular position in concordance with variations in the currents transmitted to it by the switch, and a controller actuated by the controller-mover and adapted to vary the velocity and direction of rotation of the elevator motor.

9. The combination of a car switch adapted to divide a current into branches, provided with a movable member through which resistances are cut in or out of the main and branch circuits, movement in opposite directions producing variations in the branch circuits in inverse order; suitable circuit connections; a controller-mover adapted to vary its torque and angular position in concordance with variations in the currents transmitted to it, and a controller actuated by the controller-mover and adapted to vary the velocity and direction of rotation of the elevator motor.

10. The combination of a controller-mover having a field and an armature adapted to vary its torque and angular position in concordance with variations in the currents transmitted to it, a car switch adapted to divide a current into branches provided with a member movable step by step connecting with contacts at each step through which resistances are cut in or out of the main and branch circuits, to produce the angular position and torque required of the controller-mover armature at that step; suitable circuits connecting with the controller-mover, and a controller actuated by the controller-mover adapted to vary the velocity and direction of rotation of the elevator motor.

11. The combination of a controller-mover having a field and an armature adapted to vary its torque and angular position in concordance with variations in the currents transmitted to it; a car switch, its lever connected with a supply circuit, adapted to move over contacts connected with resistances and branch circuits, to connect these circuits in proper order, in any position, to obtain the ratio and magnitude of branch and main currents necessary to produce the angular position and torque required of the controller-mover armature for that position of the lever; circuits connecting with the controller-mover, and a controller actuated by the controller mover and adapted to vary the velocity and direction of rotation of the elevator motor.

12. The combination of a car switch, arranged substantially as described, provided with contacts, circuit connections and an auxiliary magnet switch through which the elevator motor is stopped when the car reaches the upper or lower limit of its travel; a controller-mover having a field and an armature adapted to vary its torque and angular position, in accordance with variations in the currents transmitted to it by the switch; suitable circuits connecting the switch with the controller-mover, and a controller actuated by the controller-mover adapted to vary the velocity and direction of rotation of the elevator motor.

13. The combination of a car switch, substantially as described, provided with circuits connecting with a switch operated by the tension of the elevator cables to stop the motor if cables become slack; a controller-mover adapted to vary its torque and angular position in concordance with variations in the currents transmitted to it by the switch; circuits connecting the switch with the controller-mover, and a controller actuated by the controller-mover adapted to vary the velocity and direction of rotation of the elevator motor.

14. The combination of a car switch, substantially as described, provided with circuits connecting with a switch to stop the elevator machine when the car reaches the limits of it stravel; a controller-mover adapted to vary its torque and angular position in concordance with variation in the currents transmitted to it by the switch; circuits connecting the switch with the controller-mover, and a controller actuated by the controller-mover adapted to vary the velocity and direction of rotation of the elevator motor.

15. In an electric elevator controlling system consisting of a car switch adapted to vary in proper ratio currents transmitted by it; a controller-mover consisting of a field and armature both wound with coils traversed by the car switch currents the flux of one part rotating in concordance with the relative variations in these currents and acting to draw the flux of the other part into parallelism with it, and a controller actuated by the controller-mover adapted to vary the velocity and direction of rotation of the elevator motor.

16. The combination of a car switch adapted to divide a current into branches and vary their strength in proper ratio; a controller-mover consisting of a field and armature both wound with coils traversed by the car switch currents, the flux of one part rotating in concordance with the relative variations in these currents and acting to draw the flux of the other part into parallelism with it; circuits connecting the switch with the controller-mover, and a controller actuated by the controller-mover adapted to vary the velocity and direction of rotation of the elevator motor.

17. The combination of a car switch adapted to divide a current into branches and vary their strength independently also to vary the strength of the whole current; a controller-mover consisting of a field and armature both wound with coils traversed by the car switch currents, the flux of one part rotating in concordance with the relative variations in these currents and acting to draw the flux of the other part into parallelism with it; the branch variations determining the angular position, and whole current variations determining the torque of the controller-mover armature; circuits connecting the switch with the controller-mover, and a controller actuated by the controller-mover adapted to vary the velocity and direction of rotation of the elevator motor.

18. The combination of a car switch provided with resistances, contacts and circuits, to divide the current into branches and vary the resistance in these, and contacts for varying resistance in main switch circuits; a controller-mover consisting of an armature and field both wound with coils through which the car switch currents pass, the flux of one part rotating in concordance with the relative variations in these currents and acting to draw the flux of the other part into parallelism with it; circuits connecting the switch with the controller-mover, and a controller actuated by the controller-mover adapted to vary the velocity and direction of rotation of the elevator motor.

19. The combination of a car switch adapted to divide a current into branches, provided with a movable member through which resistances are cut in or out of the branch and main switch circuits; a controller-mover consisting of a field and armature both wound with coils traversed by the switch currents, the flux of one part rotating in concordance with the relative variations in these currents and acting to draw the flux of the other part into parallelism with it; circuits connecting with the controller-mover, and a controller actuated by the controller-mover adapted to vary the velocity and direction of rotation of the elevator motor.

20. The combination of a car switch adapted to divide a current into branches provided with a member movable step by step, connecting with contacts at each step through which resistances are cut in or out of main and branch circuits; a controller-mover consisting of a field and armature, both wound with coils traversed by the switch currents, the flux developed in one part rotating in concordance with the relative variations in these currents and acting to draw the flux of the other part into parallelism with it; circuits connecting the switch with the latter, and a controller actuated by the controller-mover adapted to vary the velocity and direction of rotation of the elevator motor.

21. The combination of a controller-mover having a field and an armature, a car switch, its lever connected with the supply circuit, adapted to move over contacts connected with resistances and branch circuits, to connect these contacts in proper order in any position to obtain the ratio and magnitude of main and branch currents necessary to produce the angular position and torque required of the controller-mover armature for that position of the lever; circuits connecting the switch with the controller-mover; the field and armature of the controller-mover being both wound with coils traversed by the car switch currents, the flux developed in one part rotating in concordance with the relative variations in these currents, and acting to draw the flux of the other part into parallelism with it, and a controller actuated by the controller-mover and adapted to vary the velocity and direction of rotation of the elevator motor.

22. The combination of a controller-mover having a field and an armature, a car switch adapted to divide a current into branches and vary their strength in proper ratio to produce the required rotation and torque of the controller-mover armature; circuits connecting the switch with the controller-mover, one part of the controller-mover having separate coils for each car switch current, the other part having one coil traversed by all these currents, the multicoil parts determining the angular position of the controller-mover adapted to vary the velocity and direction of rotation of the elevator motor.

23. The combination of a controller-mover, having a field and an armature, a car switch adapted to divide a current into branches and to vary their strength, independently, also to vary the strength of the whole current, branch variations determining the angular position, and whole current variations the torque of the controller-mover armature; circuits connecting the switch with the controller-mover; one part of the controller-mover having separate coils for each car switch current, the other part having one coil traversed by all these currents, the multi-coil part determining the angular position of the controller-mover armature and both parts together determining the torque, and a controller actuated by the controller-mover adapted to vary the velocity and direction of rotation of the elevator motor.

24. The combination of a controller-mover having a field and an armature, a car switch provided with resistances, contacts and circuit connections to divide a current into branches and vary the resistances in these, thereby producing rotation of the controller-mover armature, and contacts for varying the resistance in the main switch circuit to vary the torque of said armature; circuits connecting the switch with the controller-mover; one part of the controller-mover having separate coils for each car switch current, the other part having one coil traversed by all these currents, the first-named part determining the angular position, and both parts together the torque of the controller-mover armature, and a controller actuated by the controller - mover adapted to vary the velocity and direction of rotation of the elevator motor.

25. The combination of a controller-mover having a field and an armature, a car switch adapted to divide a current into branches, provided with a movable member through which resistances are cut in or out of the main and branch circuits to determine the angular position and torque of the controller-mover armature; circuits connecting the switch with the controller-mover; one part of the controller-mover having separate coils for each car switch current, the other part having one coil traversed by all these currents, the multi-coil part determining the angular movement of the controller-mover armature, both parts together determining its torque, and a controller actuated by the controller-mover adapted to vary the velocity and direction of rotation of the elevator motor.

26. The combination of a controller-mover having a field and an armature, a car switch adapted to divide a current into branches provided with a member, movable step by step, connecting with contacts, at each step, through which resistances are cut in or out of the main and branch circuits to produce the angular movement and torque required of the controller-mover armature at that step; circuits connecting the switch with the controller - mover; the controller-mover having separate coils on one part for each car switch current and one coil on the other part for all these currents, the first-named part determining the angular position and both parts together the torque of the controller-mover armature, and a controller actuated by the controller-mover and adapted to vary the velocity and direction of rotation of the elevator motor.

27. The combination of a controller-mover having a field and an armature, a car switch adapted to divide a current into branches and vary their strength in proper ratio to produce the required angular movement and torque of the controller-mover armature; circuits connecting the switch with the controller - mover; one part of the controller-mover having separate coils concentrated at the edges, for each branch current, the other part having one coil traversed by all the currents, the first part producing the angular movement, both parts combined producing the torque, and a controller actuated by the controller-mover adapted to vary the velocity and direction of rotation of the elevator motor.

28. The combination of a controller-mover having a field and an armature, a car switch adapted to divide a current into branches and vary the strength of the whole current branch variations determining angular position, and whole current variations the torque of the controller-mover armature; one part of the controller-mover having separate coils concentrated at the edges, for each branch current, the other part having a single coil for all these currents, the first part determining the angular movement, and both parts combined the torque of the controller-mover armature; and a controller actuated by the controller-mover adapted to vary the velocity and direction of rotation of the elevator motor.

29. The combination of a controller-mover having a field and an armature, a car switch, provided with resistances, contacts and circuits, to divide a current into branches and vary the resistance in these, thereby producing rotation of the controller-mover armature, and contacts for varying the resistance in main switch circuit to vary the torque of said armature; circuits connecting the switch with the controller-mover; said controller-mover having separate coils concentrated at the edges for each branch current on one member, and one coil on the other member traversed by all these currents, the first part determining the angular movement, the second part the torque of the controller-mover armature, and a controller actuated by the controller-mover adapted to vary the velocity and direction of rotation of the elevator motor.

30. The combination of a controller-mover having a field and an armature, a car switch adapted to divide a current into branches, provided with a movable member through which resistances are cut in or out of the circuits to determine the angular position torque of the controller-mover armature; circuits connecting the switch with the controller-mover; said controller-mover having separate coils concentrated at the edges for each branch current on one member, and one coil traversed by all these currents on the other member, the first member determining the angular position, and both members combined the torque of the controller-mover armature, and a controller actuated by the controller-mover adapted to vary the velocity and direction of rotation of the elevator motor.

31. The combination of a controller-mover having a field and an armature, a car switch adapted to divide a current into branches and vary their strength in proper ratio to produce the required angular movement and torque of the controller-mover armature; circuits connecting the switch with the controller-mover; one part of said controller-mover having separate coils concentrated at the edges for each branch circuit, the other part having one coil traversed by all these currents, and poles of a width of about 180° less width of a coil on the other part, and a controller actuated by the controller-mover adapted to vary the velocity and direction of rotation of the elevator motor.

32. The combination of a controller-mover having a field and an armature, a car switch adapted to divide a current into branches and vary their strength, independently, also to vary the strength of the whole current, branch variations determining the angular position and whole current variations, the torque of the controller-mover armature; circuits connecting said switch with the controller-mover; said controller-mover having separate coils concentrated at the edges on one member for each branch current, and a single coil for all these currents on the other member, and poles of a width of 180° less the width of a coil on the first member, and a controller actuated by the controller-mover adapted to vary the velocity and direction of rotation of the elevator motor.

33. The combination of a controller-mover having a field and an armature, a car switch, provided with resistances, contacts and circuits, to divide current into branches, having other contacts to cut additional resistance into the main switch circuit when the switch is in the stop position; circuits connecting said switch with the controller-mover; said controller-mover having separate coils concentrated at the edges for each branch current, on one member; and one coil for all these currents, on the other member, and poles of a width of 180 degrees less the width of a coil on the first member, and a controller actuated by the controller-mover adapted to vary the velocity and direction of rotation of the elevator motor.

34. The combination of a controller-mover having a field and an armature, a car switch adapted to divide a current into branches provided with a movable member through which resistances are cut in or out of the main and branch circuits to determine the torque and angular position of the armature of the controller-mover; circuits connecting said switch with the controller-mover; said controller-mover having separate coils concentrated at the edges for each branch current, on one member, the other member having a single coil and poles 180 degrees wide less the width of a coil on the first-named member, and a controller actuated by the controller-mover adapted to vary the velocity and direction of rotation of the elevator motor.

35. The combination of a controller-mover having a field and an armature, a car switch adapted to divide a current into branches, provided with a member, movable step by step, connecting with contacts at each step, through which resistances are cut in or out of the circuits, to produce the angular position and torque required of the controller-mover armature at that step; circuits connecting said switch with the controller-mover; said controller-mover having separate coils concentrated at the edges for each branch current, on one member, the other member having a single coil, and poles 180 degrees wide less width of a coil on first member, and a controller actuated by the controller-mover adapted to vary the velocity and direction of rotation of the elevator motor.

36. The combination of a controller-mover having a field and an armature, a car switch adapted to divide a current into branches and vary their strength in proper ratio to produce the required angular movement and torque in the controller-mover; circuits connecting said switch with the controller-mover; one part of said controller-mover having separate coils for each branch current that develop fluxes in different directions, their resultant rotating in concordance with variations in the branch currents, and carrying the armature around with it, the other part having a single coil traversed by all the currents, its flux acting with the rotating flux to develop the armature torque, and a controller actuated by the controller-mover adapted to vary the velocity and direction of rotation of the elevator motor.

37. The combination of a controller-mover having a field and an armature, a car switch adapted to divide a current into branches and vary their strength, independently, also to vary the strength of whole current, branch variations determining the angular movement and whole current variations the torque of the controller-mover armature; circuits connecting said switch with the controller-mover; one part of said controller-mover having separate coils for each branch current that develop fluxes in different directions, their resultant rotating in concordance with variation in the branch currents, and carrying the armature around with it, the other part having a single coil traversed by all the branch currents, its flux acting with the rotating flux to develop the armature torque; and a controller actuated by the controller-mover adapted to vary the velocity and direction of rotation of the elevator motor.

38. The combination of a controller-mover having a field and an armature, a car switch adapted to divide a current into branches and vary the strength of the branch and whole current independently, variations in the branches being in accordance with the angular movement required in the controller-mover, and variations in the whole current being in accordance with the torque required; circuits connecting said switch with the controller-mover; one part of the controller-mover having separate coils for each branch current that develop fluxes in different directions, their resultant rotating in concordance with variations in the branch currents and carrying the armature around with it, the other part having a single coil traversed by all the branch currents, its flux acting with the rotating flux to develop the torque; and a controller actuated by the controller-mover adapted to vary the velocity and direction of rotation of the elevator motor.

39. The combination of controller-mover having a field and an armature, a car switch provided with resistances contacts and circuits, to divide a current into branches and vary the resistance in these, thereby producing rotation of the controller-mover armature, and contacts for varying the resistance in main switch circuit to vary the torque of said armature; circuits connecting said switch with the controller-mover; said controller-mover having separate coils for each branch current on one member, that develop fluxes in different directions, their resultant rotating in concordance with variations in the branch currents, the other part having a single coil traversed by all the branch currents, its flux acting with the rotating flux to develop the torque of the controller-mover armature; and a controller actuated by the controller-mover adapted to vary the velocity and direction of rotation of the elevator motor.

40. The combination of a controller-mover having a field and an armature, a car switch, adapted to divide a current into branches, provided with a movable member through which resistances are cut in or out of the circuits, movement in opposite directions producing variations in the branch circuits in the inverse order; circuits connecting said switch with the controller-mover; one part of said controller-mover having separate coils for each branch current that develop fluxes in different directions, their resultant rotating in concordance with the variations in the branch currents and carrying the armature around with it, the other part having a single coil traversed by all the currents, its flux acting with the rotating flux to develop the torque of the armature; and a controller actuated by the controller-mover adapted to vary the velocity and direction of rotation of the elevator motor.

41. The combination of a controller-mover having a field and an armature, a car switch adapted to divide a current into branches and vary their strength in proper ratio to produce the required rotation and torque of the controller-mover; armature; circuits connecting the said switch with the controller-mover; one part of said controller-mover having separate coils for each branch current, the other part having one coil through which all these currents pass, and another coil through which a separate current is passed; and a controller actuated by the controller-mover adapted to vary the velocity and direction of rotation of the elevator motor.

42. The combination of a controller-mover having a field and an armature, a car switch adapted to divide a current into branches and vary their strength, independently, also to vary the strength of whole current, branch current variations determining the angular movement, and whole current variations, the torque of the controller-mover armature; circuits connecting the switch with the controller-mover; said controller-mover having separate coils for each branch current, on one member, and one coil for all these currents, on the other member, and another coil through which a separate current is passed, and a controller actuated by the controller-mover adapted to vary the velocity and direction of rotation of the elevator motor.

43. The combination of a controller-mover having a field and an armature, a car switch provided with resistances, contacts and circuits to divide a current into branches and vary their resistances, thereby producing rotation of the controller-mover armature and contacts for varying the resistance in main switch circuit to vary the torque of said armature; circuits connecting said switch with the controller-mover; one part of said controller-mover having separate coils for each branch current and the other part having one coil for all these currents and another coil through which a separate current is passed; and a controller actuated by the controller-mover adapted to vary the velocity and direction of rotation of the elevator motor.

44. The combination of a controller-mover having a field and an armature, a car switch adapted to divide a current into branches, provided with a movable member through which resistances are cut in or out of the main and branch circuits, movement in opposite directions producing variations in the branch circuits in the inverse order; circuits connecting said switch with the controller-mover; said controller-mover having separate coils on one member for each branch current and one coil on the other member for all these currents and an additional coil through which a separate current is passed; and a controller actuated by the controller-mover adapted to vary the velocity and direction of rotation of the elevator motor.

45. The combination of a controller-mover having a field and an armature, a car switch adapted to divide a current into branches and vary their strength in proper ratio to develop the angular movement and torque required in the controller-mover armature; circuits connecting said switch with the controller-mover; said controller-mover being provided with circuit connections to pass additional current through the armature at points in its rotation where excessive torque is required; and a controller actuated by the controller-mover adapted to vary the velocity and direction of rotation of the elevator motor.

46. The combination of a controller-mover having a field and an armature, a car switch adapted to divide a current into branches and vary their strength, independently, also to vary the strength of whole current, branch variations determining the angular movement, and whole current variations the torque of the controller-mover armature; circuits connecting said switch with the controller-mover; said controller-mover being provided with circuit connections to pass additional current through the armature at points in its rotation where excessive torque is required; and a controller actuated by the controller-mover adapted to vary the velocity and direction of rotation of the elevator motor.

47. The combination of a controller-mover having a field and an armature, a car switch provided with resistances, contacts and circuits, to divide a current into branches and vary the strength of main and branch currents, having other contacts to cut additional resistance into main switch circuit when switch is in the stop position; circuits connecting said switch with the controller-mover; said controller-mover being provided with circuit connections to pass additional current through the armature at points in its rotation where excessive torque is required; and a controller actuated by the controller-mover adapted to vary the velocity and direction of rotation of the elevator motor.

48. The combination of a controller-mover having a field and an armature, a car switch adapted to divide a current into branches provided with a movable member through which resistances are cut in or out of the circuits, movement in opposite directions producing variations in the branch circuits in the inverse order; circuits connecting said switch with the controller-mover; said controller-mover being provided with circuit connections to pass additional current through the armature at points in its rotation where excessive torque is required; and a controller actuated by the controller-mover adapted to vary the velocity and direction of rotation of the elevator motor.

49. The combination of a controller-mover having a field and an armature, a car switch adapted to divide a current into branches and vary their strength in proper ratio to develop the required torque and angular movement in the controller-mover; circuits connecting said switch with the controller-mover; said controller-mover being adapted to vary its torque and angular position in concordance with variations in the currents transmitted to it, and a controller actuated by the controller-mover, consisting of switches, resistances and circuits connecting it with the elevator motor, and adapted to control the motion of the latter.

50. The combination of a controller-mover having a field and an armature, a car switch adapted to divide a current into branches and vary their strength independently, also to vary the strength of whole current, branch variations determining the angular movement of the controller armature, and whole current variations, determining the torque; circuits connecting said switch with the controller mover; said controller-mover being adapted to vary its torque and angular position in concordance with variations in the currents transmitted to it; and a controller actuated by the controller-mover, consisting of switches, resistances and circuits connecting with the elevator motor, and adapted to control the motion of said motor.

51. The combination of a controller-mover having a field and an armature, a car switch provided with resistances, contacts and circuits, to divide a current into branches and vary the resistances in these, thereby producing rotation of the controller-mover armature, and other contacts for varying the resistance in main switch circuit to vary the torque of said armature; circuits connecting said switch with the controller-mover; said controller-mover being adapted to vary its torque and angular position in concordance with variations in the currents transmitted to it; and a controller actuated by the controller-mover, consisting of switches, resistances and circuits connecting with the elevator motor and adapted to control the motion of said motor.

52. The combination of a controller-mover having a field and an armature, a car switch adapted to divide a current into branches provided with a movable member through which resistances are cut in or out of the circuits, movement in opposite directions producing variations in the branch circuits in the inverse order; circuits connecting said switch with the controller-mover; said controller-mover being adapted to vary its torque and angular position in concordance with variations in the currents transmitted to it; and a controller actuated by the controller-mover, consisting of switches, resistances and circuits connecting it with the elevator motor, and adapted to control the motion of said motor.

53. The combination of a controller-mover having a field and an armature, a car switch adapted to divide a current into branches and vary their strength in proper ratio to produce the required angular movement and torque in the controller-mover armature; circuits connecting said switch with the controller-mover; said controller-mover having its field and armature both wound with coils traversed by the car switch currents, the flux of one part rotating in concordance with the relative variations in these currents, and acting to draw the flux of the other part into parallelism with it; and a controller actuated by the controller-mover consisting of switches, resistances and circuits connecting with the elevator, and adapted to control the motion of the latter.

54. The combination of a controller-mover having a field and an armature, a car switch provided with resistances, contacts and circuits through which to divide a current into branches and vary the resistances in these, thereby producing rotation of the controller-mover; and contacts for varying the resistance in main switch circuit to vary the torque of said armature; circuits connecting said switch with the controller-mover; said controller-mover having its field and armature both wound with coils traversed by the car switch currents; the flux of one part rotating in concordance with variations in the currents and acting to draw the flux of the other part into parallelism with it, and a controller actuated by the controller-mover, consisting of switches, resistances and circuits connecting it with the elevator motor, and adapted to control the motion of said motor.

55. The combination of a controller-mover having a field and an armature, a car switch adapted to divide a current into branches provided with a movable member through which resistances are cut in or out of the circuits, movement in opposite directions producing variations in the branch circuits in the inverse order; circuits connecting said switch with the controller-mover; said controller-mover having its field and armature both wound with coils traversed by the car switch currents, the flux of one part rotating in concordance with variations in these currents, and acting to draw the flux of the other part into parallelism with it; and a controller actuated by the controller-mover consisting of switches, resistances and circuits connecting it with the elevator motor and adapted to control the motion of the said motor.

56. The combination of a controller-mover having a field and an armature, a car switch adapted to divide a current into branches, provided with a member movable step by step, connecting with contacts at each step through which resistances are cut in or out of the main and branch circuits to produce the angular position and torque required, of the controller-mover armature at that step, circuits connecting said switch with the controller-mover; said controller-mover having its field and armature both wound with coils traversed by the car switch currents, the flux of one part rotating in concordance with variations in these currents, and acting to draw the flux of the other part into parallelism with it; and a controller actuated by the controller-mover, consisting of switches, resistances and circuits connecting it with the elevator motor, and adapted to control the motion of said motor.

57. The combination of a controller-mover having a field and an armature; a car switch adapted to divide a current into branches and vary their strength independently, also to vary the strength of the whole current, branch variations determining the angular movement and whole current variations the torque of the controller-mover armature; circuits connecting said switch with the controller-mover; one part of said controller-mover having separate coils wound concentrated at the edges for each branch current, the other part having one coil traversed by all these currents, the first determining the angular movement, and both combined the torque of the controller-mover armature; and a controller actuated by the controller-mover, consisting of switches, resistances and circuits connecting with the elevator motor adapted to control the motion of said motor.

58. The combination of a controller-mover having a field and an armature, a car switch provided with resistances, contacts and circuit connections for dividing a current into branches, and vary the resistances in these to produce rotation of the controller-mover armature; and contacts for varying the resistance in main switch circuit to vary the torque of said armature; circuits connecting said switch with the controller-mover; one part of said controller-mover having separate coils concentrated at the edges for each branch current, the other part having one coil traversed by all these currents, the first-named part determining the angular movement of the controller-mover armature; and both parts combined determining the torque; and a controller actuated by the controller-mover consisting of switches, resistances and circuits connecting with the elevator motor, and adapted to control the motion of said motor.

59. The combination of a controller-mover having a field and an armature; a car switch adapted to divide a current into branches provided with a movable member through which resistances are cut in or out of the circuits to determine the angular position and torque of the controller-mover armature; circuits connecting said switch with the controller-mover; one part of said controller-mover having separate coils concentrated at the edges for each branch current, the other part having one coil traversed by all these currents, the first-named part determining the angular movement and both combined determining the torque of the controller-mover armature; and a controller actuated by the controller-mover, consisting of switches, resistances and circuits connecting with the elevator motor and adapted to control the motion of said motor.

60. The combination of a controller-mover having a field and an armature; a car switch adapted to divide a current into branches and vary the strength in proper ratio to produce the required angular movement and torque of the controller-mover armature; circuits connecting said switch with the controller-mover, one part of said controller-mover having separate coils concentrated at the edges for the branch currents the other part having one coil traversed by all these currents and poles 180 degrees wide less the width of a coil on the first-named part; and a controller actuated by the controller-mover, consisting of switches, resistances and circuits connecting with the elevator motor and adapted to control the motion of said motor.

61. The combination of a controller-mover having a field and an armature; a car switch adapted to divide a current into branches and vary their strength independently, also to vary the strength of the whole current, branch variations determining the angular movement, and whole current variations determining the torque of the controller-mover armature; circuits connecting the switch with the controller-mover, one part of said controller-mover having separate coils concentrated at the edges for each branch circuit, the other part having one coil traversed by all these currents and poles 180 degrees wide less the width of a coil on first-named part; and a controller actuated by the controller-mover, consisting of switches, resistances and circuits connecting with the elevator motor adapted to control the motion of said motor.

62. The combination of a controller-mover having a field and an armature; a car switch provided with resistances, contacts and circuits to divide a current into branches and vary the resistance in them, to produce rotation of the controller-mover armature; and contacts for varying the resistance in main switch circuit to vary the torque of said armature; one part of said controller-mover having separate coils concentrated at the edges for each branch current, the other part having one coil traversed by all these currents and poles 180 degrees wide less the width of a coil on first-named part; circuits connecting controller-mover and car switch; and a controller actuated by the controller-mover consisting of switches, resistances and circuits connecting with the elevator motor adapted to control the motion of said motor.

63. The combination of a controller-mover having a field and an armature; a car switch adapted to divide a current into branches provided with a movable member through which resistances are cut in or out of branch and main circuits, to determine the torque and angular position of controller-mover armature; one part of said controller-mover having separate coils concentrated at the edges for each branch current, the other part having one coil for all these currents, and poles 180 degrees wide less width of a coil on first-named part; connecting circuits between controller-mover and switch, and a controller actuated by the controller-mover consisting of switches, resistances and circuits connecting with the elevator motor adapted to control the motion of said motor.

64. The combination of a controller-mover having a field and an armature; a car switch adapted to divide a current into branches and vary their strength independently also to vary the strength of whole current, branch variations determining the angular movement, and whole current variations the torque of controller-mover armature; one part of said controller-mover having separate coils for each branch current that develop fluxes in different directions, their resultant rotating in accordance with variations in the branch current, the other part having one coil traversed by all these currents, its flux acting with the rotating flux to develop the torque and determine the angular movement of the armature; connecting circuits between switch and controller-mover; and a controller actuated by the controller-mover consisting of switches, resistances and circuits connecting with the elevator motor and adapted to control the motion of said motor.

65. The combination of a controller-mover having a field and an armature; a car switch provided with resistances contacts and circuits to divide the current into branches, and vary the strength of main and branch currents, having other contacts to cut additional resistance into main circuit when switch is in stop position, one part of said controller-mover having separate coils for each branch current that develop fluxes in different directions, their resultant rotating in accordance with variations in the branch currents, the other part having one coil through which all the currents pass, its flux acting with the rotating flux to develop the torque of controller-mover armature, and also its angular movement; circuits connecting the switch and controller-mover; and a controller actuated by the controller-mover consisting of switches, resistances and circuits connecting with the elevator motor and adapted to control the motion of said motor.

66. The combination of a controller-mover having a field and an armature; a car switch adapted to divide a current into branches, provided with a movable member through which resistances are cut in or out of the main and branch circuits to determine the angular movement and torque of the controller-mover armature; said controller-mover having separate coils for each branch current on one member, that develop fluxes in different directions, their resultant rotating in concordance with variations in the branch currents, carrying the armature around with it, the other part having one coil traversed by all these currents, its flux acting with the rotating flux to determine the torque of armature; circuits connecting the switch and controller-mover; and a controller actuated by the controller-mover, consisting of switches, resistances and circuits connecting with the elevator motor and adapted to control the motion of said motor.

67. The combination of a controller-mover having a field and an armature; a car switch adapted to divide a current into branches and vary their strength independently, also to vary the strength of whole current, branch variations determining the angular position of controller-mover armature whole current variations determining the torque; said controller-mover being provided with circuit connections to pass additional current through the armature at points in its rotation where excessive torque is required; circuits connecting switch and controller mover; and a controller actuated by the controller-mover consisting of switches, resistances and circuits connecting it with the elevator motor and adapted to control the motion of said motor.

68. The combination of a controller-mover having a field and an armature; a car switch adapted to divide a current into branches, provided with a movable member through which resistances are cut in or out of the main and branch circuits to determine the angular position and torque of the controller-mover armature; said controller-mover being provided with circuit connections to pass additional current through the armature at points in its rotation where excessive torque is required; circuits connecting switch and controller-mover; and a controller actuated by the controller-mover consisting of switches, resistances and circuit connections with the elevator motor adapted to control the motion of said motor.

69. The combination of a controller-mover having a field and an armature; a car switch provided with resistances, contacts and circuits to divide a current into branches and vary the resistance in these, thereby producing rotation of the controller-mover armature, and contacts for varying the resistance in switch circuit, to vary the torque of said armature; said controller-mover being provided with circuit connections to pass additional current through the armature at points in its rotation where excessive torque is required; circuits between switch and controller-mover; and a controller actuated by the controller-mover consisting of switches, resistances and circuits connecting with the elevator motor and adapted to control the motion of said motor.

70. The combination of a controller-mover having a field and an armature; a car switch connected by a plurality of circuits with said controller-mover, and adapted to divide a current into branches and vary the strength of the branch currents in proper ratio to produce the required rotation and torque of the controller-mover armature; said controller-mover having its field and armature both wound with coils traversed by the car switch currents, the flux of one part rotating in concordance with the relative variations in these currents and acting to draw the flux of the other part in parallelism with it; magnetic switches which control the motion of the elevator motor; and a controller having switches actuated by the controller-mover that control the circuits of the magnetic switches which control the motion of the elevator motor.

71. The combination of a controller-mover having a field and an armature; a car switch connected by a plurality of circuits with said controller-mover, and provided with resistances, contacts and circuits to divide a current into branches and vary the resistances in these, thereby producing rotation of the controller-mover armature, and contacts for varying the resistance in main switch circuit to vary the torque of said armature; said controller-mover having its field and armature both wound with coils traversed by the switch currents, the flux of one part rotating in concordance with variations in the current and acting to draw the flux of the other part into parallelism with it; magnetic switches which control the motion of the elevator motor; and a controller having switches actuated by the controller-mover that control the circuits of the magnetic switches which control the motion of the elevator motor.

72. The combination of a controller-mover having a field and an armature; a car switch connected by a plurality of circuits with said controller-mover, and adapted to divide a current into branches, provided with a movable member through which resistances are cut in or out of the circuits to determine the angular movement and torque of controller-mover-armature; said controller-mover having its field and armature both wound with coils traversed by the switch currents, the flux of one part rotating in concordance with the relative variations in the currents and acting to draw flux of the other part into parallelism with it; magnetic switches which control the motion of the elevator motor; and a controller having switches actuated by the controller-mover that control the circuits of the magnetic switches which control the motion of the elevator motor.

73. The combination of a controller-mover having a field and an armature; a car switch connected by a plurality of circuits with said controller-mover, and adapted to divide a current into branches and vary the strength of the current of said branches in proper ratio to develop the required rotation and torque of the controller-mover armature; one part of said controller-mover having coils for each current wound concentrated at the edges, the other part having one coil traversed by all these currents, the first determining the angular movement of the armature, both together determining the torque; magnetic switches which control the motion of the elevator motor; and a controller having switches actuated by the controller mover that control the circuits of the magnetic switches which control the motion of the elevator motor.

74. The combination of a controller-mover, a car switch adapted to divide a current into branches and vary their strength, independently, also to vary the strength of whole current, first variations determining the angular movement and second variations the torque of controller-mover armature one part of said controller-mover having separate coils for each branch current concentrated at the edges, the other part having one coil traversed by all these currents, the first determining the angular position of the armature, both parts together determining the torque; circuits connecting switch and controller-mover, magnetic switches which control the motion of the elevator motor; and a controller having switches actuated by the controller mover that control the circuits of the magnetic switches which control the motion of the elevator motor.

75. The combination of a controller-mover, a car switch, provided with resistances, contacts and circuits to divide a current into branches and vary the resistance in these, and contacts for varying the resistance in main switch circuit; said controller-mover having separate coils wound concentrated at the edges for each branch current on one member, the first determining the angular position of the armature and both together determining the torque; connecting circuits between switch and controller-mover; magnetic switches which control the motion of the elevator motor; and a controller having switches actuated by the controller-mover that control the circuits of the magnetic switches which control the motion of the elevator motor.

76. The combination of a controller mover, a car switch adapted to divide a current into branches, provided with a movable member through which resistances are cut in or out of the circuits to determine the angular movement and torque of the controller mover armature; one part of said controller mover having separate coils wound concentrated at the edges for each branch current, the other part having one coil for all these currents, the first determining the angular movement and both together the torque of the armature; circuits connecting switch and controller-mover; magnetic switches which control the motion of the elevator motor; and a controller having switches actuated by the controller mover that controls the circuits of the magnetic switches which control the motion of the elevator motor.

77. The combination of a controller mover having a field and armature, a car switch connected by a plurality of circuits with said controller mover and adapted to divide a current into branches and vary the strength of the current of the branches in proper ratio to develop the required torque and angular motion of the controller-mover armature; said controller mover having its field and armature both wound with coils traversed by the switch currents, the flux of one part rotating in concordance with the relative variations in these currents, and acting to draw the flux of the other part into parallelism with it; magnetic main and reversing switches; resistance for the elevator motor circuits; and the controller having switches actuated by the controller-mover, some of which control the circuits of magnetic main and reversing switches, the others acting to cut resistance in or out of the elevator motor circuits.

78. The combination of a controller mover having a field and an armature, a car switch connected by a plurality of circuits with said controller-mover and adapted to divide a current into branches and vary the strength of the current of said branches independently, also to vary the strength of whole current, branch variations determining the angular position of the controller-mover armature; whole current variations determining its torque; said controller-mover having its field and armature, both wound with coils traversed by the switch currents, the flux of one part rotating in accordance with the relative variations in these currents, and acting to draw the flux of the other part into parallelism with it; magnetic main and reversing switches; resistance for the elevator motor circuits; and the controller having switches actuated by the controller-mover, some of which control the circuits of magnetic main and reversing switches, the others acting to cut resistance in or out of the elevator motor circuits.

79. The combination of a controller-mover having a field and an armature, a car switch connected by a plurality of circuits with said controller mover and provided with resistances, contacts and circuits to divide a current into branches and vary the strength of main and branch currents, having other contacts to cut additional resistance into the main switch circuit when switch is in the stop position; said controller mover having its field and armature both wound with coils traversed by the switch currents, the flux of one part rotating in concordance with the relative variations in these currents and acting to draw the flux of the other part into parallelism with it; magnetic main and reversing switches; resistance for the elevator motor circuits; and the controller, having switches actuated by the controller-mover, some of which control the circuits of magnetic main and reversing switches, the others acting to cut resistance in or out of the circuits of the elevator motor.

80. The combination of a controller mover having a field and an armature, a car switch connected by a plurality of circuits with said controller mover and adapted to divide a current into branches, provided with a movable member to cut resistance in and out of the circuits, and thus determine the angular movement and torque of the controller-mover armature; said controller-mover having its field and armature both wound with coils traversed by the switch currents, the flux of one part rotating in concordance with the relative variations in these currents and acting to draw the flux of the other part into parallelism with it; magnetic main and reversing switches; resistance for the elevator motor circuits; and the controller having switches actuated by the controller-mover, some of these controlling the circuits of magnetic main and reversing switches, the others acting to cut resistance in or out of the circuits of the elevator motor.

81. The combination of a controller mover having a field and an armature, a car switch connected by a plurality of circuits with said controller-mover and adapted to divide a current into branches and vary their strength in proper ratio to develop the required torque and angular movement of controller-mover armature; one part of said controller mover having separate coils concentrated at the edges for each branch current, the other part having one coil traversed by all these currents, and poles 180 degrees wide less width of a coil on the other part; magnetic main and reversing switches; resistance for the elevator motor circuits; and a controller having switches actuated by the controller mover, some of these controlling the circuits of magnetic main and reversing switches, the others acting to cut resistance in or out of the circuits of the elevator motor.

82. The combination of a controller mover, having a field and armature, a car switch connected by a plurality of circuits with said controller mover and adapted to divide a current into branches, to vary the strength of branch and whole currents, independently; one part of said controller mover having separate coils wound concentrated at the edges, for each branch current, the other part having a single coil and poles 180 degrees wide less the width of a coil on the first part; magnetic main and reversing switches; resistance for the elevator motor circuits; and a controller having switches actuated by the controller mover, some of these controlling the circuits of magnetic main and reversing switches, the others acting to cut resistance in or out of the circuits of the elevator motor.

83. The combination of a controller mover having a field and an armature, a car switch connected by a plurality of circuits with said controller mover and provided with resistances, contacts and circuits to divide a current into branches and vary the strength of main and branch currents, having other contacts to cut extra resistance into main switch circuit, when latter is in stop position, one part of said controller mover having separate coils for each branch wound concentrated at the edges, the other part having one coil and poles 180 degrees wide less width of a coil on first named part; magnetic main and reversing switches; resistance for the elevator motor circuits; having switches actuated by the controller mover, some of these controlling the circuits of magnetic main and reversing switches, the others acting to cut resistance in or out of the circuits of the elevator motor.

84. The combination of a controller mover having a field and an armature, a car switch connected by a plurality of circuits with said controller mover and adapted to divide a current into branches, provided with a movable member to cut resistance in or out of the main and branch circuits; one of said controller movers having coils wound concentrated at the edges for each branch current, the other part having poles 180 degrees wide less width of a coil on first named part, and a single coil; magnetic main and reversing switches; resistance for the elevator motor circuits; and a controller having switches actuated by the controller mover, some of these controlling the circuits of magnetic main and reversing switches, the others acting to cut resistance in or out of the circuits of the elevator motor.

85. The combination of a controller mover having a field and an armature, a car switch connected by a plurality of circuits with said controller mover and adapted to divide a current into branches and vary the strength of such branches of current in proper ratio to produce the required torque and angular movement of the controller-mover armature; said controller-mover having its field and armature both wound with coils traversed by the switch currents, the flux of one part rotating in concordance with variations in these currents and acting to draw the flux of the other part into line with it; and the controller actuated by the controller-mover, having suitable switches, resistances cut in or out of the elevator motor circuits by some of the controller switches, an electro-magnetic reversing switch having its magnets in circuits with others of said controller switches, and an electro-magnetic main switch, controlled by said reversing switch.

86. The combination of a controller mover having a field and an armature, a car switch connected by a plurality of circuits with the controller-mover and adapted to divide a current into branches and vary the strength of the current of such branches independently, also to vary the strength of whole current; said controller-mover having its field and armature both wound with coils traversed by the switch currents, the flux of one part rotating in concordance with the relative variations in these currents, and acting to draw flux of other part into line with it; and a controller actuated by the controller mover, having suitable switches, resistances cut in or out of the elevator motor circuits by some of the controller switches, an electromagnetic reversing switch having its magnets in circuits with others of said controller switches, and an electro-magnetic main switch, controlled by said reversing switch.

87. The combination of a controller mover having a field and armature, a car switch connected by a plurality of circuits with said controller mover, and provided with resistances, contacts and circuits, to divide a current into branches and vary the resistance in these; said controller-mover having its field and armature both wound with coils traversed by the switch currents, the flux of one part rotating in concordance with relative variations in the currents and acting to draw flux of the other part into line with it; and the controller actuated by the controller-mover, having suitable switches, resistances cut in or out of the elevator motor circuits by some of the controller switches, and an electromagnetic main switch, controlled by said reversing switch.

88. The combination of a controller-mover having a field and armature, a car switch connected by a plurality of circuits with said controller-mover, and adapted to divide a current into branches having a member movable step by step cutting resistances in or out of the main and branch circuits at each step to produce the angular position and torque of controller-mover armature required at that step; said controller-mover having its field and armature both wound with coils traversed by the switch currents, the flux of one part rotating in concordance with the relative variations in these currents and acting to draw the flux of the other part into line with it; and a controller actuated by the controller-mover, having suitable switches, resistances cut in or out of the elevator motor circuits by some of the controller switches, an electro-magnetic reversing switch having its magnets in circuits with others of said controller switches, and an electro-magnetic main switch, controlled by said reversing switch.

89. The combination of a controller-mover having a field and an armature, a car switch connected by a plurality of circuits with said controller mover, and adapted to divide a current into branches and vary the strength of the current of said branches in proper ratio to develop the required angular movement and torque of the controller-mover armature; a controller-mover, one part of said controller-mover having separate coils for each branch current that develop fluxes in different directions, their resultant rotating in concordance with variations in the currents, the other part having one coil traversed by all the currents, its flux acting with the rotating flux to develop the armature torque; and a controller actuated by the controller-mover, having suitable switches, resistances cut in or out of the elevator motor circuits by some of the controller switches, an electro magnetic reversing switch having its magnets in circuits with others of said controller switches, and an electro-magnetic main switch, controlled by said reversing switch.

90. The combination of a controller-mover having a field and an armature; a car switch connected by a plurality of circuits with said controller-mover, and adapted to divide a current into branches and to vary the strength of the current of such branches independently, also to vary the strength of whole current, branch variations determining the angular movement, and whole current variations, the torque of the controller-mover armature; one part of said controller mover having separate coils for each branch current, that develop fluxes in different directions, their resultant rotating in concordance with relative variations in the currents, and acting to draw the flux of the other part into parallelism with it; and a controller actuated by the controller-mover, having suitable switches, resistances cut in or out of the elevator motor circuits by some of the controller switches, an electro-magnetic reversing switch having its magnets in circuits with others of said controller switches, and an electro-magnetic main switch, controlled by said reversing switch.

91. The combination of a controller-mover having a field and an armature; a car switch connected by a plurality of circuits with said controller-mover, provided with resistances, contacts and circuits to divide a current into branches and vary the strength of branch and whole currents, having other contacts to cut extra resistance into main switch circuit when switch is in stop position said controller-mover having separate coils for each branch circuit on one member, these developing fluxes in different directions their resultant rotating in concordance with the relative variations in these currents, and acting to draw the flux of the other part into line with it, and a controller actuated by the controller-mover, having suitable switches resistances cut in or out of the elevator motor circuits by some of the controller switches, an electro-magnetic reversing switch having its magnets in circuits with others of said controller switches, and an electro-magnetic main switch controlled by said reversing switch.

92. The combination of a controller-mover having a field and an armature; a car switch connected by a plurality of circuits with said controller mover, and adapted to divide current into branches and vary the strength of the current of the branches in proper ratio to develop the required angular movement and torque in the controller-mover armature; said controller-mover having its field and armature both wound with coils traversed by the switch currents, the flux developed in one part rotating in concordance with variations in the currents, and acting to draw the flux developed in the other part into line with it, and a controller having switches that are actuated by the controller-mover, and resistances cut in or out of the elevator motor circuits by some of said switches, and switches 2, 8, and 26 which control the circuits through the magnets of the main and reversing switches.

93. The combination of a controller-mover having a field and an armature; a car switch connected by a plurality of circuits with said controller-mover, and adapted to divide a current into branches and vary their strength in proper ratio to develop the required angular movement and torque in the controller-mover armature; said controller-mover being adapted to vary its torque and angular position in concordance with variations in the car switch currents; and a controller having electro-magnet main and reversing switches, the magnets of main and reversing switches being in the car switch circuit, whereby failure of current in this circuit stops the elevator motor.

94. The combination of a controller-mover having a field and an armature; a car switch connected by a plurality of circuits with said controller-mover, and adapted to divide a current into branches and vary their strength independently also to vary the strength of whole current branch variations determining the angular movement and whole current variations the torque of controller-mover armature; said controller-mover being adapted to vary its torque and angular position in concordance with variations in the currents transmitted to it; and a controller having electro-magnet main and reversing switches, the magnets of main and reversing switches being in the car switch circuit, whereby failure of current in this circuit stops the elevator motor.

95. The combination of a controller-mover having a field and an armature, a car switch connected by a plurality of circuits with said controller-mover, and provided with resistances, contacts and circuits to divide a current into branches and vary the resistance in these, to vary the relative strength of the currents, and contacts for varying the resistance in main switch circuit to vary strength of whole current; said controller-mover being adapted to vary its torque and angular position in concordance with variations in the car switch currents; and a controller having electro-magnet main and reversing switches, the magnets of main and reversing switches being in the car switch circuit, whereby failure of current in this circuit stops the elevator motor.

96. The combination of a controller-mover having a field and an armature, a car switch connected by a plurality of circuits with said controller-mover, and adapted to divide a current into branches and vary their relative strength in proper ratio to develop the required torque and angular movement of the controller-mover armature; one part of said controller-mover having separate coils wound concentrated at the edges for each branch current, the other part having one coil traversed by all these currents, the first part determining the angular movement and both parts combined determining the torque of the controller-mover armature, and a controller having electro-magnet main and reversing switches, the magnets of main and reversing switches being in the car switch circuit, whereby failure of current in this circuit stops the elevator motor.

97. The combination of a controller-mover having a field and an armature; a car switch connected by a plurality of circuits with said controller-mover, and adapted to divide a current into branches, to vary the strength of branch and whole currents independently, variations in branches being in concordance with the required angular movement of controller-mover armature, variations in whole current being in accordance with torque required of said armature; one part of said controller-mover having separate coils concentrated at the edges for each branch current, the other part having one coil traversed by all these currents, the first determining the angular movement, both parts together determining the torque of the armature; circuits connecting the switch and controller-mover, and a controller having electro-magnet main and reversing switches, the magnets of main and reversing switches being in the car switch circuit, whereby failure of current in this circuit stops the elevator motor.

98. The combination of a controller-mover having a field and an armature, a car switch connected by a plurality of circuits with said controller-mover, and provided with resistance, contacts and circuits, to divide a current into branches and vary the resistance in these, and other contacts for cutting extra resistance into main switch circuit when the latter is in the stop position; one part of said controller having coils wound concentrated at the edges for each branch current, a single coil on the other part, the first part determining the angular position and both parts together determining the torque of the armature; circuits connecting the switch and the controller-mover; and a controller having electro-magnet main and reversing switches, the magnets of main and reversing switches being in the car switch circuit, whereby failure of current in this circuit stops the elevator motor.

99. The combination of a controller-mover having a field and an armature; a car switch connected by a plurality of circuits with said controller-mover, and adapted to divide a current into branches and vary their strength in proper ratio to develop the torque and angular movement required of a controller-mover armature; said controller having field and armature both wound with coils traversed by the switch currents, the flux developed in one part rotating and acting to draw the flux of the other part into line with it, and a controller having switches moved directly by the controller mover.

100. The combination of a controller-mover having a field and an armature; a car switch connected by a plurality of circuits with said controller - mover, and adapted to divide a current into branches and vary their strength, independently, also to vary strength of whole current; said controller-mover having its field and armature both provided with coils traversed by the switch currents, the flux developed in one part rotating and acting to draw the flux of the other part into line with it; and a controller having switches moved directly by the controller-mover.

101. The combination of a controller-mover having a field and an armature, a car switch connected by a plurality of circuits with said controller-mover, and provided with resistances, contacts and circuits to divide a current into branches and cut resistances in and out of the circuits of these and other contacts to vary the resistance in main switch circuit; said controller-mover having its field and armature, both having coils traversed by the branch switch currents, the flux of one part rotating and acting to draw the flux of the other part into parallelism with it, and a controller having switches moved directly by the controller-mover.

102. The combination of a controller-mover having a field and an armature; a car switch connected by a plurality of circuits with said controller-mover, and adapted to divide a current into branches provided with a movable member to cut resistances in or out of main and branch circuits to determine the torque and angular movement of a controller-mover armature; said controller-mover having its field and armature, both wound with coils traversed by the switch currents, and adapted to actuate in concordance with variations in these currents; and a controller having switches moved directly by the controller-mover.

103. The combination of a controller-mover having a field and an armature; a car switch connected by a plurality of circuits with said controller-mover, and adapted to divide a current into branches and vary the strength of these in proper ratio to develop the required torque and angular movement required in a controller-mover armature; one part of said controller-mover having separate coils for each branch current, the other part having a single coil for all these currents; and a controller having switches moved directly by the controller-mover.

104. The combination of a controller-mover having a field and an armature; a car switch connected by a plurality of circuits with said controller - mover, and arranged to divide a current into branches and vary the strength of these independently, also to vary the strength of whole current; one part of said controller-mover having separate coils for each branch current and the other part having a single coil for all these currents; and a controller having switches moved directly by the controller-mover.

105. The combination of a controller-mover having a field and an armature; a car switch connected by a plurality of circuits with said controller-mover, and provided with contacts, circuits and resistances for dividing a current into branches and vary the resistance in the circuits of these, as well as in the main switch circuit; one part of said controller-mover having separate coils for each branch current, the other part having a single coil for all the currents; and a controller having switches moved directly by the controller mover.

106. The combination of a controller-mover having a field and an armature; a car switch connected by a plurality of circuits with said controller-mover, and arranged to divide a current into branches having a movable member to cut resistance in or out of the circuits in these currents, and also of the main switch circuit, said controller-mover having separate coils for each branch current on one member, and one coil for all the currents on the other member; and a controller having switches moved directly by the controller mover.

107. The combination of a controller-mover having a field and an armature; a car switch connected by a plurality of circuits with said controller-mover, and adapted to divide a current into branches having a member movable step by step, cutting resistances in or out of the circuits at each step that will vary the strength of the currents in proper ratio to develop the torque and angular movement of the controller-mover required at that step; said controller-mover having separate coils for each branch current on one member, and a single coil for all the currents on the other member, and a controller having switches moved directly by the controller-mover.

108. The combination of a controller mover having a field and an armature, a car switch connected by a plurality of circuits with said controller-mover, and adapted to divide a current into three branches and vary the strength of these in proper ratio to produce the required angular movement and torque of the controller-mover armature, said controller-mover having three sets of coils on one member, each set covering two arcs of 60 degrees diametrically opposite and traversed by one branch current, the other member having one coil traversed by the three branch currents and poles 120 degrees wide; and a controller actuated by the controller-mover and adapted to vary the velocity and direction of rotation of the elevator motor.

109. The combination of a controller mover having a field and an armature, a car switch connected by a plurality of circuits with said controller-mover, and adapted to divide a current into three branches and vary the strength of branch and whole currents independently, variations in the branches determining the angular motion of controller-mover armature, and whole current variations its torque; said controller-mover provided with three sets of coils on one member each set covering two arcs 60 degrees wide diametrically opposite and traversed by one of the branch currents, the other part having one coil traversed by all the currents and poles 120 degrees wide; and a controller actuated by the controller-mover and adapted to control the motion of the elevator motor.

110. The combination of a controller-mover having a field and an armature, a car switch, connected by a plurality of circuits with said controller mover, and adapted to divide a current into three branches and vary their strength, as well as that of the whole current, independently, variations in branches being in accordance with variations required in the angular position of controller-mover armature and variations in whole current being in accordance with torque required; said controller mover having three sets of coils on one member each one covering two arcs about 60 degrees wide diametrically opposite, the other member having one coil and poles about 120 degrees wide; and a controller operated by the controller-mover and adapted to control the motion of the elevator motor.

111. The combination of a controller-mover having a field and an armature, a car switch, connected by a plurality of circuits with said controller mover, and provided with resistances, contacts and circuits to divide a current into three branches, and other contacts to cut additional resistance into main switch circuit when lever is in the stop or full speed position; said controller-mover having three sets of coils each one covering two arcs 60 degrees wide set diametrically opposite, on one member, and one coil on the other member, the poles of the latter being about 120 degrees wide; and a controller actuated by the controller-mover and adapted to vary the velocity and direction of rotation of the elevator motor.

112. The combination of a controller mover having a field and an armature, a car switch connected by a plurality of circuits with said controller-mover, and adapted to divide a current into three branches, substantially as described, having contacts to cut resistance into main switch circuit when the lever is in the stop and full speed positions; said controller-mover having three sets of coils wound concentrated at the edges on one member, each set traversed by one of the branch currents, the other member having a single coil and poles 120 degrees wide; and a controller operated by the controller mover and adapted to control the motion of the elevator motor.

113. The combination of a controller mover having a field and an armature, a three current car switch, connected by a plurality of circuits with said controller mover and having a rotary lever, resistances and a row of contacts connected with the resistances; a controller mover provided with three sets of coils on one member each one traversed by a separate branch current, and one coil on the other member traversed by the three branch currents, the poles of this part being about 120 degrees wide; and a controller adapted to be operated by the controller-mover, and to control the motion of the elevator motor.

114. A switch which divides a current into a plurality of branches, having means for cutting resistances into and out of any one of the branches, high resistances and means for bridging the high resistances comprising contacts connected with the branch circuits upon each side of a high resistance, and an insulated portion carried by the switch lever.

115. A switch for a controller of the class described, in which a current is divided into a plurality of branches having means for bridging a resistance between two of said branches.

116. The combination of a controller-mover having a field and an armature, a car switch, having a plurality of contacts, a switch lever, resistances R in circuit with the contacts and with each other, a plurality of branch circuits connecting contacts with the controller-mover, high resistances interposed in the branch circuits, and means for bridging the high resistances; the controller-mover having a plurality of sets of coils on one member, one for each branch current, the other member having poles and one coil through which all the branch currents pass; and a controller actuated by the controller-mover and arranged to properly control the motion of the elevator motor.

117. The combination of a current car switch dividing the current in a plurality of circuits, and having a lever, a plurality of contacts, and an elongated contact to maintain current in one branch constant when the switch lever is moved to any position; a controller mover having a plurality of sets of coils; circuits connecting the switch and controller mover; and a controller actuated by the controller mover and adapted to control the motion of the elevator motor.

118. The combination of a car switch dividing the current in a plurality of branches, and having a lever, a plurality of contacts, resistances in circuits with the contacts high resistances interposed in the branch circuits, a contact common to all branches and individual contacts for the several branches and means for bridging the common and individual contacts to cut out the high resistances; a controller mover having a plurality of sets of coils on one member each set being traversed by one of the branch currents, and a controller adapted to be actuated by the controller-mover and to control the motion of the elevator motor.

119. The combination of a controller mover having a field and an armature, a three current car switch dividing the current into three branches and having a lever, a plurality of contacts, resistances in circuit with the contacts, high resistances interposed in the branch circuits, a contact common to all the branch circuits, divided individual contacts for two of the branches, means for bridging the common and the individual contacts to cut out the high resistance said contacts properly located to vary the resistance in the two active circuits to produce the torque and angular movement required of the controller mover armature; said controller mover having three sets of coils on one member, each set traversed by a separate branch current, the other member having one coil traversed by all these currents, circuits connecting the switch and controller-mover; and a controller adapted to be actuated by the controller-mover and to vary the velocity and direction of rotation of the elevator motor.

120. A switch which divides a current into a plurality of branches, having means for cutting resistances into and out of any one of the branches, and means for cutting a resistance into or out of the main circuit.

121. The combination of a car switch adapted to divide a current into a plurality of branches having a lever and means for cutting resistance into main circuit at full speed and stop positions of the lever.

122. The combination of a car switch having a lever and a pair of contacts on the lever; contacts at the top or bottom of the well in which the elevator moves, a switch in the main circuit, an electro-magnet controlling said switch, and circuit connections between the electro-magnet and the contacts on the switch lever.

123. The combination of a controller mover having a field and an armature, a car switch, connected by a plurality of circuits with said controller mover and adapted to divide a current into three branches and vary their strength independently, also to vary the strength of whole current, branch variations determining the angular movement, and whole current variations, the torque of the controller-mover armature; said controller-mover having three sets of coils narrower than 60 degrees on one member each one traversed by a branch current, the other member having one coil through which all these currents pass, and poles of a width of 180 degrees less width of a set of coils on the first member; and a controller, actuated by the controller-mover, consisting of switches, resistances and circuits connecting with the elevator motor, and through which the motion of said motor is controlled.

124. The combination of a controller mover having a field and an armature, a car switch connected by a plurality of circuits with said controller mover and adapted to divide a current into three branches and vary the strength of branch and whole currents independently, branch variations being in accordance with angular movement, and variations in whole current being in accordance with torque required of the controller-mover armature; said controller-mover having three sets of coils less than 60 degrees wide on one member, the other member having one coil, and poles 180 degrees wide less width of a set of coils on first member; and a controller, adapted to be actuated by the controller-mover and consisting of switches, resistances and circuits connecting with the elevator motor, through which the motion of said motor is controlled.

125. The combination of a controller-mover having a field and an armature; a car switch connected by a plurality of circuits with said controller-mover, and provided with resistances, contacts and circuits through which to divide a current into three branches and other contacts to cut additional resistance into main circuit when the lever is in stop or full speed position, said controller-mover having three sets of coils less than 60 degrees wide on one member, the other member having a single coil, and poles 180 degrees wide less width of a set of coils on first member; and a controller adapted to be actuated by the controller-mover and consisting of switches, resistances and circuits connecting with the elevator motor through which the motion of said motor is controlled.

126. The combination of a controller-mover having a field and an armature; a three current car switch connected by a plurality of circuits with said controller-mover, and having contacts to cut extra resistance into main switch circuit when lever is in full speed or stop position; said controller-mover having three sets of coils less than 60 degrees wide on one member, each set being traversed by one branch current, the other member having one coil through which all these currents pass, and poles 180 degrees wide less width of a set of coils on first member, and a controller actuated by the controller-mover, and consisting of switches, resistances and circuits connecting with the elevator motor through which the velocity and direction of rotation of said motor are varied.

127. The combination of a controller-mover having a field and an armature; a three current car switch connected by a plurality of circuits with said controller-mover, and having high resistances interposed in the branch circuits, and means for bridging the high resistances; said controller mover having three sets of coils narrower than 60 degrees on one member, each set traversed by a branch current, the other member having one coil through which the three branch currents pass, and poles 180 degrees wide less width of a set of coils on first member; and a controller actuated by the controller-mover, consisting of switches, resistances and circuits connecting with the elevator motor and adapted to control the motion of said motor.

128. The combination of a controller-mover having a field and an armature; a three current car switch connected by a plurality of circuits with said controller-mover, and having high resistances in the branches, contacts common to all of the branches, individual contacts for the branches, and means for bridging common and individual contacts to cut out the high resistances; said controller-mover having three sets of coils less than 60 degrees wide on one member, the other member having one coil and poles 180 degrees wide less width of a set of coils on first member; and a controller actuated by the controller-mover, consisting of switches, resistances and circuits connecting with the elevator motor and adapted to control the motion of said motor.

129. The combination of a controller-mover having a field and an armature; a three current car switch connected by a plurality of circuits with said controller-mover, and having high resistances in the branch circuits, a contact common to all the branches, divided individual contacts for two of the branches, and means for bridging the individual and the common contacts; said controller-mover having three sets of coils on one member, each one traversed by a separate switch current, the other member having one coil traversed by all the switch currents; and a controller actuated by the controller-mover consisting of switches, resistances and circuits connecting with the elevator motor, and through which the motion of said motor is controlled.

130. The combination of a controller-mover having a field and an armature; a switch adapted to divide a current into three branches and vary their strength in the proper ratio to develop the required torque and angular movement of controller-mover armature; said controller-mover having three sets of coils on one member, one for each branch current, and one coil for all these currents on the other member and an extra coil through which a separate current is passed; circuits connecting the switch and controller-mover; and a controller adapted to be actuated by the controller-mover, consisting of switches, resistances and circuits connected with the elevator and through which the motion of said motor is controlled.

131. The combination of a controller-mover having a field and an armature; a car switch adapted to divide a current into three branches and vary the strength of these independently, also to vary the strength of whole current, said controller-mover having three sets of coils on one member each one traversed by a separate branch current, the other member having one coil traversed by all the branch currents, and another coil through which an independent current is passed; circuits connecting the switch and controller-mover; and a controller consisting of switches, resistances and circuits connecting with the elevator motor, and adapted to control the motion of said motor.

132. The combination of a controller-mover having a field and an armature; a car switch adapted to divide a current into three branches and vary their strength as well as that of whole current independently; branch variations being in accordance with angular movement and whole current variations in accordance with torque required of the controller-mover armature; said controller-mover having three sets of coils on one member, the other member having one coil through which all of the branch currents are passed, and another coil through which a separate current is passed; circuits connecting the switch and controller-mover, and a controller adapted to be actuated by the controller-mover and to control the motion of the elevator motor through switches, resistances and circuits connecting it with said motor.

133. The combination of a controller-mover having a field and an armature; a switch adapted to divide a current into three branches, provided with contacts through which resistances can be cut in or out of its main circuit to vary the strength of whole current; said controller-mover having three sets of coils on one member, one for each switch current and on the other member one coil for all these currents and a separate coil for an independent current; circuit connections between switch and controller-mover, and a controller adapted to be operated by the controller-mover consisting of switches, resistances and circuits connecting with the elevator motor, and through which the latter is controlled.

134. The combination of a controller-mover having a field and an armature; a three current car switch connected by a plurality of circuits with said controller-mover, and adapted to divide the main circuit into three branches having resistances common to two of the branch circuits, said controller-mover having three sets of coils on one member and two coils on the other member, one of these coils being traversed by the switch currents and the other by an independent current; and a controller adapted to be actuated by the controller-mover, consisting of switches, resistances and circuits connecting with the elevator motor and through which it controls the motion of said motor.

135. The combination of a controller-mover having a field and an armature; a switch connected by a plurality of circuits with said controller-mover, and having high resistances interposed in the branch circuits, contacts common to all the branch circuits, individual contacts for two of the branch circuits, and means for bridging the common and the individual circuits to cut out the high resistances; said controller-mover being provided with three sets of coils on one member, one for each switch current, the other member having two coils, one for the switch current and one traversed by an independent current; circuits connecting switch and controller-mover, and a controller operated by the controller-mover consisting of circuits, resistances and switches connected with the elevator motor and through which the latter is controlled.

136. The combination of a controller-mover having a field and an armature; a switch connected by a plurality of circuits with said controller-mover, and having high resistances interposed in the branch circuits; contacts common to all the branch circuits, divided individual contacts for two of the branch circuits, and means for bridging the common and the divided individual circuits to cut out the high resistances; said controller mover provided with three sets of coils on one member connected separately to the switch and one coil on the other member in series, with these three branches, and another coil connected in an external circuit; and a controller operated by the controller-mover, adapted to control the motion of the elevator motor through switches, resistances and circuits connecting with said motor.

137. The combination of a controller-mover having a field and an armature; a car switch adapted to divide a current into three branches and vary their strength independently, also to vary the strength of whole current; said controller-mover having three sets of coils on one member, each set having diametrically opposite parts; the other member having a coil through which all the branch currents pass; circuits connecting the switch and controller, and a controller operated by the controller-mover consisting of switches, resistances and circuits connecting with the elevator motor and through which the motion of said motor is controlled.

138. The combination of a controller mover having a field and an armature, a car switch connected by a plurality of circuits with said controller mover and adapted to divide a current into three branches and vary their strength independently, also to vary the strength of the whole current, branch variations determining the angular movement, and whole current variations the torque of the controller mover armature; said controller mover having three sets of coils wound concentrated at the edges on one member, each set covering two arcs of 60 degrees, and connected in one of the switch branch circuits, the other member having one coil connected in series with the three sets on the other member, and poles 120 degrees wide; and a controller in which the controller-mover actuates switches which control the circuits of magnetic switches which control the motion of the elevator motor.

139. The combination of a controller mover having a field and an armature a switch connected by a plurality of circuits with said controller mover and provided with contacts, resistances and circuits to divide a current into three branches, and other contacts to cut additional resistance into its main circuit when lever is in the stop and full speed positions; said controller mover having three sets of coils concentrated at the edges, on one member, each set covering two arcs of 60 degrees and traversed by one of the branch currents, the other member having one coil traversed by all the branch currents; and a controller in which the controller mover actuates switches which control the circuits of magnetic switches which control the motion of the elevator motor.

140. The combination of a controller mover having a field and an armature, a car switch connected by a plurality of circuits with said controller mover and adapted to divide a current into three branches having high resistances in the branches, contacts common to all of the branches individual contacts for the branches and means for bridging the common and individual contacts to cut out the high resistance, said controller mover provided with three sets of coils on one member, each set covering two arcs 60 degrees wide, diametrically opposite and connected in one of the branch switch circuits, the other member having one coil connected with all the branch circuits, and poles 120 degrees wide; and a controller actuated by the controller mover; and a controller in which the controller mover actuates switches which control the circuits of magnetic switches which control the motion of the elevator motor.

141. The combination of a controller mover having a field and an armature, a three current car switch connected by a plurality of circuits with said controller mover; having high resistances in the branch circuits, a contact common to all the branches, divided individual contacts for two of the branches, and means for bridging the individual and the common contacts; said controller-mover having three sets of coils on one member, the wire concentrated at the edges, each set covering two arcs of about 60 degrees, and traversed by a separate branch current, the other member having a single coil traversed by all the branch currents, and poles 120 degrees wide; and a controller in which the controller mover actuates switches which control the circuits of magnetic switches which control the motion of the elevator motor.

142. The combination of a controller mover having a field and an armature, a car switch connected by a plurality of circuits with said controller mover and adapted to divide a current into three branches and vary the strength of these in proper ratio to develop the torque' and angular movement required of the armature of a controller mover; said controller mover having three sets of coils narrower than 60 degrees on one member connected individually in the three branch circuits of the car switch, the other member having one coil connected with the three branch circuits, and poles 180 degrees wide less width of a set of coils on first member; and a controller, operated by the controller mover, and a controller in which the controller mover actuates switches which control the circuits of magnetic switches which control the motion of the elevator motor.

143. The combination of a controller mover having a field and an armature, a car switch connected by a plurality of circuits with said controller mover and adapted to divide a current into three branches and vary the strength of branches and whole currents independently, branch variations to determine angular movement, and whole current variations to determine torque of controller mover armature; said controller mover having three sets of coils narrower than 60 degrees on one member, each set traversed by a separate branch current, the other member having one coil traversed by all the branch currents, and poles wider than 120 degrees; and a controller in which the controller mover actuates switches which control the circuits of magnetic switches which control the motion of the elevator motor.

144. The combination of a controller mover having a field and an armature, a three current switch connected by a plurality of circuits with said controller mover and having contacts to cut resistance into its main circuit when the lever is in the full speed or stop positions; said controller mover provided with three sets of coils on one member connected separately in the branch switch circuits, each set covering two arcs of less than 60 degrees, the other member having poles 180 degrees wide less width of a set of coils on first member, and a single coil connected in series with the three branch circuits; and a controller, actuated by the controller mover, and a controller in which the controller mover actuates switches which control the circuits of magnetic switches which control the motion of the elevator motor.

145. The combination of a controller-mover having a field and an armature, a three current car switch connected by a plurality of circuits with said controller mover and a contact common to two of said circuits, said controller mover provided with three sets of coils narrower than 60 degrees on one member, each set covering two arcs diametrically opposite and connected separately in one of the branch switch circuits, the other member having poles 180 degrees wide less width of a set of coils on first member, and a single coil connected in series with the three branch circuits; and a controller in which the controller mover actuates switches which control the circuits of magnetic switches which control the motion of the elevator motor.

146. The combination of a controller mover having a field and an armature, a three current car switch connected by a plurality of circuits with said controller mover, having high resistances in the branches, contacts common to all of the branches, individual contacts for the branches, and means for bridging the common and individual contacts to cut out the high resistance said controller mover provided with three sets of coils narrower than 60 degrees on one member, each set connected in one of the switch branch circuits, the other member having poles wider than 120 degrees and a single coil that is connected in series with the three branch circuits; and a controller in which the controller mover actuates switches which control the circuits of magnetic switches which control the motion of the elevator motor.

147. The combination of a controller mover having a field and an armature, a car switch connected by a plurality of circuits with said controller mover and adapted to divide a current into three branches and vary their strength in proper ratio to develop the required torque and angular movement of the armature of a controller mover; said controller mover being provided with three sets of coils on one member wound concentrated at the edges, the other member having one coil, and poles 120 degrees wide, the coils of first member being connected individually in the branch switch circuits, and the coil of second member being connected in series with all the branches; and a controller having switches actuated by the controller mover, some of which control the circuits of the magnetic main and reversing switches, while others act to cut in or out resistance in the elevator motor circuits.

148. The combination of a controller mover having a field and an armature, a car switch, connected by a plurality of circuits with said controller mover and adapted to divide a current into three branches and vary the strength of these independently, also to vary the strength of whole current, branch variations determining angular position of controller mover armature, and whole current variations its torque; said controller mover having three sets of coils wound concentrated at the edges, on one member, each set traversed by a separate branch current, the other member having one coil through which all these currents pass, and poles 120 degrees wide; and a controller having switches actuated by the controller mover, some of which control the circuits of the magnetic main and reversing switches, while others act to cut in or out resistance in the elevator motor circuits.

149. The combination of a controller mover having a field and an armature, a car switch connected by a plurality of circuits with said controller mover and adapted to divide a current into three branches, and to vary the strength of the branch and whole current independently, branch variations being in accordance with angular movement and whole current variations being in accordance with torque required of the controller mover armature, said controller mover provided with three sets of coils concentrated at the edges, and connected separately in the three branch switch circuits, on one member and a single coil on the other member connected in series with the branch circuits; and a controller having switches actuated by the controller mover, some of which control the circuits of the magnetic main and reversing switches, while others act to cut in or out resistance in the elevator motor circuits.

150. The combination of a controller mover having a field and an armature, a three current car switch, provided with contacts to cut extra resistance into its main circuit when the lever is in the full speed and stop positions; said controller-mover being arranged with three sets of coils concentrated at the edges on one member, each set connected in series in one of the branch switch circuits, the other member having poles 120 degrees wide, and a single coil that is connected in series with the three branch circuits; and a controller having switches actuated by the controller mover, some of which control the circuits of the magnetic main and reversing switches, while others act to cut in or out resistance in the elevator motor circuits.

151. The combination of a controller mover having a field and an armature, a three current car switch connected by a plurality of circuits with said controller mover and having high resistances in the branch circuits and means for bridging the circuits, said controller mover having three sets of coils wound concentrated at the edge, on one member, each set traversed by a separate branch current, the other member having one coil through which all the branch currents pass; and the controller having switches actuated by the controller mover, some of which control the circuits of the magnetic main and reversing switches, while others act to cut in or out resistance in the elevator motor circuits.

152. The combination of a controller mover having a field and an armature, a car switch connected by a plurality of circuits with said controller mover and arranged to divide a current into three branches and vary the strength of these in proper ratio to develop the torque and angular movement required of the controller mover armature; said controller mover having three sets of coils narrower than 60 degrees on one member, each set being connected separately in one of the branch switch circuits, the other member having poles 180 degrees wide less width of a set of coils on first member, and a single coil which is connected in series with the three branch switch circuits; and a controller having switches actuated by the controller mover, some of which control the circuits of the magnetic main and reversing switches, while others act to cut in or out resistance in the elevator motor circuits.

153. The combination of a controller mover having a field and an armature, a car switch connected by a plurality of circuits with said controller mover and provided with contacts, resistances and circuits to divide a current into three branches, and other contacts to cut additional resistance into its main circuit when the lever is in the full speed and stop position; said controller mover having three sets of coils less than 60 degrees wide, each set traversed by one of the branch currents, the other member having one coil traversed by all the branch currents, and poles 180 degrees wide less width of a set of coils on first member; and a controller having switches actuated by the controller mover, some of which control the circuits of the magnetic main and reversing switches, while others act to cut in or out resistance in the elevator motor circuits.

154. The combination of a controller mover having a field and an armature, a car switch, connected by a plurality of circuits with said controller mover, and adapted to divide a current into three branches and vary the strength of these independently, also to vary the strength of whole current, branch variations being in accordance with angular movements and whole current variations in accordance with torque required of the controller mover armature; said controller mover having three sets of coils less than 60 degrees wide on one member, each set connected separately in one of the branch circuits, the other member having a single coil which is connected in series with the three branch circuits; and a controller having switches actuated by the controller mover, some of which control the circuits of the magnetic main and reversing switches, while others act to cut in or out resistance in the elevator motor circuits.

155. The combination of a controller mover having a field and an armature, a three current car switch connected by a plurality of circuits with said controller mover and having a plurality of contacts and resistances, said controller mover having three sets of coils narrower than 60 degrees on one member, and one coil on the other member the latter having poles 180 degrees wide less width of a set of coils on first member, the coils of first member being connected separate in the branch switch circuits, and the coil of second member being connected in series with the three branch circuits; and the controller having switches actuated by the controller mover, some of which control the circuits of the magnetic main and reversing switches, while others act to cut in or out resistance in the elevator motor circuits.

156. The combination of a controller mover having a field and an armature, a three current car switch connected by a plurality of circuits with said controller mover and having high resistances in the branches, contacts common to all of the branches, individual contacts for the branches, and means for bridging the common and individual contacts to cut out the high resistance, said controller mover having three sets of coils narrower than 60 degrees on one member, and one coil on the other member, the latter having poles 180 degrees wide less width of a set of coils on first member, the coils of first member being connected separate in the branch switch circuits, and the coil of second member being connected in series with the three branch circuits and the controller having switches actuated by the controller mover, some of which control the circuits of the magnetic main and reversing switches, while others act to cut in or out resistance in the elevator motor circuits.

157. The combination of a controller mover having a field and an armature, a car switch connected by a plurality of circuits with said controller mover and adapted to divide a current into three branches and vary their strength independently, also to vary the strength of whole current, branch variations determining the angular movement, and whole current variations determining the torque of the controller-mover armature; said controller mover having three sets of coils on one member each one traversed by a separate branch current, the other member having two coils, one in series with the coils of the first member and the other having a separate current passing therethrough; and a controller having switches actuated by the controller mover, some of which control the circuits of the magnetic main and reversing switches, while others act to cut in or out resistance in the elevator motor circuits.

158. The combination of a controller mover having a field and an armature, a three current car switch connected by a plurality of circuits with said controller mover and having means to cut extra resistance into its main circuit when the controlling lever is in the full speed and stop positions; said current controller mover having three sets of coils on one member, each one traversed by a separate branch current, the other member having two coils, one in series with the coils of the first member, and the other having a separate current passing therethrough; and a controller having switches actuated by the controller mover, some of which control the circuits of the magnetic main and reversing switches, while others act to cut in or out resistance in the elevator motor circuits.

159. The combination of a controller mover having a field and an armature, a three current car switch connected by a plurality of circuits with said controller mover and having resistances common to two branch circuits, said current controller mover having three sets of coils on one member, each one traversed by a separate branch current, the other member having two coils, one in series with the coils of the first member, and the other having a separate current passing therethrough; and a controller having switches actuated by the controller mover, some of which control the circuits of the magnetic main and reversing switches, while others act to cut in or out resistance in the elevator motor circuits.

160. The combination of a controller mover having a field and an armature, a three current car switch connected by a plurality of circuits with said controller mover having high resistances in the branch circuits, a contact common to all the branches, divided individual contacts for two of the branches, and means for bridging the individual and the common contacts; said controller mover having three sets of coils on one member, each one traversed by a separate branch current, the other member having two coils, one in series with the coils of the first member, and the other having a separate current passing therethrough; and a controller having switches actuated by the controller mover, some of which control the circuits of the magnetic main and reversing switches, while others act to cut in or out resistance in the elevator motor circuits.

161. The combination of a controller mover having a field and an armature, a car switch connected by a plurality of circuits with said controller mover and arranged to divide a current into three branches and vary their strength in proper ratio to develop the angular movement and torque required in the controller mover armature; said controller mover having three sets of coils wound concentrated at the edges on one member, each set covering two arcs of 60 degrees and connected in one of the switch branch circuits, the other member having one coil connected in series with the three sets on the other member, and poles 120 degrees wide; and a controller actuated by the controller mover, having suitable switches, resistances cut in or out of the elevator motor circuits by some of the controller switches, an electro magnetic reversing switch having its magnets in circuits with others of said controller switches, and an electromagnetic main switch, controlled by said reversing switch.

162. The combination of a controller mover having a field and an armature, a car switch connected by a plurality of circuits with said controller mover and adapted to divide a current into three branches and vary their strength independently, also to vary the strength of whole current, branch variations determining the angular movement, and whole current variations the torque of the controller mover armature; said controller mover having three sets of coils wound concentrated at the edges on one member, each set covering two arcs of 60 degrees, and connected in one of the switch branch circuits, the other member having one coil connected in series with the three sets on the other member, and poles 120 degrees wide; and a controller actuated by the controller mover, having suitable switches, resistances cut in or out of the elevator motor circuits by some of the controller switches, an electro-magnetic reversing switch having its magnets in circuits with others of said controller switches, and an electro-magnetic main switch, controlled by said reversing switch.

163. The combination of a controller-mover having a field and an armature, a three current car switch connected by a plurality of circuits with said controller mover, having means to cut resistance into its circuit when the controlling lever is in the full speed and stop positions; said controller mover having three sets of coils wound concentrated at the edges on one member, each set covering two arcs of 60 degrees, and connected in one of the switch branch circuits the other member having one coil connected in series with the three sets on the other member, and poles 120 degrees wide; and a controller actuated by the controller mover, having suitable switches, resistances cut in or out of the elevator motor circuits by some of the controller switches, an electro-magnetic reversing switch having its magnets in circuits with others of said controller switches, and an electro-magnetic main switch, controlled by said reversing switch.

164. The combination of a controller mover having a field and an armature, a three current car switch connected by a plurality of circuits with said controller mover and having high resistances in the branch circuits and means for bridging the high resistances; said controller mover having three sets of coils wound concentrated at the edges on one member, each set covering two arcs of 60 degrees, and connected in one of the switch branch circuits, the other member having one coil connected in series with the three sets on the other member, and poles 120 degrees wide; and a controller actuated by the controller mover, having suitable switches, resistances cut in or out of the elevator motor circuits by some of the controller switches, an electro-magnetic reversing switch having its magnets in circuits with others of said controller switches, and an electro-magnetic main switch, controlled by said reversing switch.

165. The combination of a controller mover having a field and an armature, a car switch connected by a plurality of circuits with said controller mover and arranged to divide a current into three branches and vary their strength in proper ratio to develop torque and angular movement required in the controller-mover armature; said controller mover having three sets of coils narrower than 60 degrees on one member, and one coil on the other member, the latter having poles 180 degrees wide less width of a set of coils on first member, the coils of first member being connected separate in the branch switch circuits, and the coil of second member being connected in series with the three branch circuits; and a controller actuated by the controller mover, having suitable switches, resistances cut in or out of the elevator motor circuits by some of the controller switches, an electro-magnetic reversing switch having its magnets in circuits with others of said controller switches, and an electro-magnetic main switch, controlled by said reversing switch.

166. The combination of a controller mover having a field and an armature, a switch connected by a plurality of circuits with said controller mover and provided with resistances, contacts, and circuits to divide a current into three branches, and other contacts to cut extra resistance into its main circuit when the controlling lever is in the full speed and stop positions; said controller mover having three sets of coils narrower than 60 degrees on one member, and one coil on the other member the latter having poles 180 degrees wide less width of a set of coils on first member, the coils of first member being connected separate in the branch switch circuits, and the coil of second member being connected in series with the three branch circuits and a controller actuated by the controller mover, having suitable switches, resistances cut in or out of the elevator motor circuits by some of the controller switches, an electro magnetic reversing switch having its magnets in circuits with others of said controller switches; and an electro-magnetic main switch, controlled by said reversing switch.

167. The combination of a controller mover having a field and an armature, a three current car switch connected by a plurality of circuits with said controller mover, and having high resistances interposed in the branch circuits, contacts common to all of the branch circuits, individual contacts for two of the branch circuits, and means for bridging the common and the individual circuits to cut out the high resistances; said controller mover having three sets of coils narrower than 60 degrees on one member, and one coil on the other member the latter having poles 180 degrees wide less width of a set of coils on first member, the coils of first member being connected separate in the branch switch circuits, and the coil of second member being connected in series with the three branch circuits; and a controller actuated by the controller mover, having suitable switches, resistances cut in or out of the elevator motor circuits by some of the controller switches, an electro-magnetic reversing switch having its magnets in circuits with others of said controller switches, and an electro-magnetic main switch, controlled by said reversing switch.

168. The combination of a controller mover having a field and an armature, a car switch connected by a plurality of circuits with said controller mover and arranged to divide a current into three branches and vary the strength of these, also to vary the strength of whole current; said controller mover having three sets of coils on one member each one traversed by a separate branch current, the other member having two coils, one in series with the coils of the first member and the other having a separate current passing therethrough; and the controller actuated by the controller mover, having suitable switches, resistances cut in or out of the elevator motor circuits by some of the controller switches, an electro magnetic reversing switch having its magnets in circuits with others of said controller switches, and an electro-magnet main switch, controlled by said reversing switch.

169. The combination of a controller mover having a field and an armature a three current car switch connected by a plurality of circuits with said controller mover and provided with means to cut additional resistance into its main circuit when the controlling lever is at the full speed and stop positions; said controller mover having three sets of coils on one member each one traversed by a separate branch current the other member having two coils one in series with the coils of the first member and the other having a separate current passing therethrough; and the controller actuated by the controller mover having suitable switches, resistances cut in or out of the elevator motor circuits by some of the controller switches, an electro-magnetic reversing switch having its magnets in circuits with others of said controller switches, and an electro-magnetic main switch, controlled by said reversing switch.

170. The combination of a controller mover having a field and an armature, a three current car switch having high resistances in two of the branch circuits, and means for bridging said resistances, said controller mover having three sets of coils on one member each one traversed by a separate branch current, the other member having two coils, one in series with the coils of the first member and the other having a separate current passing therethrough; and the controller actuated by the controller mover, having suitable switches, resistances cut in or out of the elevator motor circuits by some of the controller switches; an electro-magnetic reversing switch having its magnets in circuits with others of said controller switches and an electro-magnetic main switch controlled by said reversing switch.

171. The combination of a controller mover having a field and an armature, a car switch, connected by a plurality of circuits with said controller mover, and arranged to divide a current into three branches and to vary their strength independently, also to vary the strength of whole current, first variations determining the angular movement and the second the torque of controller-mover armature; said controller mover having three sets of coils wound concentrated at the edges on one member, each set covering two arcs of 60 degrees, and connected in one of the switch branch circuits, the other member having one coil connected in series with the three sets on the other member and poles 120 degrees wide; and a controller having electro magnet main and reversing switches, the magnets of main and reversing switches being in the car switch circuit, whereby failure of current in this circuit stops the elevator motor.

172. The combination of a controller mover having a field and an armature, a car switch connected by a plurality of circuits with said controller mover, and arranged to divide a current into three branches and to vary the strength of these independently, also to vary the strength of whole current; said controller mover having three sets of coils narrower than 60 degrees on one member, and one coil on the other member the latter having poles 180 degrees wide less width of a set of coils on first member, the coils of first member being connected separate in the branch switch circuits and the coil of second member being connected in series with the three branch circuits; and a controller having electro magnet main and reversing switches the magnets of main and reversing switches being in the car switch circuit, whereby failure of current in this circuit stops the elevator motor.

173. The combination of a controller mover having a field and an armature, a car switch connected by a plurality of circuits with said controller mover, and arranged to divide a current into three branches and vary the strength of these in proper ratio to develop the torque and angular movement required of the controller mover armature; said controller mover having three sets of coils on one member each one traversed by a separate branch current, the other member having two coils one in series with the coils of the first member and the other having a separate current passing therethrough; circuits connecting the switch and controller mover; and the controller having electro magnet main and reversing switches, the magnets of main and reversing switches being in the car switch circuit, whereby failure of current in this circuit stops the elevator motor.

174. The combination of a controller-mover having a field and an armature; a car switch connected by a plurality of circuits with said controller-mover, and adapted to divide a current into three branches and vary the strength of these in proper ratio to develop the torque and angular movement required of the controller-mover armature; said controller-mover having three sets of coils wound concentrated at the edges on one member, each set covering two arcs of 60 degrees and connected in one of the switch branch circuits, the other member having one coil connected in series with the three sets on the other member, and poles 120 degrees wide; and the controller having switches moved directly by the controller-mover.

175. The combination of a controller-mover having a field and an armature; a car switch connected by a plurality of circuits with said controller-mover, and adapted to divide a current into three branches to vary the strength of these independently, also to vary the strength of whole current, branch variations determining the angular movement, and whole current variations the torque of the controller-mover armature; said controller-mover having three sets of coils wound concentrated at the edges on one member, each set covering two arcs of 60 degrees and connected in one of the switch branch circuits, the other member having one coil connected in series with the three sets on the other member, and poles 120 degrees wide; and a controller having switches moved directly by the controller-mover.

176. A car switch having an operating lever, a rotating contact operated by said lever to produce the current variations in the branch circuits and another contact attached to the operating lever to connect the switch with main line and to cut resistances in and out of main switch circuit to produce the whole current variations.

177. A controller-mover arranged to rotate through a large angle or several revolutions and having a drum, a weight attached to a cord arranged to wind up on the drum for the purpose of returning the armature to the stop position when the current fails.

178. The combination of a car switch arranged to divide a current into branches and provided with a retarding device, and a controller-mover having a field and an armature and adapted to be actuated by the car switch currents and provided with a means to return the armature to the stop position if the switch currents fail.

179. The combination of a car switch arranged to divide a current into branches, and a controller-mover having a field and an armature adapted to be actuated by the switch currents, and provided with a retarding device to prevent rotation of the armature at a velocity exceeding the maximum for which the retarding device is adjusted.

180. The combination of a car switch arranged to divide a current into branches and a controller-mover having a field and an armature adapted to be actuated by said currents and provided with a means acting upon the armature shaft, directly or indirectly, for the purpose of returning the armature to the stop position when the switch current fails.

181. In an electric elevator-controller arranged to be actuated by a controller-mover, and having magnetically operated main and reversing switches, the main switch being provided with a retarding device to prevent its closing until the reversing switch has moved to its proper position.

The foregoing specification signed this 19 day of May 1902.

WILLIAM BAXTER, Jr.

In presence of—
STEPHEN H. OLIN,
THOMAS W. PHAIR.